United States Patent [19]

Kopet et al.

[11] Patent Number: 5,699,460
[45] Date of Patent: Dec. 16, 1997

[54] IMAGE COMPRESSION COPROCESSOR WITH DATA FLOW CONTROL AND MULTIPLE PROCESSING UNITS

[75] Inventors: Thomas G. Kopet; Bradford G. Taylor; Gerry C. Lui Kuo; Stephen D. Lew, all of Colorado Springs, Colo.

[73] Assignees: Array Microsystems, Colorado Springs, Colo.; Samsung Electronics Co., Ltd., Yongin, Rep. of Korea

[21] Appl. No.: 78,793

[22] Filed: Jun. 17, 1993

Related U.S. Application Data

[63] Continuation-in-part of Ser. No. 54,950, Apr. 27, 1993, abandoned.

[51] Int. Cl.[6] ............................................. G06K 9/46
[52] U.S. Cl. .................. 382/307; 382/232; 364/715.02; 370/85.5
[58] Field of Search .................. 364/715.02, 604; 382/56, 232, 248, 307; 358/433; 370/85.12, 85.5

[56] References Cited

U.S. PATENT DOCUMENTS

| | | | |
|---|---|---|---|
| 4,651,293 | 3/1987 | Kato | 364/604 |
| 4,855,813 | 8/1989 | Russell et al. | 358/183 |
| 4,916,914 | 4/1990 | Westell | 364/604 |
| 4,985,888 | 1/1991 | Madge et al. | 370/85.12 |
| 5,185,819 | 2/1993 | Ng et al. | 382/56 |
| 5,212,742 | 5/1993 | Normille et al. | 382/56 |
| 5,243,667 | 9/1993 | Hirosawa et al. | 382/56 |
| 5,251,213 | 10/1993 | Videlock et al. | 370/85.12 |
| 5,267,968 | 12/1993 | Coffield | 364/604 |
| 5,388,223 | 2/1995 | Guthrie et al. | 370/85.5 |
| 5,475,770 | 12/1995 | Mittelbach et al. | 382/304 |

OTHER PUBLICATIONS

Grazia Albanesi "SCPCI: Silicon Compiler Pyramidal Chip for Image Processing" 1989 pp. 191–195.

Smith et al., "Generic ASIC Architecture and Synthesis Schemes for DSP" 1989 pp. 2413–2416.

Primary Examiner—Leo Boudreau
Assistant Examiner—Chris Kelley
Attorney, Agent, or Firm—Townsend and Townsend and Crew LLP

[57] ABSTRACT

The present invention provides an image compression/decompression coprocessor which is integrated on a single chip. The control bus has a control unit which is connected by an internal, global bus to a number of different, special purpose processing units. Each of the processing units is specifically designed to handle only certain steps in compression and decompression processes.

37 Claims, 30 Drawing Sheets

CONTROL TOKEN

DATA TOKEN

IMAGE COMPRESSION COPROCESSOR WITH DATA FLOW CONTROL AND MULTIPLE PROCESSING UNITS

This application is a continuation-in-part of application Ser. No. 08/054,950, filed Apr. 27, 1993, and now abandoned.

Appendix I sets forth descriptions of the instructions used by the coprocessor of this invention.

BACKGROUND OF THE INVENTION

The present invention relates to special purpose image compression coprocessors.

Data compression is used to reduce the amount of data that has to be transmitted and stored. There are many types of data compression, with a simple type being run length compression in which, instead of sending, for example, 25 digital ones in a row, a single one is sent with a code indicating that there are 25 of them. This is a lossless compression method in which no data is lost. "Lossy" methods, on the other hand, compress data even more by different techniques, such as reducing the number of bits of accuracy or resolution.

In images, an array of pixels is provided with one or more digital values for each pixel. For gray scale images, the digital pixel value indicates its level of grayness. For example, 0 might be white and 255 might be black. For color images, three different values could be used, each indicating the red, blue and green components in an RGB system (or the three components of a YUV system). One way to compress the data is simply to cut the number of bits of resolution for each component of the pixel, so that instead of 8 bits to represent 256 possible variations, the four most significant bits are used. However, this method would degrade picture quality more than other methods. Most image compression methods realize that if a small enough portion of an image is taken, the color will be either constant or vary slowly in most instances. Thus, many image compression schemes focus on identifying the average or dominant intensity or color and then identifying the variation from this color. By using high resolution for the average or dominant color, lower resolution can be used for the variation from that color.

Several standards have evolved for image data compression. The JPEG (Joint Photography Experts Group) standard is used for still pictures. The MPEG (Motion Picture Experts Group) and Px64 are used for full-motion video. Px64 is also called H.261 by the CCITT (Consultative Committee for International Telephone and Telegraph).

A brief description of an example of how one of the above compression processes works would be useful in understanding the present invention. FIG. 1A is a diagram illustrating the JPEG standard. A source image is broken up into blocks of 8 pixels on a side, or a total of 64 pixels per block. Each pixel is represented by a single digital value from 0-255 for gray scale, or by three different values for RGB or YUV color images. A two-dimensional discrete cosine transform (DCT) is performed on the 64 values. The DCT is a technique used to approximate an arbitrary waveform by the summation of a number of different periodic waveforms with a different coefficient, or multiplier, for each of the component periodic waveforms. Instead of a normal waveform which varies in time, the plotting of the points in the 8×8 pixel block is a waveform representation of a variation in space, or a spacial frequency. The end result of the transform is a DC value which represents the dominant color, and a number of coefficients which represent the variation from it. The resulting DC coefficient and AC coefficients are stored as blocks 12, with the upper left value being the DC value for each block. The order in which the pixels are examined, instead of being row by row, might be a zigzag pattern 14. This zigzag pattern should make the variations in color smoother.

FIG. 1B shows the data flow for JPEG compression. The input image data is first offset in an offset block 20. This offset is 128 in the example shown, which has the effect of centering the data around 0 since the range would typically be 0–255. This should cut down on the value of the DC component, and thus on the number of bits required to represent it. The data is then applied through the forward DCT (FDCT) block 22 to produce the discrete cosine transform DC and AC coefficients. These coefficients are then quantized in a forward quantize block 24 under the control of quantization tables 26. The quantization is basically a rounding off function which limits the number of bits needed to represent each coefficient. The AC coefficients are then encoded in a block 28 in a run length type encoding scheme similar to that described above.

The DC component is encoded in a differential encoding block 30. The first DC values are represented absolutely, while the remaining DC values in subsequent blocks are encoded as a differential from that first value, again limiting the number of bits required to represent it. Finally, the data is processed through a Huffman coder 32. Huffman coding is one of the alternatives specified by the JPEG standard, and is a form of entropy coding. Huffman encoding basically compresses digital data by using one of a number of codes in a table in place of certain data patterns.

FIG. 1C illustrates the reverse of FIG. 1B for decoding compressed data. All the blocks are basically the inverse of the blocks set forth in FIG. 1B. These blocks are the Huffman decoder 40, the run decoder 42, differential decoder 44, inverse quantization block 46 with its quantization tables 48, inverse DCT block 50, and offset block 52.

Data compression and decompression has historically been accomplished in one or two different ways. First, a general microprocessor can be programmed to perform the desired tasks required for the data flow illustrated in FIGS. 1B and 1C. Clearly, this programmability makes the hardware flexible, but at the same time makes the compression and decompression very slow. Second, dedicated hardware can be designed to implement a particular data flow path. Clearly, the dedicated hardware would be faster, but would be limited in its flexibility. Both LSI Logic and SGS Thompson sell chip sets which include the building blocks which can be used for an image compression/decompression system. These chips would include a DCT processor, an encoder/decoder, a DCT quantization processor, a CCITT variable length decoder, etc.

In another approach, several companies produce special purpose coprocessors optimized for data compression/decompression. C-Cube announced product part number CL550 which is a JPEG image compression processor. The processor is optimized for the JPEG standard. Zoran also announced such a coprocessor.

The present invention also relates to data flow techniques. NEC has introduced an image coprocessor which operates on data flow techniques. In a standard microprocessor, the program instructions are executed one at a time, with a program counter pointing to the next instruction in line, with sequential execution unless there is a jump.

In a data flow processor, on the other hand, there is no standard program counter concept. Instead, a series of instructions are stored, with the timing of execution of each instruction being determined by when its data is ready. A description of data flow programs is set forth in the article "Data Flow Super Computers", Jack B. Dennis, Computer Magazine, November 1980, pg. 48–56. That article suggests the use of data flow techniques for multi-processor architectures. The basic instruction execution mechanism is set forth in FIG. 10, which has a circular pipeline. An instruction queue holds instructions ready for execution, and a fetch unit passes them on to the actual operation unit in the form of packets. The operation unit also receives data tokens. Upon completion, a result packet is passed back to an activity store for the instructions, from which instruction can be selected again if it is to be repeated for additional data. The NEC image coprocessor uses such a circular pipeline.

SUMMARY OF THE INVENTION

The present invention provides an image compression/decompression coprocessor which is integrated on a single chip. The coprocessor has a control unit which is connected by an internal, global bus to a number of different processing units. Each of the processing units handles only certain steps in compression and decompression processes.

The present invention implements a network-like architecture on a single chip which allows the sharing of specialized hardware and concurrent processing in a way which speeds up the performance of compression and decompression processes. The invention is preferably implemented with a data flow-type control unit which sends tokens out over the internal, global bus to the various special purpose processing units.

In one embodiment, the coprocessor has separate host and video memory interfaces. The host interface translates between the tokens used on the internal bus and run length data sent to the host. The video interface translates between the tokens and a video data format. The use of the internal, global bus is arbitrated by an arbitration circuit in the control unit.

In one embodiment, specialized processing units are used which preferably include an arithmetic processor, a quantization processor, and a DCT processor. By using data flow control techniques, tokens can be sent out and be processed in parallel by the individual processing units. The use of specialized processing units improves over the prior art which used a single, circular pipeline which could not operate as fast, or prior art which used a number of identical, parallel processors which also cannot operate as fast because they are not specialized.

The present invention in the data flow embodiment uses unique tokens which include control tokens and data tokens. Data tokens can include a large block of data in a single token. The internal bus is much larger than the external interface buses, thus allowing larger amounts of data to be transferred at once between the units on the coprocessor chip.

For a fuller understanding of the nature and advantages of the invention, reference should be made to the ensuing detailed description taken in conjunction with the accompanying drawings.

DESCRIPTION OF SPECIFIC EMBODIMENTS

Typical System Configuration

Figure 1A:
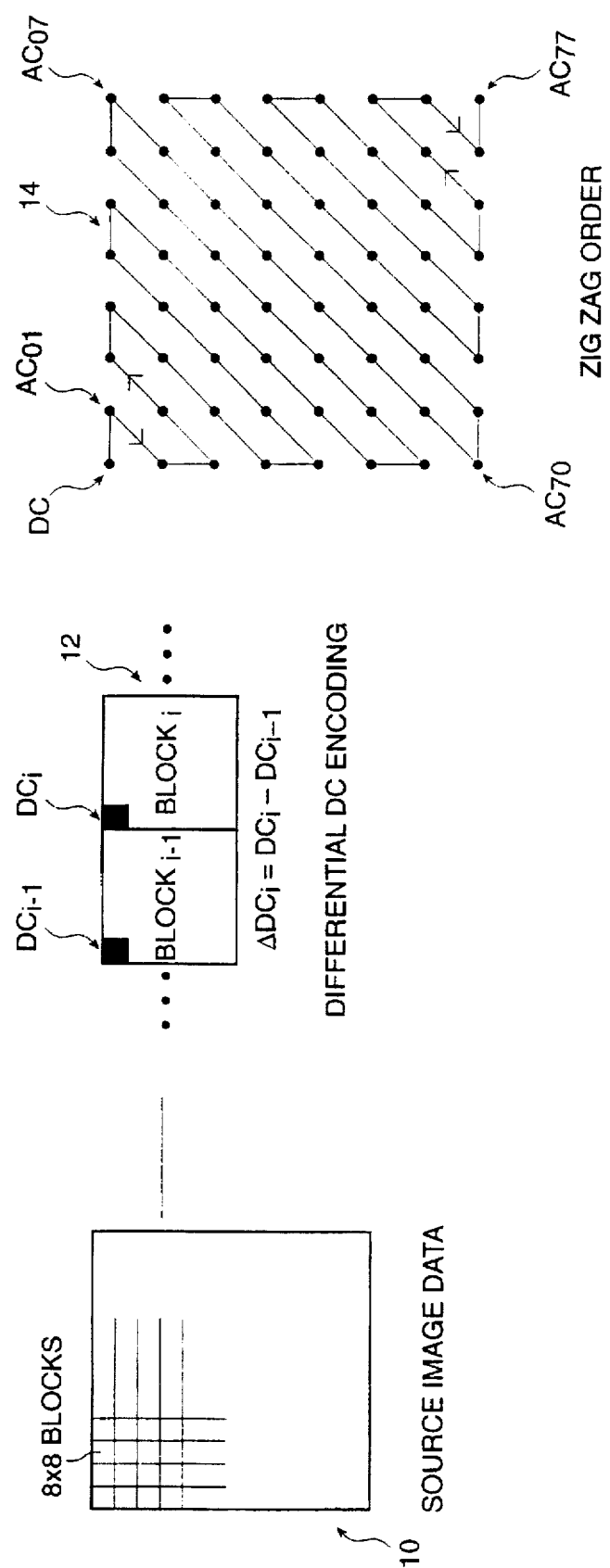
FIG. 1A is a diagram of data blocks according to the JPEG standard.
Figure 1B:
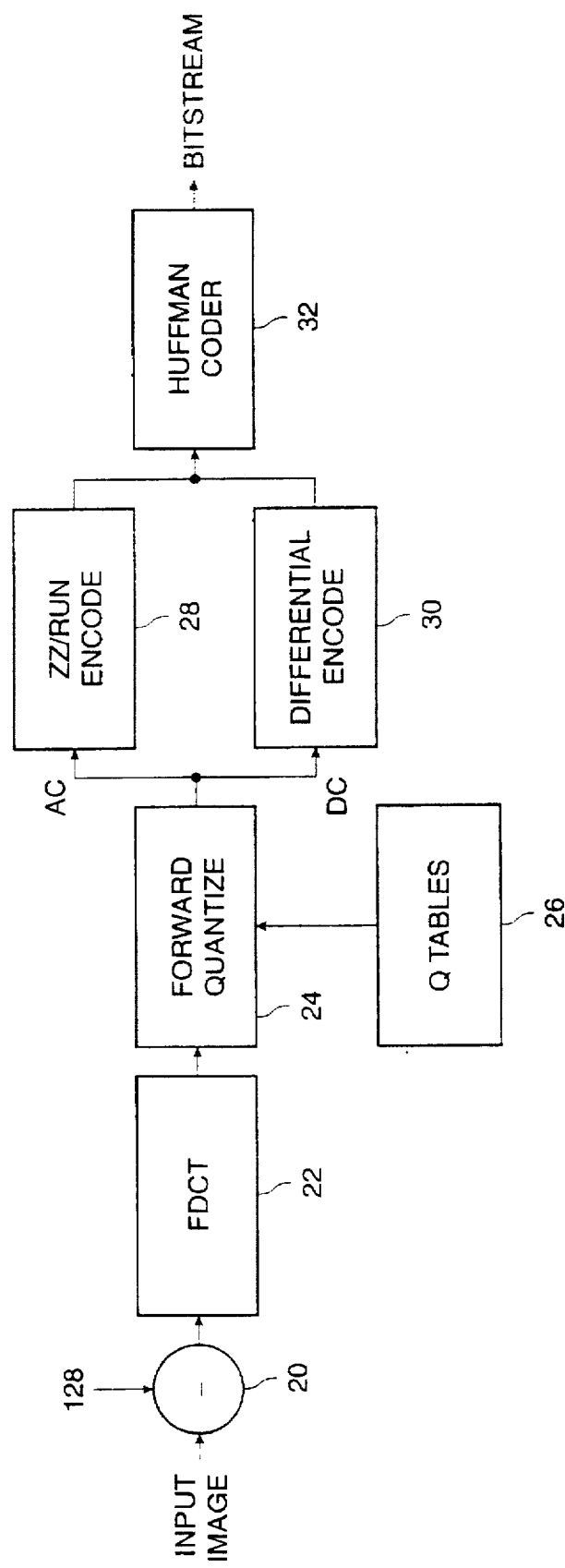
FIGS. 1B and 1C are diagrams of JPEG data flow for an encoder and decoder.
Figure 1C:
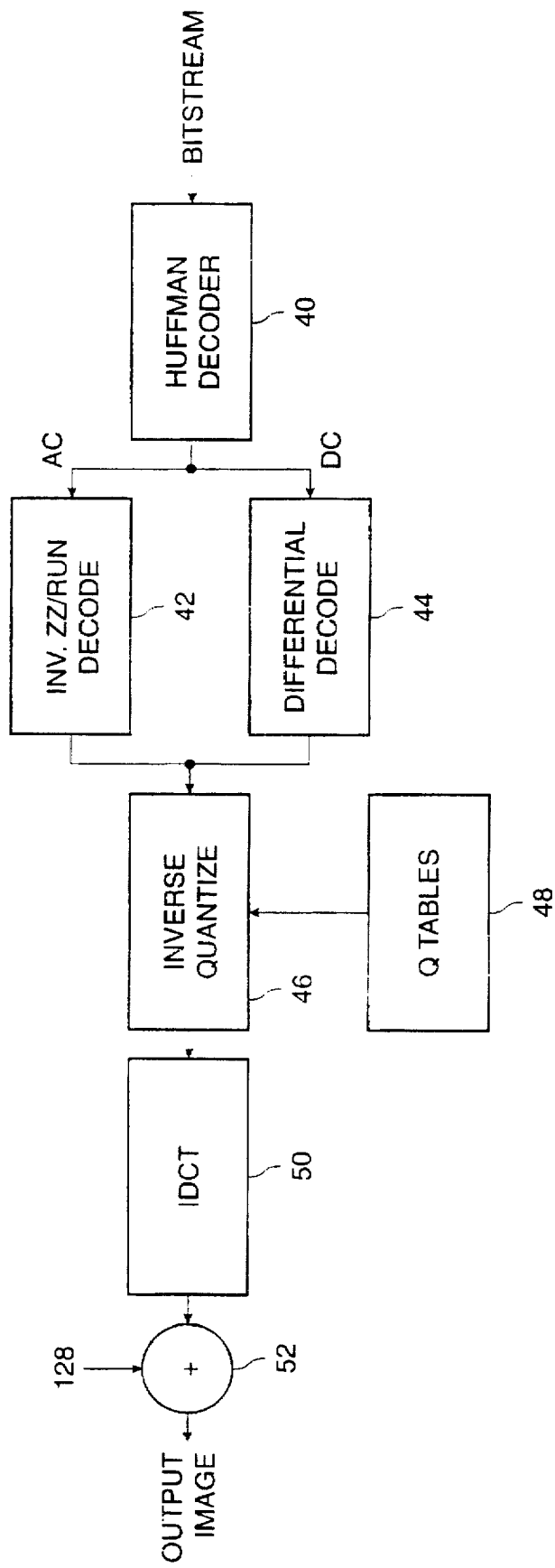
Figure 2:
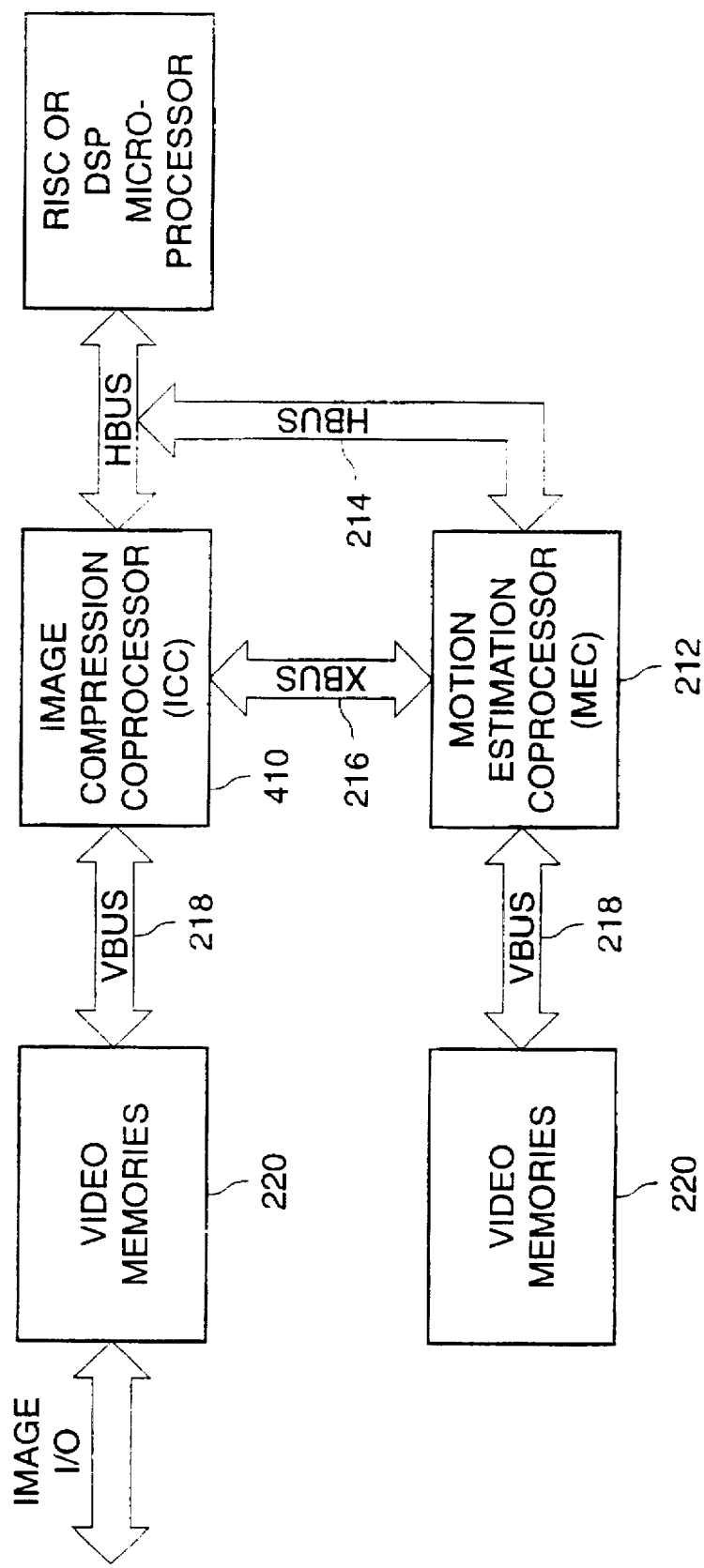
FIG. 2 is a block diagram of an image compression system using the present invention.

FIG. 2 shows the basic configuration of a video compression system for the JPEG, H.261, and MPEG standards which incorporates an image compression/decompression processor 410 according to the present invention (the ICC) and a motion estimation coprocessor (MEC) 212 chip. The MEC is described in copending application Ser. No. 08/005,711, filed Apr. 27, 1993, issure as U.S. Pat. No. 5,448,310 on Sep. 5, 1995, entitled "Motion Estimation Coprocessor", and hereby incorporated by reference (the "MEC Application"). Both chips are coprocessors and need to be supported by a host processor whose performance level is application dependent; commonly available RISC controllers such as members of the Intel i960 family are generally sufficient. The ICC performs all video compression functions in a typical system except motion estimation, Huffman encoding and decoding, and bit stream management. The latter two functions are handled by the host processor, and motion estimation is handled by the MEC Applications not requiring motion compensated frame encoding do not need the MEC chip. This is true, for example, of JPEG-based encoders and decoders, and MPEG-based decoders.

Three types of busses are shown in FIG. 2: the host processor bus (Hbus) 214, the auxiliary processor bus (Xbus) 216, and the video memory bus (Vbus) 218. Each bus has a specific purpose. The Hbus is used to download programs and parameters from the host to the ICC and MEC chips and to transfer run length coded data between the host and ICC in real time. The Xbus, as will be explained later, permits the ICC to flexibly interface with "foreign" processor types, including the MEC. Finally, the Vbus forms a glueless interface with off-the-shelf DRAMs and/or VRAMs 220; refresh cycles are automatically generated by both the ICC and MEC. For maximum performance, the video busses of the ICC and MEC may be split as shown in FIG. 2 and connected to separate memories, or the busses may be shared.

By way of comparison, the AVP 1000 chip set from AT&T places encoding and decoding functions in separate chips; this is unlike the ICC in which encoding and decoding functions share the same computational resources. The AT&T chip set also combines the silicon-intensive motion estimation function with other functions on the encoder chips, whereas the ICC/MEC chip set devotes a separate chip (i.e. the MEC) to motion estimation. Because of this, it appears that a still image encoder/decoder application based only, for simplicity, on MPEG I-frames requires both an AT&T encoder and decoder chip (which by default also provides the unneeded motion estimation function), whereas the same application using the ICC/MEC chip set would require only the ICC. Note also that unlike the ICC/MEC chip set, the AT&T chip set appears to be incapable of handling the JPEG standard which is generally preferred over MPEG for high quality still image compression.

The AT&T chip set also contains a system controller largely optimized for H.261-based applications which provides the functions which are mapped onto the host processor in ICC/MEC systems. AT&T systems appear to always require some type of dedicated general purpose processor in addition to the system controller processor, whereas in ICC/MEC systems, the user may be able to perform the equivalent functions using only a portion of the time of a single system controller processor having an adequate performance level.

The ICC internally utilizes a multiple instruction—multiple data (MIMD) architecture to implement a true "static dataflow" computing model. This differs significantly from previously announced multimedia chips. For example, the Vision Processor chip from IIT appears to implement a so-called "very long instruction word" (VLIW) architecture consisting of a collection of computational blocks such as adders, multipliers, etc. which are all controlled from a single 64 bit microinstruction. Each of the encoder and decoder chips in AT&T's chip set utilizes a single instruction—multiple data (SIMD) architecture centered around a signal processor with six identical processing elements all of which execute the same instruction in parallel.

Dataflow computing has long been an active subject of parallel processor research and hardware implementation projects. All dataflow computers share the common characteristic that they are "data-driven" rather than "control-driven" like other computers, including those employing SIMD and VLIW architectures. Dataflow computers have no program counter; instead, they execute or "fire" an instruction based solely on the availability of data operands for that instruction and a place to put the instruction's result. Theoretically, many instructions may fire at once, giving rise to dataflow architectures incorporating multiple parallel computing elements. Dataflow computer programs are naturally represented using data flowgraphs consisting of instruction "nodes" interconnected by "arcs" which represent the flow of data between instructions; the ordering of instructions in program memory has no bearing on instruction execution. The data objects which travel on these flowgraph arcs are called "tokens". "Static" dataflow computers, of which the ICC is an example, allow only a single token on an arc at any point in time and are simpler to implement than "dynamic" dataflow computers which permit multiple tokens to coexist on an arc.

Control-driven architectures, of which present-day microprocessors are a prime example, select the addresses of instructions for execution by making a series of data dependent and/or independent decisions which are themselves part of the processor's program. Programs take the familiar form of linear lists in which the physical placement of instructions relative to one another plays a significant role in their order of execution.

Figure 4:
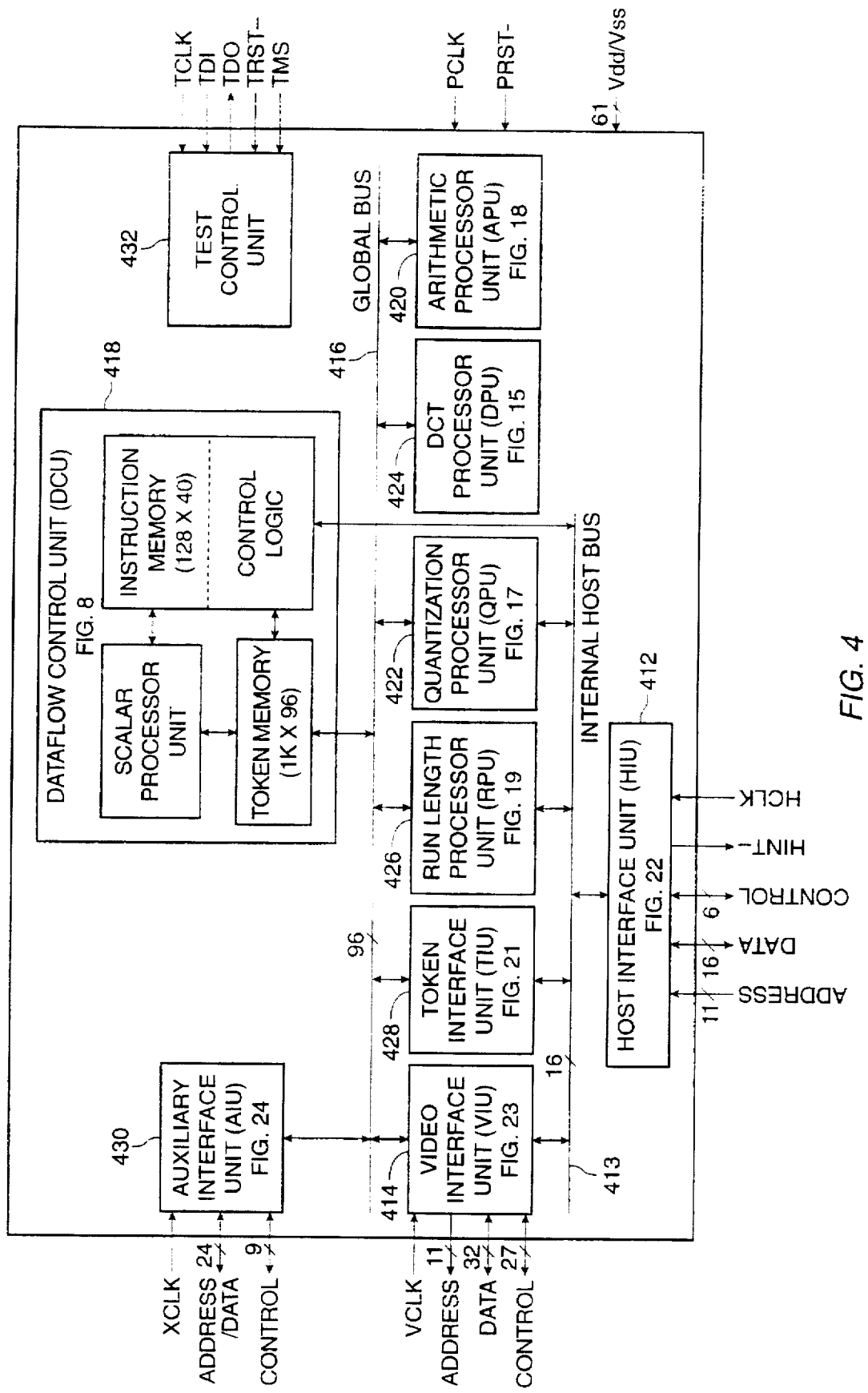
FIG. 4 is a block diagram of an image compression coprocessor according to the present invention.

The ICC's dataflow computing architecture, shown in FIG. 4, consists of a collection of parallel processing elements or "functional units" interconnected via a single 96 bit bidirectional global bus 416. The bus is capable of transferring eight 12 bit words every 50 Mhz clock cycle, yielding a maximum throughput of 400 Mwords/sec. Tokens, each of which consists of a vector of from eight to 264 twelve bit words, are passed over the bus between the functional units and a buffer memory in the dataflow controller. The dataflow controller matches result tokens from the functional units to the operand fields of instructions stored in the on-chip 128 word program RAM, and then dispatches both matched instructions and their operands to the appropriate functional units over the global bus.

For maximum performance, each of the functional units is optimized to execute a particular subset of instructions; collectively, the units attain a peak performance of over one billion operations per second (BOPS). For example, the DCT Processor Unit (DPU) 424 is capable of executing only forward and inverse DCTs, and the Quantization Processor Unit (QPU) 422 is optimized to perform forward and inverse quantizations. Some of the functional units are responsible for interfacing the ICC to the outside world. For example, the Video Interface Unit (VIU) 414 is used to read and write image data to off-chip DRAM, and the Token Interface Unit (TIU) 428 and Run Length Processing Unit (RPU) 426 are used to transfer data between the ICC and host processor. All of the ICC instructions executed on the functional units are "high level" in the sense that they process tokens consisting of data vectors rather than single data words; this feature allows ICC programs to be extremely compact. A summary of the ICC's primary arithmetic operation codes appears in Table 3.

Also, the ICC has a special functional unit called the Auxiliary Interface Unit (AIU) 430 which permits the ICC to support other special processing chips, including the MEC, using the high-speed synchronous auxiliary bus. The ICC controls processors on the auxiliary bus using a flexible communications protocol and user-defined instructions from the ICC's program RAM.

Performance

The ICC's function-optimized parallel processing units permit the ICC to deliver superior performance for applications using the JPEG, H.261, and MPEG standards. For example, for high image quality-based applications such as video editing which typically deal with CCIR601 frame sizes (480 lines by 720 pels/line), a single ICC has enough horsepower to encode or decode these images at 30 frames per second using the JPEG standard. In fact, the ICC can deal with images of up to 4096 lines by 4096 pels/line.

However, the ICC's high performance is also very useful for applications dealing with smaller CIF-sized (288 lines by 352 pels/line) imagery such as video conferencing (which uses the H.261 standard) and CD ROM-based multimedia (which uses MPEG). For these applications, a single ICC/MEC chip set is capable of processing multiple image channels. For example, in multipoint video conferencing, a single ICC/MEC chip set can be used to implement a video codec which is capable of encoding a single image (i.e. the one being transmitted) and decoding the possibly multiple images which are being received. For multimedia applications based on the MPEG standard running in a windowed environment on a PC or workstation, a single ICC can support multiple windows by decoding two SIF images in real time. In addition, for multimedia applications which also create CD ROM-based image sequences, a single ICC/MEC chip set can support MPEG encoding of CIF imagery at 30 frames per second using a two B frame per P frame encoding structure.

Expandability and Scalability

The ICC's auxiliary bus interface automatically builds in both performance and functional expandability and scalability into ICC/MEC-based systems. This is because this bus flexibly supports the definition of other processors and instructions which are currently not part of the ICC's internal architecture. The MEC is one example of such a processor. Up to four external processors may coexist on a single auxiliary bus; for example, a user may increase motion estimation performance by using multiple MECs.

In addition to providing the auxiliary bus, the ICC also implements special instructions which allow the host processor to be called somewhat like a subroutine during the execution of a user's program. These instructions allow the host processor, if system timing permits, to be used by the ICC to calculate functions it does not implement on-chip. In addition, these same instructions allow the ICC to be programmed to look like a classical coprocessor to the host; i.e. the host may command the ICC to perform individual functions on host-supplied input data and return the results.

Ease of Programming

The ICC's flowgraph-based programming environment makes it very easy for the user to specify the parallel execution of instructions. All the programmer need do is specify how data flows between instructions; the ICC's dataflow controller does the rest by automatically scheduling instruction executions at run time based on operand availability and dispatches both instructions and operands to the appropriate functional units. The ICC further simplifies program writing by using high-level instructions to perform standard arithmetic operations such as DCT and quantization which normally could require dozens of more basic instructions.

In contrast, architectures such as VLIW (and, to a lesser degree, SIMD) shift the burden of efficiently using parallel computing resources onto the programmer. VLIW requires the programmer to simultaneously manage several concurrent activities from a single instruction, and in addition, instructions must be sequenced so that these activities remain synchronized over time. Large scale programming of VLIW machines at the instruction level can quickly become overwhelming and generally requires sophisticated microcode compilation tools. SIMD programming is somewhat easier on the user since he or she writes a single control-driven program which is executed in common across multiple processing units. However, SIMD programming is only efficient for applications in which the sequence of instructions to be performed is largely data independent (i.e. does not involve a lot of branching). This is true of many compression functions such as the DCT, but some functions, such as thresholded quantization, may introduce some data dependent behavior which further complicates programming. Furthermore, in both SIMD and VLIW architectures, the programmer must generally be keenly aware of any hardware pipelining used to increase performance; in contrast, the ICC's functional units are internally pipelined, but this fact is totally hidden from the programmer.

FIG. 4 is a block diagram of an image compression/decompression coprocessor 410 according to one embodiment of the present invention. Coprocessor 410 interfaces with a host computer through a host interface 412 and an internal host bus 413. Video memory is accessed via a video interface 414. These interfaces provide data and instructions to and from an internal global bus 416. The coprocessor operates under the control of the control unit 418 which is connected to the specific processors by an internal global bus 416.

Several special purpose processing units are provided to do certain specific functions in image compression/decompression. These are an arithmetic processor unit 420, a quantization processor unit 422 and a discrete cosine transform (DCT) processor unit 424. These units can either be identical in hardware, with custom programming, or specialized in hardware. Two other special purpose units connect between the host interface and the internal global bus. These are run length processor unit 426 and token interface unit 428. Coprocessor 410 also includes an auxiliary interface unit 430 for connecting to additional processing devices. In addition, a test control unit 432 is provided for testing coprocessor 410.

In operation, coprocessor 410 would operate as a slave to a host microprocessor. The host microprocessor would load an appropriate program for compression/decompression through host interface 412 and run length processor 426 to control unit 418. The control unit would then operate the coprocessor under control of the program to either compress or decompress data provided through video interface 414 or through the host interface. The different steps in a compression or decompression algorithm are performed by the appropriate processing units connected to the internal bus. These units can operate in parallel and asynchronously. The coprocessor thus functions in a way that might be considered a network on a chip. Data is transmitted back and forth between the units over the internal global bus as needed, with each of the processing units and the control unit including arbitration circuitry for determining when to send data or instructions over the bus. After a program is completed, the host can then load a next program.

The auxiliary interface unit 430 allows expandability of the coprocessor by essentially allowing other specialized processing units to be coupled to the bus as if they were on chip.

The internal global bus 416 is 96 lines wide, and is large as compared to the smaller number of lines for the video and host interfaces. Thus, large amounts of data and instructions can be moved quickly internally between the various specialized processing units.

The control unit 418 can be any type of control unit, such as a standard microprogrammed control unit of the type in a standard microprocessor. The advantages of the asynchronous, parallel execution of instructions are available in such a system. However, additional efficiency can be obtained by using a data flow control unit.

Figure 5:
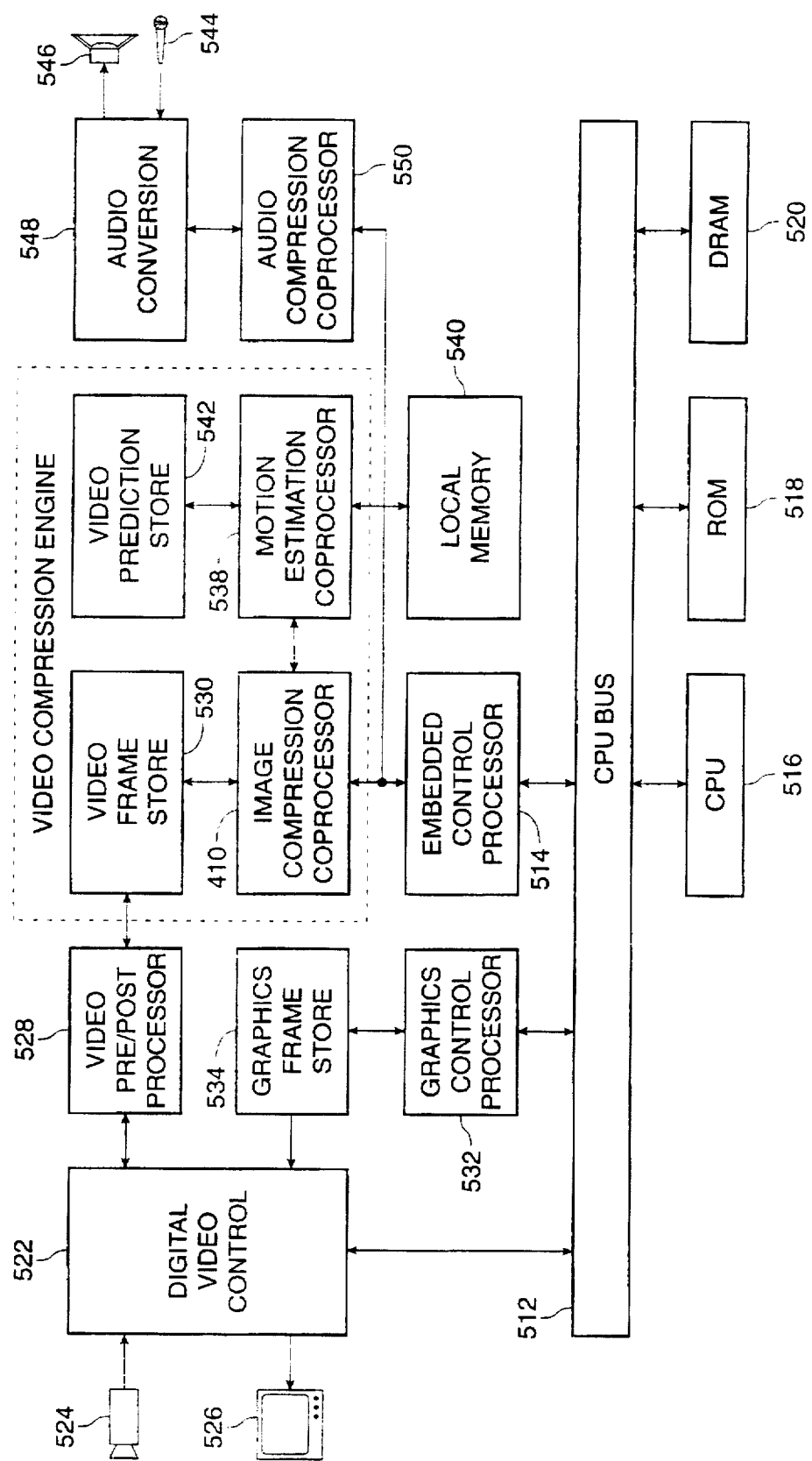
FIG. 5 is a diagram of a system using the coprocessor of FIG. 4.

FIG. 5 illustrates one embodiment of a system into which the image compression coprocessor 410 of FIG. 4 could be used. Image compression coprocessor 410 is connected to a CPU bus 512 through an optional embedded control processor 514. Control processor 514 can be used to offload from the CPU 516 certain decompression and compression functions not accomplished by coprocessor 410, such as Huffman coding. Alternately, this can be done by the CPU itself. Local memory 540 is on the bus coupled to embedded processor 514. Associated with the CPU are ROM 518 and DRAM 520. A digital video control unit 522 is connected to a camera 524 and a display 526. Data can be received from the camera 524 and provided to the display 526 via the video control block 522 from CPU bus 512 or from a video pre/post processor 528. The processor 528 is connected to video memory 530, which in turn is connected to the image coprocessor 410.

Separate graphics control can be provided through a graphics control processor 532 and graphics memory 534 connected between CPU bus 512 and digital video control unit 522.

For motion video, a motion estimation coprocessor 538 can be added, along with a video prediction store memory 542.

Audio capabilities can be added with a microphone 544 and a speaker 546 connected to an audio conversion circuit 548. An audio compression coprocessor 550 can be connected between the embedded control processor 514 and the audio conversion unit 548.

Figure 6:
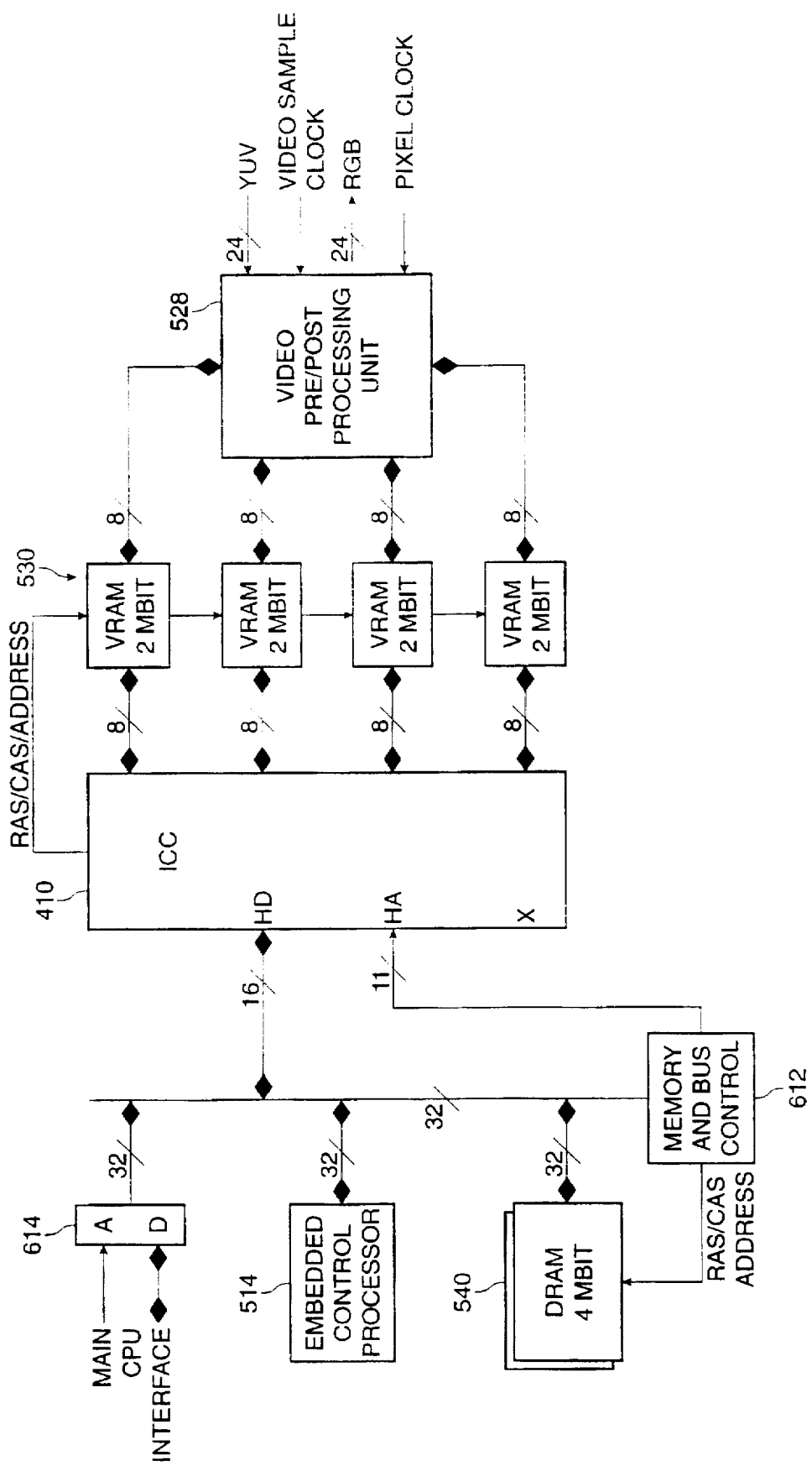
FIG. 6 is a more detailed diagram of the memory connections of FIG. 5.

FIG. 6 illustrates in more detail the connection of the image compression coprocessor 410 to the video memory 530 and the embedded coprocessor 514. Additionally shown is a memory and bus control unit 612 which provides the refresh and address signals for local memory 540. Additionally, FIG. 6 shows a CPU interface 614 for connecting to CPU bus 512, instead of having a connection directly through the control processor 514 as suggested by the diagram of FIG. 5.

Figure 7:
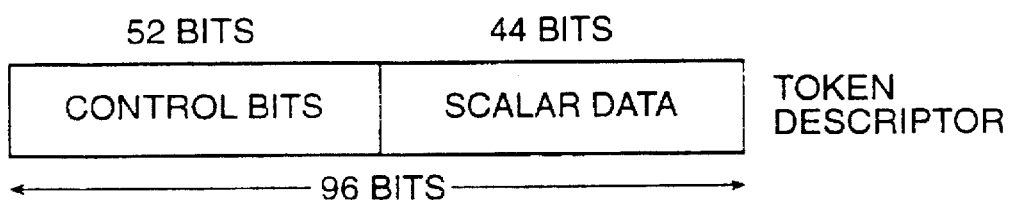
FIG. 7 is a diagram illustrating the control and data tokens of the present invention.
Figure 7:
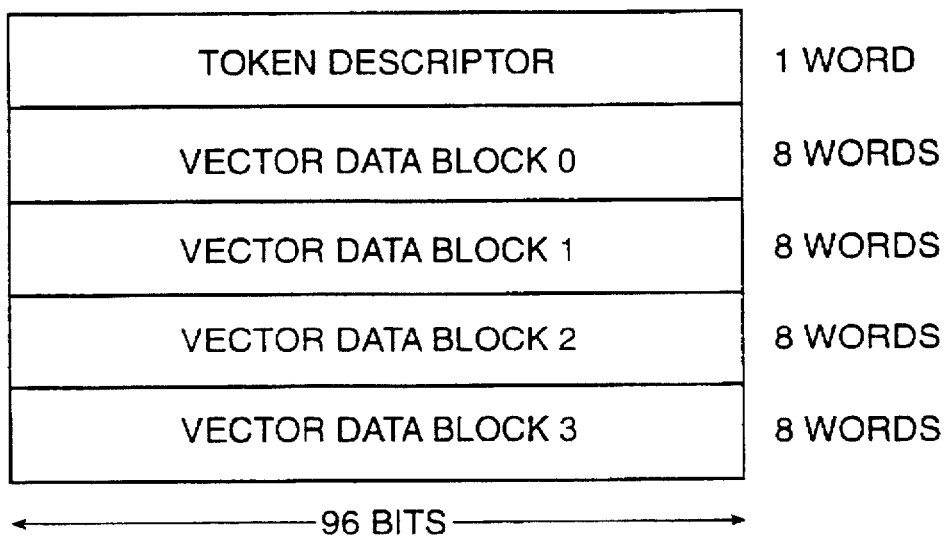

Returning to FIG. 4, communication over the internal global bus of the image compression coprocessor is accomplished by using packets or "tokens." Two types of tokens are used, a control token and a data token. These are illustrated in FIG. 7. Both the control and data tokens share a common data structure called the token descriptor. This is a 96 bit field consisting of 12 8-bit bytes. The control token is a token descriptor with a control bit indicating token type being set to indicate that it is a control token. The token descriptor consists of 52 bits of various control bits, and an additional bits of scalar data.

The data token includes the same token descriptor, but additionally has anywhere from 1 to 4 data blocks which contain vector data. The token descriptor in the data token will have a control bit set to indicate that it is a data token, and two other control bits are set to indicate the number of vector data blocks attached. The scalar data field may be empty or may contain scalar data in addition to the vector data in the data block fields.

The 96 bit width of the token descriptor and each vector data block corresponds to the 96 line width of the internal global bus. The various fields of the token descriptor are set forth in more detail in Table 1 below.

TABLE 1

| Token Descriptor Format | | | |
|---|---|---|---|
| Field Name | Byte | Bits | Field Contents |
| type | 0 | 7 | Token type:<br>0 = control token<br>1 = data token |
| nblocks | 0 | 6 | Reserved |
| nblocks | 0 | 5:4 | (Number of 8 by 8 data blocks)-1 (valid only if type = 1) |
| comps | 0 | 3:1 | Components present in token:<br>000 = illegal<br>001 = component 0 only<br>010 = component 1 only<br>100 = component 2 only<br>011 = illegal<br>110 = components 1 and 2<br>101 = illegal<br>111 = components 0, 1, and 2 |
| errflag | 0 | 0 | Error flag:<br>0 = no error<br>1 = error |
| lflag | 1 | 7 | Logical flag<br>0 = .false<br>1 = .true |
| mbtype | 1 | 6:5 | Macroblock type:<br>00 = intra<br>10 = forward predicted<br>01 = backward predicted<br>11 = bidirectionally predicted |
| quant | 1 | 4:0 | Quantization constant |
| vpos | 2 | 7:0 | Vertical position counter |
| hpos | 3 | 7:0 | Horizontal position counter |
| cntr1 | 4 | 7:0 | General purpose counter 1 |
| cntr2 | 5 | 7:0 | General purpose counter 2 |
| usrbits | 6 | 7:4 | Undefined - available to programmer |
| sfield(43:40) | 6 | 3:0 | Scalar results field, bits 43:40 |
| sfield(39:32) | 7 | 7:0 | Scalar results field, bits 39:32 |
| sfield(31:24) | 8 | 7:0 | Scalar results field, bits 31:24 |
| sfield(23:16) | 9 | 7:0 | Scalar results field, bits 23:16 |
| sfield(15:8) | 10 | 7:0 | Scalar results field, bits 15:8 |
| sfield(7:0) | 11 | 7:0 | Scalar results field, bits 7:0 |

A control token is identified by type=0 in its token descriptor and consists of only its descriptor and no other data. Control tokens are used to convey boolean and/or numeric scalar data between instructions. Common usages of control tokens include the holding of memory addresses for video memory read instructions and the holding of boolean data which are used to gate program dataflow.

A data token is identified by type=1 in its token descriptor and consists of its descriptor and one or more 64 word data blocks. Data tokens are primarily used to convey numeric vectors of data between instructions. A data token contains nblocks+1 data blocks, up to a maximum of four. Each data block contains 64 twelve bit words which are arranged in an 8 row by 8 column configuration as shown in Table 2.

TABLE 2

| Format of each data block: | |
|---|---|
| Word(s) | Contents |
| 0–7 | Row 0, Columns 0–7 |
| 8–15 | Row 1, Columns 0–7 |
| 16–23 | Row 2, Columns 0–7 |
| 24–31 | Row 3, Columns 0–7 |

TABLE 2-continued

| Format of each data block: Word(s) | Contents |
|---|---|
| 32–39 | Row 4, Columns 0–7 |
| 40–47 | Row 5, Columns 0–7 |
| 48–55 | Row 6, Columns 0–7 |
| 56–63 | Row 7, Columns 0–7 |

As was just discussed, the token descriptor's type field discriminates control tokens from data tokens, and the nblocks field determines the number of data blocks making up a data token.

Figure 3A:
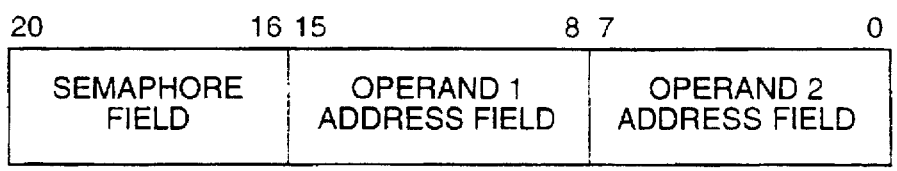
FIGS. 3A–3F are diagrams of operand RAM, result packet, enabled instruction packets, token address memory, and two processor packet formats.
Figure 3A:
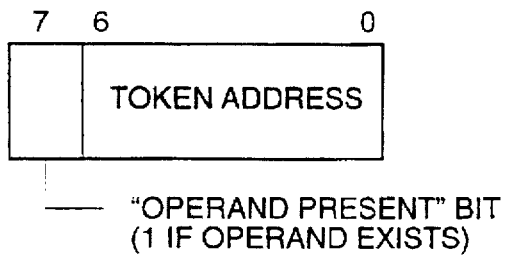
Figure 3B:
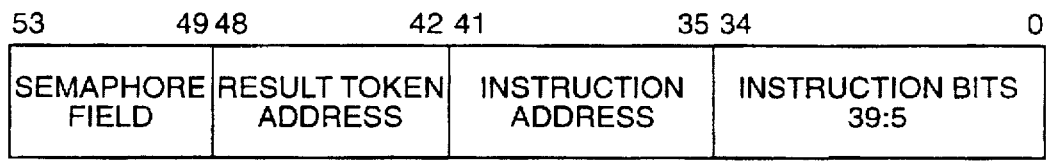
Figure 3C:
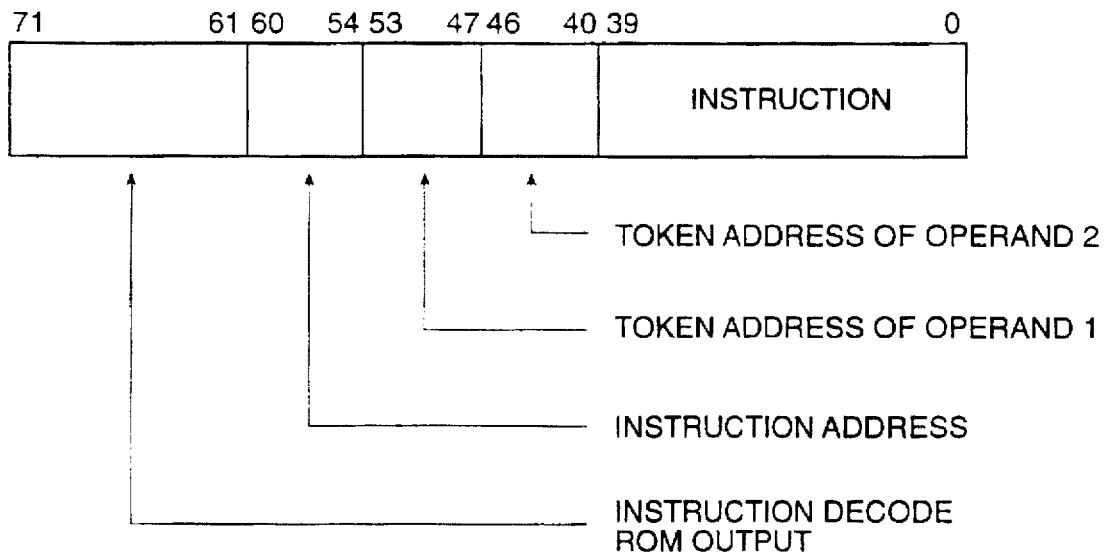
Figure 3D:
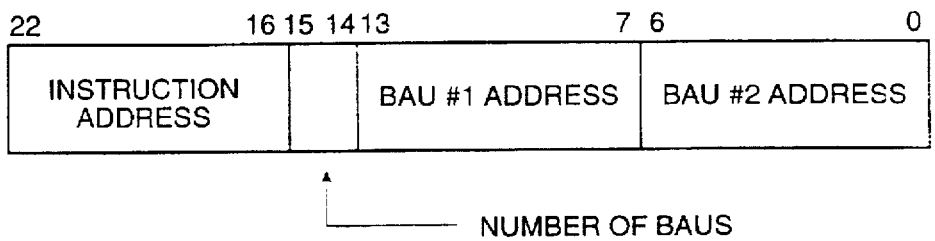

The blocks making up a data token are furthermore grouped into components which are identified by the comps field in the token descriptor. Up to three components (numbered 0, 1, and 2) can coexist in a token, with blocks corresponding to lower numbered components preceding those of higher numbered components. As shown in Table 1, each bit of the three bit comps field identifies whether or not its correspondingly numbered component is present in the token. If the component is present, the number and geometric configuration of the data blocks making it up are revealed in the correspondingly numbered CONFIG register in control unit 418. A component can consist of 1, 2, or 4 data blocks. A CONFIG register contains a number 0 through 3 indicating the configuration of data blocks within its component; these configurations are shown in FIG. 3G. No assumptions are made about the nature of components; i.e. they may consist of (Y,U,V) data, (R,G,B) data, or whatever.

The errflag field in Table 1 is set by the various image compression coprocessor 410 (ICC) instructions to flag the occurrence of errors encountered during instruction execution. The logical state of the errflag bit in the descriptor of each result token is checked by the ICC's Dataflow Control Unit (DCU) 418, and if found to be true, causes the DCU to shut down further program execution.

The mbtype field is intended to indicate the method or "mode" to be used to either compress or decompress, as appropriate, the data blocks associated with a data token. When used in decoding applications, mbtype can be checked by various ICC instructions to control program dataflow; when encoding, mbtype can be used to indicate which mode was used to compress the data in a data token.

The quant field is specific to the ICC's MPEG and Px64 quantization algorithms. For MPEG forward and inverse quantization, quant contains the value of quantizer_scale as defined in the MPEG standard. Similarly, for Px64 forward and inverse quantization, quant contains the value of the standard's MQUANT parameter. quant has no significant in JPEG quantization.

The vpos ("vertical position") and hpos ("horizontal position") fields are intended to be used respectively as row and column address counters which identify the position of a data token within an image for operations such as video memory reading and writing. The general purpose uses of the cntr1 and cntr2 fields include counting things such as blocks, macroblocks, groups of blocks, and slices as needed in algorithms implementing standards such as JPEG, Px64, and MPEG. The cntr1 field also plays a special role in controlling program dataflow through the use of semaphore instructions. The contents of the vpos, hpos, cntr1, and cntr2 fields are all manipulated via token descriptor modification instructions.

The usages of the usrbits field are largely undefined; the field is available to be used by the programmer in a number of fashions. For example, in an application implementing the Px64 standard, usrbits can be used to hold mode bits such as "FIL" and "MC".

Finally, sfield is used to hold basically three types of scalar data. sfield(23:0) holds the 24 bit 2's complement result produced by the ICC's MEANSQ, VAR and SUBVAL instructions. A one bit boolean value can be stored in 1flag, byte 1, bit 7 and read or written by several instructions concerned with controlling program data flow. The third data type, motion vectors, use all 44 bits of sfield. sfield(43:33) holds the horizontal component of forward motion vectors while sfield(32:22) holds the vertical component. For backward motion vectors, sfield(21:11) holds the horizontal component while sfield(10:0) holds the vertical component. The resolution of forward or backward motion vectors can be either full or half pel as indicated, respectively, by the FULLFMV and FULLBMV flag registers in DCU 418.

Control and data tokens are stored in on-chip memory. Token storage is allocated in two type of units: 96 bit headers, and 16 by 96 bit block allocation units (BAUs). Each control token requires one header, while each data token requires one header plus (nblocks+1)//2 BAUs ("//" indicates integer division with rounding to the nearest integer; half-values round up).

All headers and BAUs are stored on-chip in the ICC memory. The ICC stores a total of 128 headers and 64 BAUs. Allocation and deallocation of all headers and BAUs are automatically handled by the ICC's Dataflow Control Unit (DCU) whenever tokens are created or consumed by instructions.

ICC 410 uses 53 internal instructions. In accordance with data flow techniques, these instructions are executed as soon as the operands they need are available. Certain instructions are designated for certain of the functional units in FIG. 4. When an instruction is available for execution, it is routed to the appropriate processor unit which handles that instruction. Table 3 below sets forth a brief description of each of the instructions, along with the functional unit which will process it.

TABLE 3

| Mnemonic | ICC Instruction Set Summary<br>Description |
|---|---|
| APU Processor | |
| ADD | Adds two data tokens and optionally clips the result to the range [0,255]. |
| ADDCON | Adds constant to data token and optionally clips result to the range [0,255]. |
| CLIP | Clips data token to fall within a specified range. |
| AVERAGE | Adds together two data tokens and halves the result. |
| SUBTRACT | Subtracts two data tokens. |
| FILTER | Performs Px64 loop filter on data token. |
| DPU Processor | |
| FDCT | Performs forward DCT on data token. |
| IDCT | Performs inverse DCT on data token. |
| OPU Processor | |
| FQUANT | Forward quantizes data token using Px64, MPEG, or JPEG algorithm. |
| TFQUANT | Thresholds and forward quantizes data token using Px64 or MPEG alg. |
| CFQUANT | Forward quantizes data token using Px64 or MPEG alg. and clipping control. |
| CTFQUANT | Thresholds and forward quantizes using Px64 or MPEG alg. and clipping control. |
| IQUANT | Inverse quantizes data token using Px64, MPEG, |

TABLE 3-continued

ICC Instruction Set Summary

| Mnemonic | Description |
|---|---|
| | or JPEG algorithm. |
| MEANSQ | Computes mean square value of selected component in data token. |
| VAR | Computes variance of selected component in data token. |
| ADAPTQ | Adapts MPEG or Px64 quantizer based on relative image activity. |

Scalar Instructions

DCU Processor

| Mnemonic | Description |
|---|---|
| SUBVAL | Subtracts two scalar values. |
| CMPVAL | Compares two scalar values. |
| TSTVAL | Compares an unsigned scalar value against a constant. |
| TSTDSCR | Compares an arbitrary token descriptor field against a constant. |
| TSTCNTR | Compares a token descriptor counter field against a constant. |
| BOOL | Performs a logical operation on two boolean scalar values. |
| COPY | Copies all or part of a token. |
| CRTOKEN | Creates a control token. |
| INCCNTR | Unconditionally increments selected counter in token descriptor. |
| CINCCNTR | Conditionally increments selected counter in token descriptor. |
| ADDCNTR | Adds counters from two token descriptors. |
| COPYFLD | Copies an arbitrary token descriptor field from one token to another. |
| SETDSCR | Unconditionally sets a token descriptor field to a specified constant. |
| CSETDSCR | Conditionally sets a token descriptor field to a specified constant. |
| SETQUANT | Sets the token descriptor quantizer field to the contents of a register. |
| DGATE1 | Gates token based on value of token descriptor field in same token. |
| DGATE2 | Gates token based on value of token descriptor field in another token. |
| CGATE | Gates token based on value of token descriptor counter field in same token. |
| MINIMAX | Selects the minimum or maximum of two scalar values. |
| GATE | Gates token based on logical value of another token. |
| FGATE | Gates token based on state of global flag. |

Semaphore Instructions

| Mnemonic | Description |
|---|---|
| INITSEM | Initializes contents of semaphore register. |
| TSTSEM | Suspends dataflow until masked descriptor field matches masked semaphore. |
| TSTDEC | Suspends dataflow until semaphore is greater than or equal to constant, then decrements semaphore. |
| INCSEM | Adds a constant to the contents of a semaphore register. |

VIU Processor

| Mnemonic | Description |
|---|---|
| RDV16 | Reads data token from memory connected to video bus in 16 bit mode. |
| RDV16FMV | Reads data token from memory connected to video bus in 16 bit mode using forward motion vector from token descriptor. |
| RDV16BMV | Reads data token from memory connected to video bus in 16 bit mode using backward motion vector from token descriptor. |
| WRV16 | Writes data token to memory connected to video bus in 16 bit mode. |
| WRV16.S | Writes data token to memory connected to video bus in 16 bit mode and signals completion by returning a control token. |
| RDV32 | Reads data token from memory connected to video bus in 32 bit mode. |
| RDV32FMV | Reads data token from memory connected to video bus in 32 bit mode using forward motion vector from token descriptor. |
| RDV32BMV | Reads data token from memory connected to video bus in 32 bit mode using backward motion vector from token descriptor. |
| WRV32 | Writes data token to memory connected to video bus in 32 bit mode. |
| WRV32.S | Writes data token to memory connected to video bus in 32 bit mode and signals completion by returning a control token. |

RPU Processor

| Mnemonic | Description |
|---|---|
| RUNENC | Zig-zags and run-codes data token into sequence of (run,level) pairs for transfer to host processor; no output token is produced. |
| RUNENC.S | Same as RUNENC, except produces output control token. |
| RUNDEC | Run-decodes and inverse zig-zags sequence of (run,level) pairs received from host and creates data token from the result. |

TIU Processor

| Mnemonic | Description |
|---|---|
| SNOOP | Copies token into SNOOP buffer for transfer to host. |
| SNEAK | Creates token from contents of SNEAK buffer. |

More detailed descriptions of each of the instructions is set forth in Appendix 1 attached hereto.

Programs

ICC programs consist of data-driven instruction flow graphs whose "nodes" execute based on the availability of their data operands. This data-driven approach to program structure and execution, coupled with the ICC's parallel computing architecture, allows the ICC to deliver the extremely high throughputs required for real-time image compression without compromising algorithm flexibility.

Programs are downloaded into the ICC's instruction memory via the host processor interface. After downloading, the host enables the program for execution, whereupon instructions execute automatically based on operand availability. Instructions typically operate on packets or "tokens" of image data obtained from either other instructions, video memories or the host processor, and produce result tokens.

The ICC instruction set is specifically designed to handle the real-time compression algorithm programming requirements of industry standards such as Px64 (also known as H.261), MPEG, and baseline JPEG. ICC instructions are divided into six classes: Arithmetic instructions perform operations such as addition, subtraction, forward and inverse DCT (discrete cosine transform), and forward and inverse quantization; Logical instructions perform boolean and token copying operations; Descriptor Modification instructions allow descriptive information about a token to be altered; Video Memory instructions transfer tokens of image data between the ICC and video memories; Dataflow Control instructions control the passing of tokens between instructions based on data- or flag-dependent conditions; and Host Interface instructions allow data to be flexibly transferred between the ICC and its host processor.

The ICC and its host microprocessor cooperate jointly during the execution of an image compression algorithm. The ICC is completely responsible for the execution of the program downloaded into its instruction memory, and at various times during program execution, the ICC may be forced to communicate with the host in order to transfer compressed image data or obtain critical control information. The ICC requests host attention using either host-pollable flags or interrupts, if they are available. From the host's point of view, the ICC is a highly autonomous slave coprocessor which performs all of the computationally-intensive portions of the image compression algorithm. The host sets general operational parameters within the ICC and performs operations such as Huffman encoding and decoding which are not handled by the ICC.

Utilization of the ICC's video bus is directly under programer control. One or more physically distinct video memories may be connected to the bus which may be configured to be either 32 or 16 bits wide on an instruction-wise basis. Multiple bus masters may reside on the same video bus, with contention being resolved by a daisy-chained arbitration scheme. The video interface is optimized for use with fast page mode DRAM and/or VRAMs, supporting the functions of normal read/write transfers, refresh, and additionally for VRAMs, SAM-to-DRAM and DRAM-to-SAM transfers. The interface's 11 bit address and 32 bit data busses can access an image of up to 4096 by 4096 pels and read or write a 16 by 16 pel block in under 5 μsec.

The ICC's auxiliary bus interface can be connected to up to four external processor units. Auxiliary processors may be connected to the ICC to provide additional functions not supported by the ICC (such as motion estimation) or to accelerate functions that already are supported. An example of an auxiliary processor is a Motion Estimation Coprocessor (MEC).

DATAFLOW CONTROL UNIT (FIG. 8)

The DCU 418 is responsible for scheduling the token traffic between the various functional units and for executing the DCU's scalar and semaphore instructions (see Table 3). The controller is composed of four principal units. These units are Update Unit 812, Enabled Instruction Queue 814, Global Bus Interface Unit 816, and Token Memory Unit 810.

Update Unit 812 continuously monitors the execution state of all instructions. When an instruction completes execution, Update Unit 812 locates its destination instructions and schedules them for execution when data and processing resources are available. Update Unit 812 also is responsible for performing the first portion of semaphore instruction execution.

The Enabled Instruction Queue 814 receives executable instructions from Update Unit 812 and holds them until Global Bus Interface Unit 816 is ready to process them. This decouples the scheduling of instructions from their distribution to the functional units allowing several executable instructions to exist at one time.

The Global Bus Interface Unit 816 performs several functions. Upon receiving a new instruction from Enabled Instruction Queue 814, it either fetches the necessary tokens from Token Memory Unit 810 and sends them along with the instruction to the proper functional unit for execution, or if the instruction is a scalar or semaphore instruction, it executes it and returns the result to Token Memory Unit 810. When a functional unit finishes execution, Global Bus Interface Unit 816 receives a result token (if any), forwards it to Token Memory Unit 810, and notifies Update Unit 812 that the instruction has completed processing.

Token Memory Unit 810 consists of four major parts: Block Allocation Unit (BAU) Memory 818, Header Memory 820, Token Address Memory 819, and Memory Allocation 822. The BAU Memory 818 contains the data blocks from data tokens which have completed processing and are waiting to be sent to functional units. Header Memory 820 contains the token descriptor of each data or control token. Token Address Memory 819 associates BAUs in BAU Memory 818 with token descriptors in Header Memory 820 and also associates token descriptors with the instructions which created them. Memory allocation 822 allocates memory space in Header Memory 820 and BAU Memory 818 for new token descriptors and BAUs, respectively, and deallocates memory space as data are sent to functional units.

Figure 9:
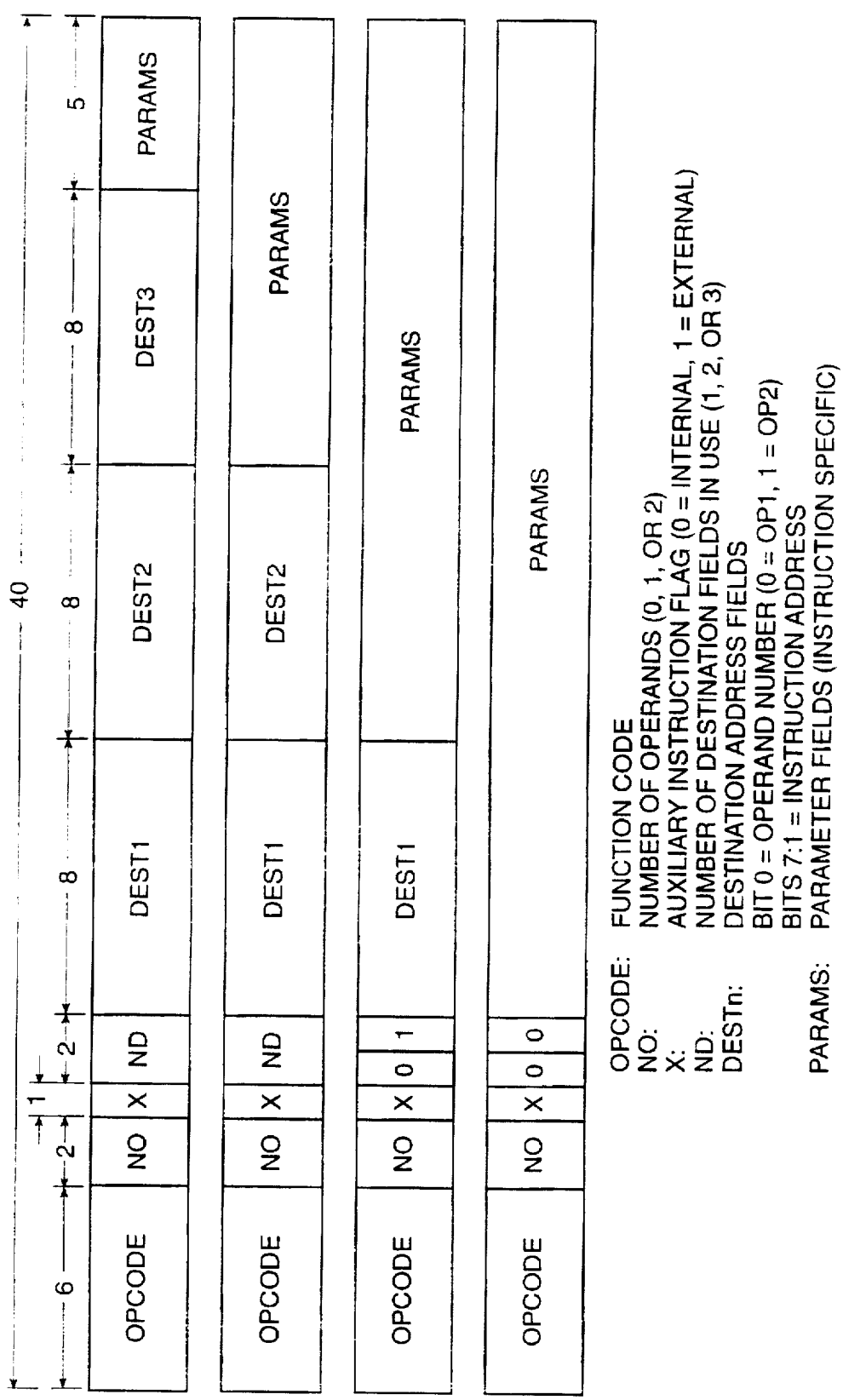
FIG. 9 is a diagram of the instruction fields for the data flow instructions of the present invention.

ICC instructions reside in an on-chip, 128 word by 40 bit instruction RAM 824 which is loaded by the host processor prior to program execution. As shown in FIG. 9, each ICC instruction occupies a single 40 bit word but can have one of four different formats. The four formats are differentiated by the number of destination instruction addresses each can hold: 3, 2, 1 or 0.

Instructions must occupy a contiguous block of memory within the instruction RAM beginning at address 0. In general, instructions can be ordered in any fashion within this RAM except that all CRTOKEN instructions must be positioned beginning at address 0 and must sequentially precede any other type of instruction.

Instructions can have opcodes that are executed by the ICC 410 itself (X=0) or by auxiliary (i.e., external) processors (X=1) which are connected to the ICC's auxiliary bus interface. The Auxiliary Interface Unit (AIU) 430 on the ICC is responsible for managing up to four auxiliary processors simultaneously. The least significant two bits of each six bit external opcode are decoded by the AIU to select the appropriate auxiliary processor.

In operation, for the ICC to do a compression or decompression function, a program is loaded into the data flow control unit from an external host computer through the host interface. The program is stored in instruction memory 824 of FIG. 8. The instructions are a series of instructions from among those set forth in Appendix 1, and each has a format among those set forth in FIG. 9.

Figure 10:
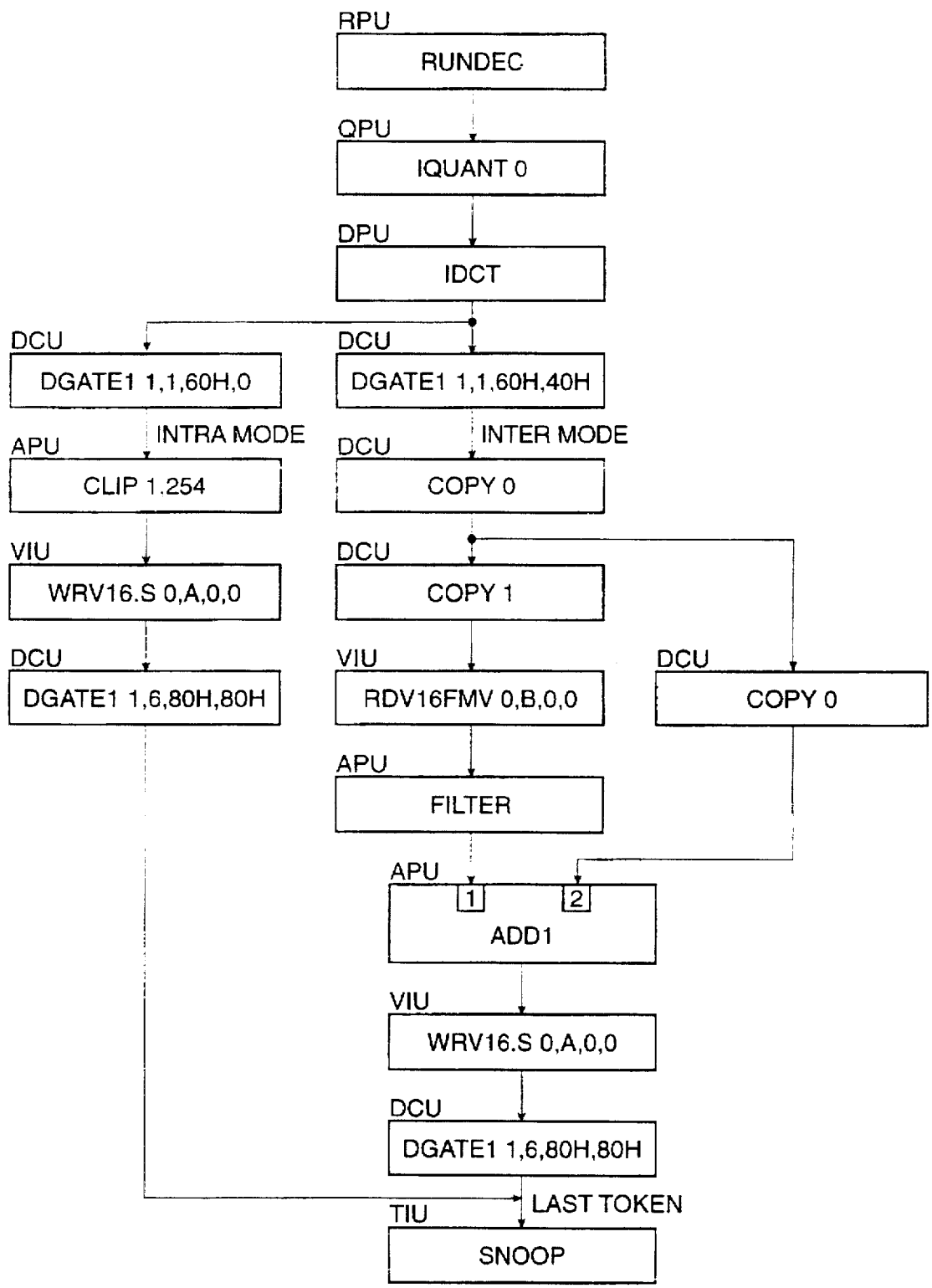
FIG. 10 is a data flow chart for a typical data flow program of the present invention.

An example of a decoder algorithm program is shown in FIG. 10. Each of the blocks in FIG. 10 indicates the particular instruction to be executed, and is set forth in data flow format. Each instruction operates on all the data within any operand tokens, or if no operand tokens are required, it operates on data from some other source. For example, the first instruction in FIG. 10, "RUNDEC", creates a result token from data in the RPU's rate buffer which was placed there by the host processor. When that result token is available, the next instruction operates on that token, and so on. Meanwhile, the RUNDEC instruction can operate on the next available RPU data.

Figure 8:
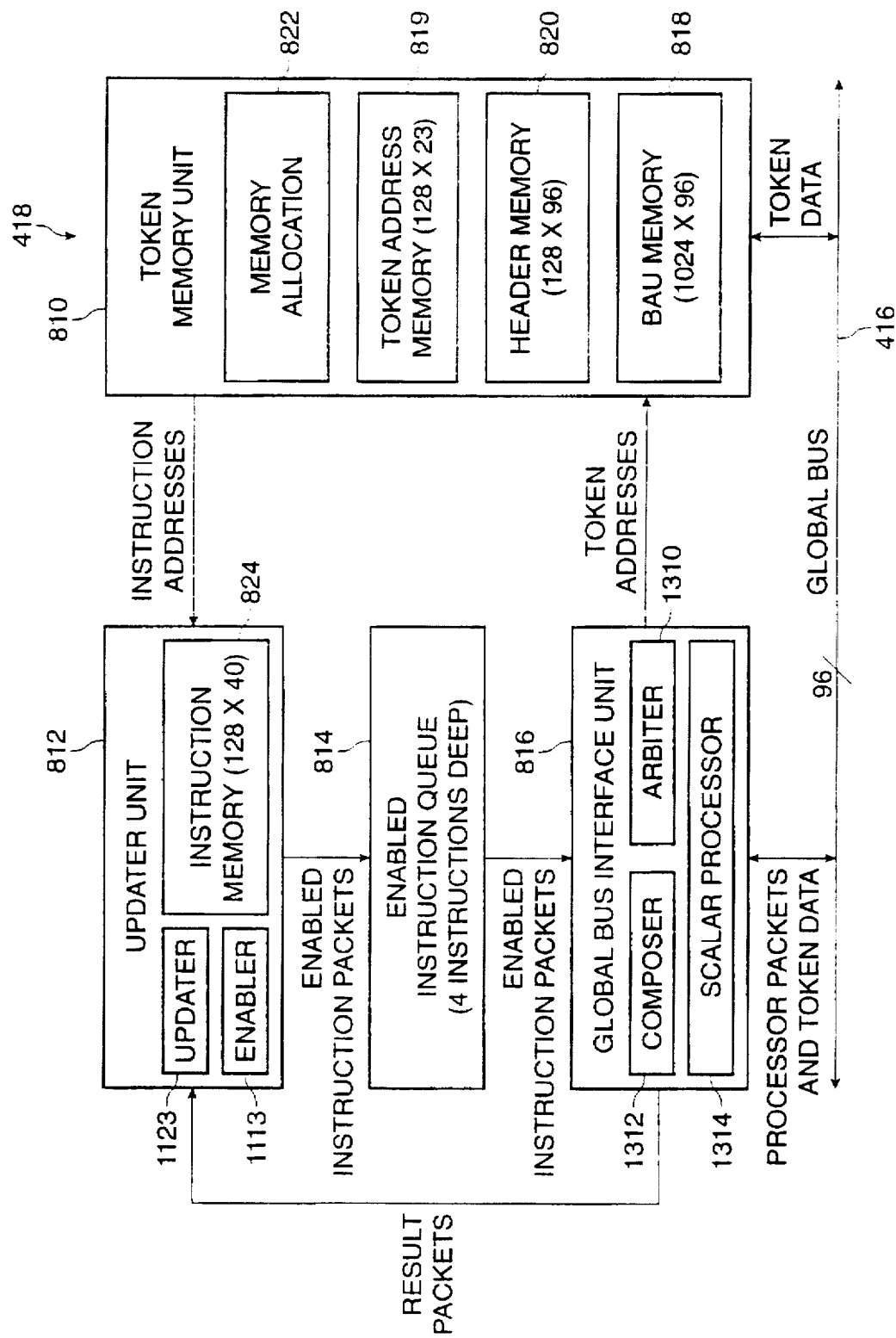
FIG. 8 is a block diagram of the data flow control unit of FIG. 4.

Any data blocks making up each result token are transferred from the processing unit executing each instruction into BAU Memory 818 of FIG. 8 and stored in the vector format set forth in Table 2. The token descriptor associated with each token is stored in Header Memory 820. The format of the token descriptor is set forth in Table 1. Token Address Memory 819 is written with the address of the instruction creating the token and additionally for each data token, the number of BAUs storing the token's data blocks and the addresses of the BAUs in BAU Memory 818.

Figure 11:
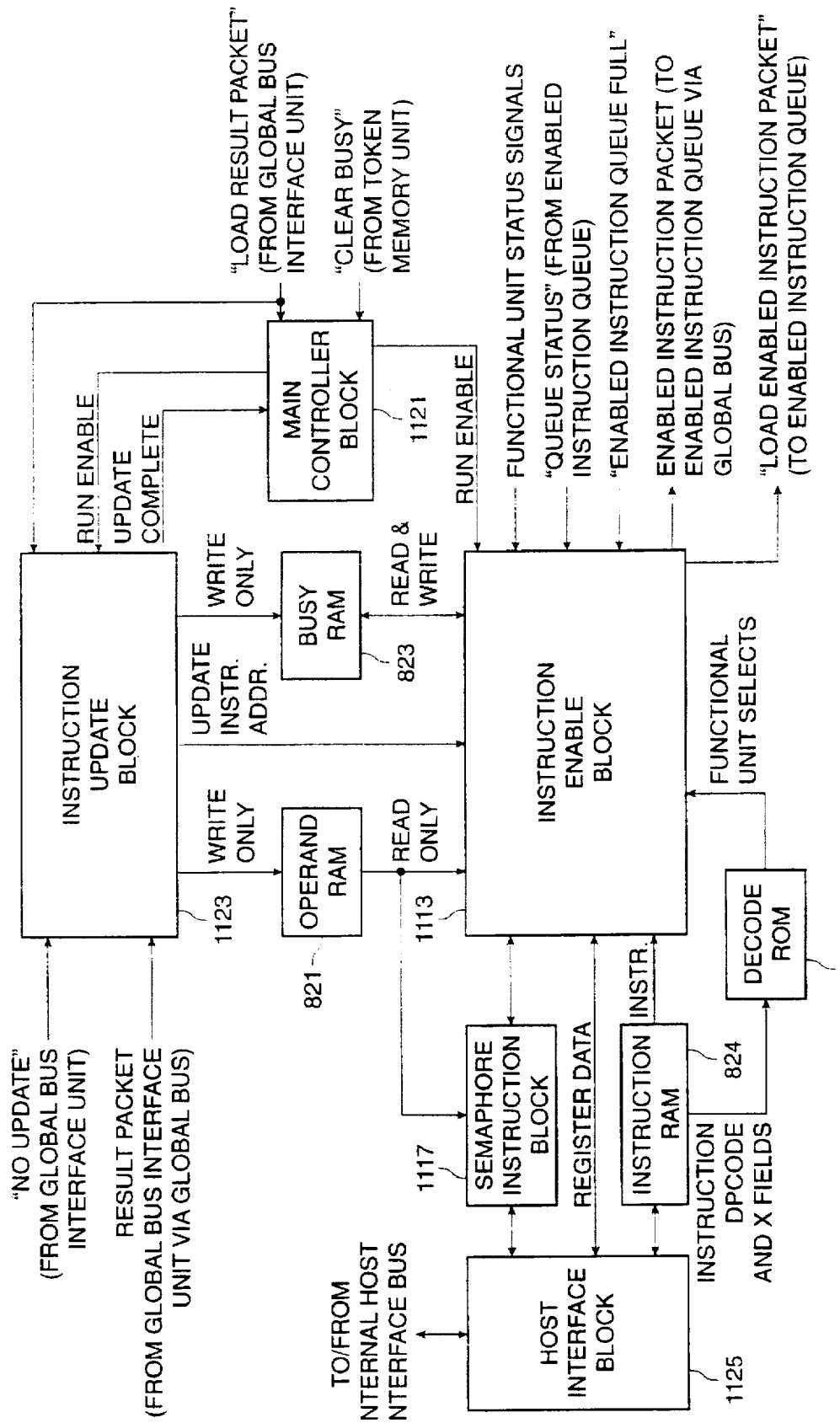
FIG. 11 is a block diagram of the update unit of FIG. 8.

Instructions are stored in Instruction RAM 824. The addresses of the token operands (if any) needed to execute each instruction as well as each instruction's operational status are stored in Operand RAM 821 and Instruction Busy RAM 823 of Update Unit 812 (see FIG. 11). When the operands of a particular instruction in Instruction RAM 824 are ready as indicated by the "operand present" bits in Operand RAM 821 (and certain other ancillary conditions are satisfied), the instruction is transferred by Update Unit 812 into Enabled Instruction Queue 814 along with the operand addresses. The instruction and related information are later read from Enabled Instruction Queue 814 and forwarded to Global Bus Interface Unit 816.

Figure 3E:
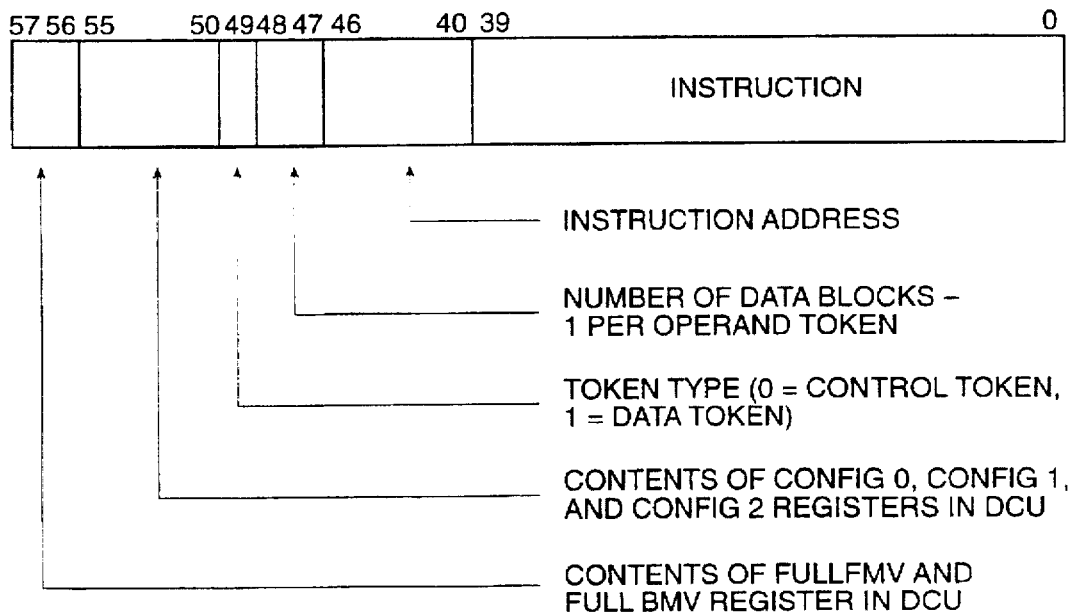

Global bus interface 816 puts the instruction into a processor packet as shown in FIG. 3E for transmission on the global bus. The operand data associated with the instruction is retrieved from Token Memory Unit 810 and assembled into tokens using the descriptors from Header Memory 820 and the vector data itself from BAU Memory 818. Both the processor packet and operand tokens are then sent by Global Bus Interface Unit 816 to the processing unit responsible for executing the instruction.

After a processing unit has processed the data as directed by the instruction, result tokens are returned to DCU 418. The data from the result tokens are placed back into Token Memory Unit 810 with Update Unit 812 receiving the result token's header memory address from Token Memory Unit 810 and the address of the instruction which created the result from Global Bus Interface Unit 816. The Update Unit reads the destinations from the creating instruction and places the token header address in the proper operand address field of each destination instruction. The updated instruction is enabled for execution when all its required operands are present.

An enabled instruction is said to be fired when its enabled instruction packet is assembled and sent to Enabled Instruction Queue 814. An instruction is generally fired if all the following conditions are met (some instructions only require condition 3):

1. The processor it is to be issued to is idle.
2. There is not another instruction for the same processor in Enabled Instruction Queue 814.
3. The instruction's "busy bit" is not set in Instruction Busy RAM. This means that the instruction is not currently being executed and no results remain in Token Memory Unit 810 from a previous execution of the instruction.

All instructions which have been fired have their instruction busy bit set. This bit is not cleared until the result token (if any) created by the instruction has been used by all of its destination instructions.

THE UPDATE UNIT (FIG. 11)

Update Unit 812 is primarily responsible for initiating and terminating the execution of instructions on the various functional units of the ICC. It is also responsible, in conjunction with the Scalar Processor Unit within Global Bus Interface Unit 816, for the execution of the so-called semaphore instructions INITSEM, TSTSEM, INCSEM, and TST-DEC. Update Unit 812 consists of the following major blocks:

1. Main Controller Block 1121
2. Host Bus Interface Block 1125
3. Instruction Enable Block 1113
4. Semaphore Instruction Block 1117
5. Instruction Update Block 1123
6. Instruction RAM 824
7. Instruction Decode ROM 1111
8. Operand RAM 821
9. Instruction Busy RAM 823

Instruction RAM 1118 is 40 bits wide by 128 words long; each word contains a single ICC instruction formatted as shown in FIG. 9. This RAM is typically loaded by an external host processor through internal host bus 413 during system initialization.

Instruction Decode ROM 1111 is 11 bits wide by 128 words long. Instruction Enable Block 1113 addresses it using the concatenation of an instruction's 6 bit OPCODE and 1 bit X fields. Each word of the ROM has only a single bit set to "1" which indicates which internal ICC functional unit or external processor unit is required to execute the instruction. An instruction whose X bit is set to "1" is an "external" instruction requiring execution by an off-chip functional unit (i.e., a functional unit which is physically not part of the ICC).

Operand RAM 821 is 21 bits wide by 128 words long and has one word for every instruction in Instruction RAM 1118; each word is formatted as shown in FIG. 3A and is set to zero whenever the ICC is reset. The data stored in bits 20 through 16 of each word are used by Semaphore Instruction Block 1117 during the execution of semaphore instructions. Bits 15 through 0 are used by Instruction Enable Block 1113 to determine if all of the corresponding instruction's required operand tokens (if any) currently reside in Token Memory Unit 810 and if so, what their addresses are in Token Address Memory 819 of Token Memory Unit 810.

Instruction Busy RAM 823 is 1 bit wide by 128 words long and has one word for every Instruction in Instruction RAM 824. As in Operand RAM 821, each word in this RAM is set to zero whenever the ICC is reset. If a word in this RAM is set to "1", it indicates that one of the following conditions is true:

1. The corresponding instruction has been scheduled for execution (i.e., the instruction resides in Enabled Instruction Queue 814);
2. The corresponding instruction is currently executing on a functional unit; or
3. The corresponding instruction has a result token residing in Token Memory Unit 810 which has not yet been used by all of its destinations.

Main Controller Block 1121 coordinates activities within Update Unit 812 and activates the execution of either Instruction Enable Block 1113 or Instruction Update Block 1123. Instruction Enable Block 1113 is initially activated when a program starts running.

Host Bus Interface Block 1125 holds various DCU registers and interfaces them to both the ICC's internal host bus and other portions of the DCU which use them. The internal host bus connects with Host Interface Unit 412 which allows the external host processor controlling the ICC to access various ICC registers and memories. Registers in this block include the four semaphore registers SEMREG(0) through SEMREG(3), the "last program address register" LASTADDR, component configuration registers CONFIG0, CONFIG1, and CONFIG2, the processor status register PSW, and the error status register ERRSTAT. Host Bus Interface Block 1125 also interfaces the internal host bus to Instruction RAM 824.

Instruction Enable Block 1113 within Update Unit 812 is responsible for "enabling" each instruction in Instruction RAM 824 for execution at the appropriate time. Generally speaking, an instruction is enabled for execution when it satisfies all of the following "enabling" conditions:

1. All of its required operand tokens (if any) reside in Token Memory Unit 810.
2. The instruction's corresponding entry in Instruction Busy RAM 823 is 0.
3. Any special enabling conditions required by the instruction are satisfied.

Instruction Enable Block 1113 tests Condition (1) for a given instruction by examining the instruction's "number of operands" (NO) field to determine whether it requires any operands and then examining the instruction's "operand present" bits in Operand Memory 821 to determine whether the operands reside in Token Memory 810. The "special enabling conditions" tested in Condition (3) depend on the instruction's OPCODE. Instructions having such conditions either have no token operands or require some logical condition(s) to be satisfied in addition to having their operand tokens present in Token Memory Unit 810. Instructions in the former category are CRTOKEN, RUNDEC, and SNEAK, while the semaphore and SNOOP instructions fall in the latter category. External instructions may fall in either category.

Instructions "enabled" by Instruction Enable Block 1113 are used to form a 72 bit "enabled instruction packet" (FIG. 3C) which Instruction Enable Block 1113 then attempts to put into Enabled Instruction Queue 814. This attempt is generally successful if all of the following "queuing" conditions are true:

1. The functional unit required to execute the instruction is idle.
2. Enabled Instruction Queue 814 does not currently contain the enabled instruction packet from another instruction requiring the same functional unit as the incoming instruction.
3. Enabled Instruction Queue 814 is not full.

The DCU instructions listed in Table 3 are an exception; they only require that Condition (3) above be satisfied before they are put into Enabled Instruction Queue 814.

The address of the instruction currently being examined by Instruction Enable Block 1113 for enabling is normally given by the contents of the 7 bit "enabled instruction counter" (en_counter); in some circumstances, this address is instead provided by Instruction Update Block 1123. The en_counter is reset to zero when the ICC is reset. The en_counter continually increments by "1" (even while Instruction Enable Block 1113 is not running) until its contents match the "last program address" register, LASTADDR, at which point it resets to zero and starts incrementing again.

Instruction Enable Block 1113 uses a three-stage pipeline to enable instructions and write their enabled instruction packets into Enabled Instruction Queue 814; each pipeline stage requires one processor clock to execute. In the first pipeline stage, Instruction Enable Block 1113 checks the three enabling conditions previously discussed. The first two conditions are checked for every instruction; however, at this stage, "special enabling conditions" are checked only for CRTOKEN, RUNDEC, and SNEAK instructions. A so-called "enable" bit is set to "1" in an output register of the first pipeline stage when an instruction passes all of its first stage enabling conditions.

The CRTOKEN instruction is unique in that each instance of it in a program can only execute once. The CRTOKEN instruction does not have an operand token, and its purpose is to create a single token when a program is started so as to "bootstrap" the execution of the rest of the program. To implement this behavior, Instruction Enable Block 1113 contains a special 1 bit register, and the first pipeline stage of Instruction Enable Block 1113 will not enable a CRTOKEN instruction unless this register is set to zero. This register is set to zero whenever the ICC is reset; it is set to "1" the first time Instruction Enable Block 1113 tries to enable an instruction which is not a CRTOKEN instruction and remains set to "1" until the ICC is reset again. A program may contain up to three CRTOKEN instructions, and all of them must be successively located in Instruction RAM 824 starting at address 0.

Like CRTOKEN, the RUNDEC and SNEAK instructions do not have operand tokens. RUNDEC is executed by the ICC's Run Length Processor Unit (RPU). To enable RUNDEC, Instruction Enable Block 1113 checks a status signal which is asserted by the RPU when the RPU's input FIFO is not empty. Similarly, to enable SNEAK, Instruction Enable Block 1113 checks a status signal which is asserted by the Token Interface Unit (TIU) when the TIU's token passing buffer contains a new token from the host processor.

In the second pipeline stage of Instruction Enable Block 1113, the special enabling conditions for SNOOP, semaphore, and external instructions are checked, as are the first two queuing conditions. A so-called "busy" bit is set to "1" in an output register of the second pipeline stage when all of the conditions checked for an instruction are true and the instruction's enable bit from the first pipeline stage is also set to "1".

SNOOP instructions are executed by the TIU. To enable a SNOOP instruction, the second pipeline stage checks a status signal which is asserted by the TIU when the TIU's token passing buffer is empty and ready to receive a new token. The token is provided by the SNOOP instruction's operand whose existence was previously verified in the first pipeline stage.

Figure 24:
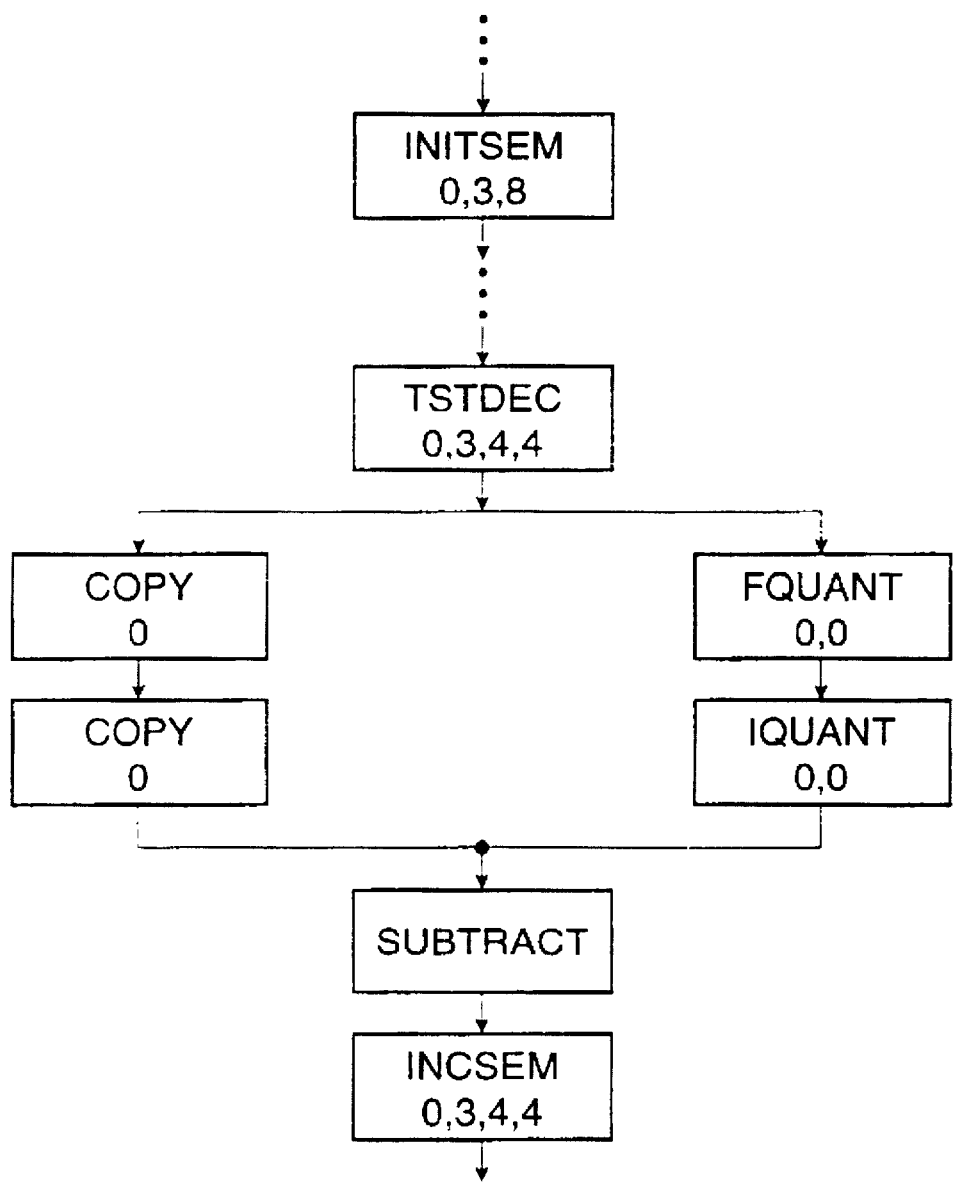
FIGS. 24–26 are diagrams illustrating the use of semaphores in the present invention.

External instructions are passed to off-chip functional units via the ICC's Auxiliary Processor Interface Unit (AIU) shown in FIG. 24. The AIU is responsible for communicating with up to four external processor chips, each of which can contain up to four concurrent functional units. The external processor chip needed to execute an external instruction is specified by the least significant 2 bits (bits 1 and 0) of the external instructions's 6 bit OPCODE field, while the functional unit within the processor is specified by bits 3 and 2 of OPCODE.

The AIU contains External Instruction Status Table 2415, which is a 1 bit wide by 16 words long RAM. This RAM is cleared whenever the ICC is reset and is read by Instruction Enable Block 1113 to determine whether the off-chip functional unit required to execute an external instruction is idle. During the second pipeline stage, this RAM is addressed using the least significant 4 bits of an external instruction's OPCODE field. If this word is zero, the corresponding functional unit within the corresponding external processor chip is idle. If both the off-chip functional unit and the AIU are idle, and the second queuing condition is satisfied, the second pipeline's busy bit is set to "1".

A semaphore instruction tests and/or manipulates the contents of one of the ICC's four semaphore registers and then copies its operand token to its output; for the TSTSEM and TSTDEC instructions, the latter copying operation is delayed until certain semaphore tests are satisfied. Semaphore instructions enabled in the first pipeline stage are detected in the second pipeline stage and set to Semaphore Instruction Block 1117 for further condition checking and partial execution.

In the case of the INITSEM instruction, Semaphore Instruction Block 1117 simply sets the semaphore register bits selected by two instruction parameters to the value given by a third instruction parameter. With the INCSEM instruction, it adds one of two instruction parameters to the semaphore register bits selected by two other instruction parameters; the parameter selected for the addition is in turn determined by the state of the most significant bit (bit 20) of the instruction's corresponding word in Operand RAM 821. After processing either INITSEM or INCSEM, Semaphore Instruction Block 1117 sets its "semaphore busy" (sem_bz) signal to "1" back to Instruction Enable Block 1113.

In the case of the TSTDEC instruction, Semaphore Instruction Block 1117 subtracts one of two instruction parameters from the semaphore register bits selected by two other instruction parameters; the parameter selected for the subtraction is in turn determined by the state of the most significant bit (bit 20) of the instruction's corresponding word in Operand RAM 821. If this difference is greater than or equal to zero, the contents of the selected semaphore register bits are replaced by the difference, and sem_bz is set to "1". If the difference is less than zero, the selected semaphore register is left unchanged, and sem_bz is set to zero.

Finally, in the case of the TSTSEM instruction, Semaphore Instruction Block 1117 selects semaphore register bits using two instruction parameters, masks these bits using a third parameter, and then compares them with the states of bit 19 through 16 of the instruction's corresponding word in Operand RAM 821 after these bits have also been masked by the third parameter. If this comparison results in a match, sem_bz is set to "1"; if not, sem_bz is set to zero.

After Semaphore Instruction Block 1117 finishes processing a semaphore instruction, the second pipeline stage of Instruction Enable Block 1113 sets its busy bit to have the same value as sem_bz. The token copying operation of a semaphore instruction is executed by the Scalar Processor Unit (SPU) in Global Bus Interface 816 after the instruction is sent to Enabled Instruction Queue 814; the SPU reads the semaphore instruction from the queue and treats it like a COPY instruction.

In the third and last pipeline stage of Instruction Enable Block 1113, the third queuing condition is checked, as is the state of the busy bit from the second pipeline stage. If Enabled Instruction Queue 814 is not full and the pipeline busy bit is set to "1", an enabled instruction packet is created for the instruction and set to Enabled Instruction Queue 814, and the instruction's corresponding word in Instruction Busy RAM is set to "1". If either Enable Instruction Queue 814 is full or the pipeline busy bit is set to zero, neither of the latter events takes place.

Instruction Update Block 1123 is activated whenever the "clear busy" (cl_bz) or "load result packet" (ld_res_pac) signal is asserted to Main Controller Block 1121 by Token Memory Unit 810 or Global Bus Interface Unit 816, respectively. These signals cannot be simultaneously asserted. The cl_bz signal is asserted whenever a token usage count in Header Use Memory 1411 of Token Memory Unit 810 decrements to zero, indicating that the associated token is no longer needed by any instruction. In addition to asserting cl_bz, Token Memory Unit 810 also sends Instruction Update Block 1123 the address of the instruction which created the token; it reads this address from the seven most significant bits of the token's word in Token Address Memory 819. Instruction Update Block 1123 then sets the word at that address in Instruction Busy RAM 823 to zero, thereby allowing the corresponding instruction to be enabled again sometime in the future by Instruction Enable Block 1113.

The ld_res_pac signal is asserted by Bus Arbiter 1310 within Global Bus Interface 816 whenever it has a "result packet" ready from an instruction finishing execution and causes Main Controller Block 1121 to suspend Instruction Enable Block 1113 and activate Instruction Update Block 1123. The 54 bit result packet is formatted as shown in FIG. 3B and is normally used by Instruction Update Block 1123 to modify the location in Operand Memory 821 corresponding to each destination instruction of the instruction finishing execution. The result packet is sent over Global Bus 416 and stored in the "update register" within Instruction Update Block 1123.

The ld_res_pac signal is accompanied by another "no update" signal (no_update) which when asserted, indicates that the terminating instruction does not have a result token. Two cases are possible: either the instruction is guaranteed to never produce a result token because its ND field is zero (instructions in this category are RUNENC, SNOOP, WRV16, and WRV32) or it sometimes produces a result token (instructions in this category are the scalar instructions CGATE, DGATE1, DGATE2, FGATE, and GATE). In either case, Instruction Update Block 1123 extracts the address of the terminating instruction from the update register and sets the word at that location in Instruction Busy Memory 823 to zero. Since Token Memory Unit 810 never asserts the cl_bz signal for instructions which don't produce a result token, the latter operation is necessary to allow such instructions to be enabled again by Instruction Enable Block 1113.

When ld_res_pac is asserted and no_update is not, Instruction Update Block 1123 loads its "update counter" with the instruction's "number of destinations" field (ND) from the result packet, and starts the update state machine. The process of modifying Operand Memory 821 requires three clock cycles per destination, and each destination is processed in turn. During the first clock cycle, Operand Memory 821 is read at the location selected by the 7 bit "instruction address" portion of the appropriate destination field within the update register, and the fetched 21 bit word is stored in three registers; the 5 bit semaphore field is stored in a "semaphore register", while each of the 8 bit operand address fields is stored in an "operand address register". During the second clock cycle, the most significant bit of the operand address register selected by the 1 bit "operand select" portion of the appropriate update register destination field is set to "1" to indicate "operand present"; the least significant 7 bits of this same register are loaded with the "result address" field from the update register. The semaphore register is loaded with the most significant 5 bits from the update register. During the final clock cycle, the contents of the semaphore register and each of the two operand address registers are written back to Operand Memory 821 at the same location they were read from. The update counter is decremented by "1" each time a destination is processed; when this counter is zero, Instruction Update Block 1123 is deactivated, and Main Controller Block 1121 restarts Instruction Enable Block 1113.

The address of the last destination instruction (if any) processed by Instruction Update Block 1123 is passed to Instruction Enable Block 1113 when it is restarted, and this instruction is the first one Instruction Enable Block 1113 attempts to enable; however, the instruction's address is not loaded into the enable instruction counter, en counter. Thereafter, until the next time it is suspended in favor of Instruction Update Block 1123, Instruction Enable Block 1113 reverts to using en_counter as the source of instruction addresses.

Figure 12:
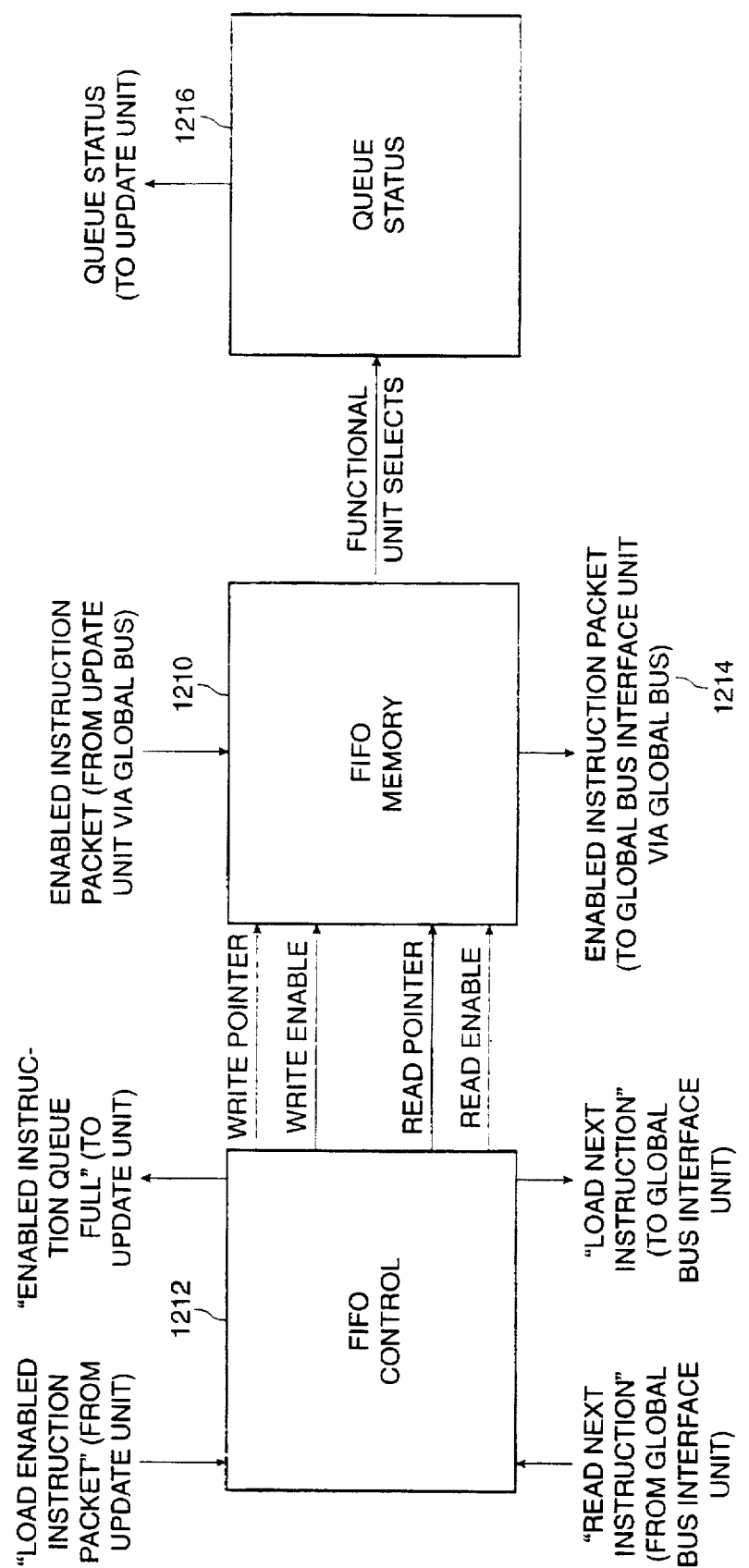
FIG. 12 is a block diagram of the enabled instruction queue of FIG. 8.
Figure 13A:
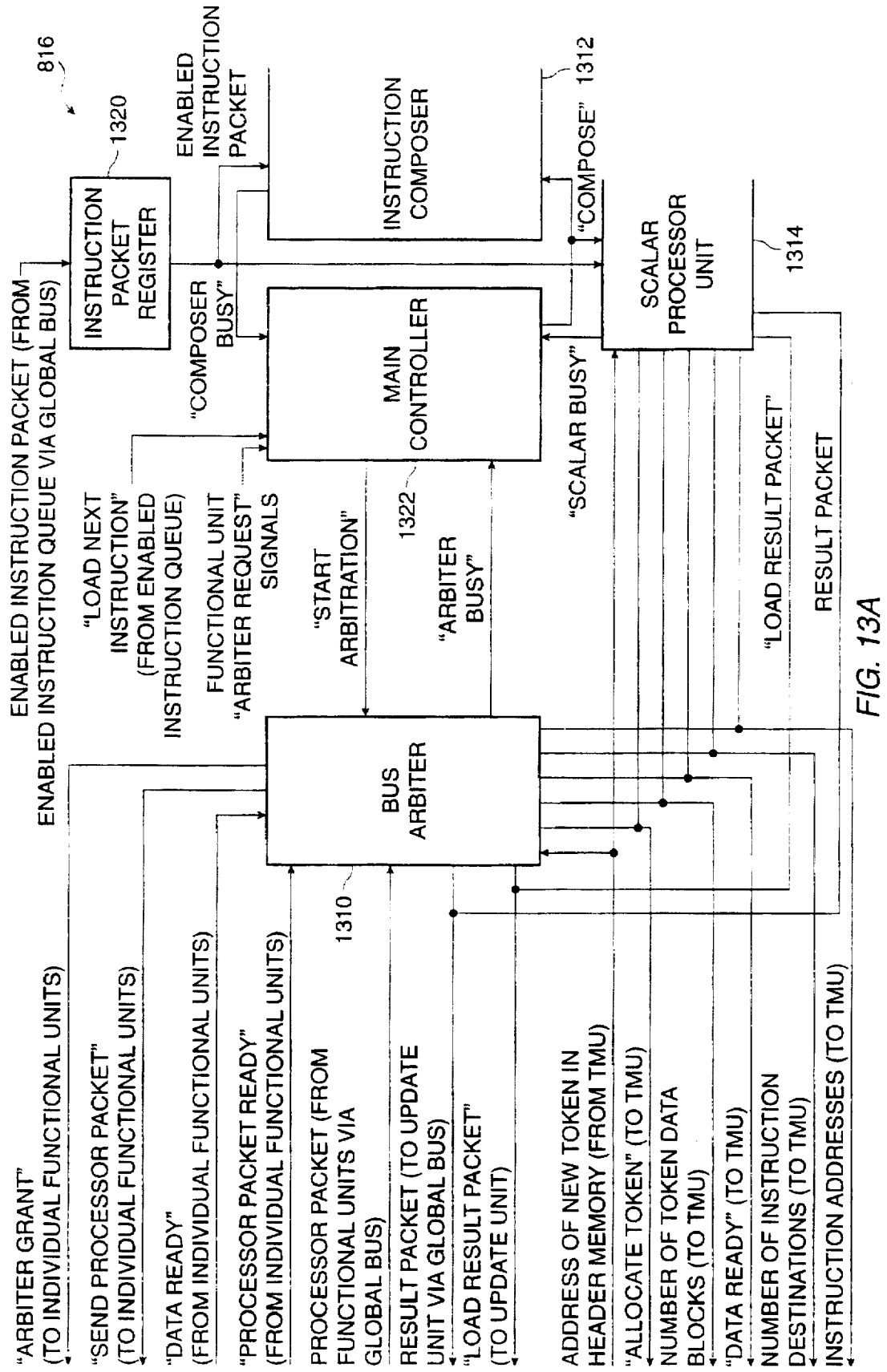
FIG. 13 is a block diagram of the global bus interface unit of FIG. 8.
Figure 13B:
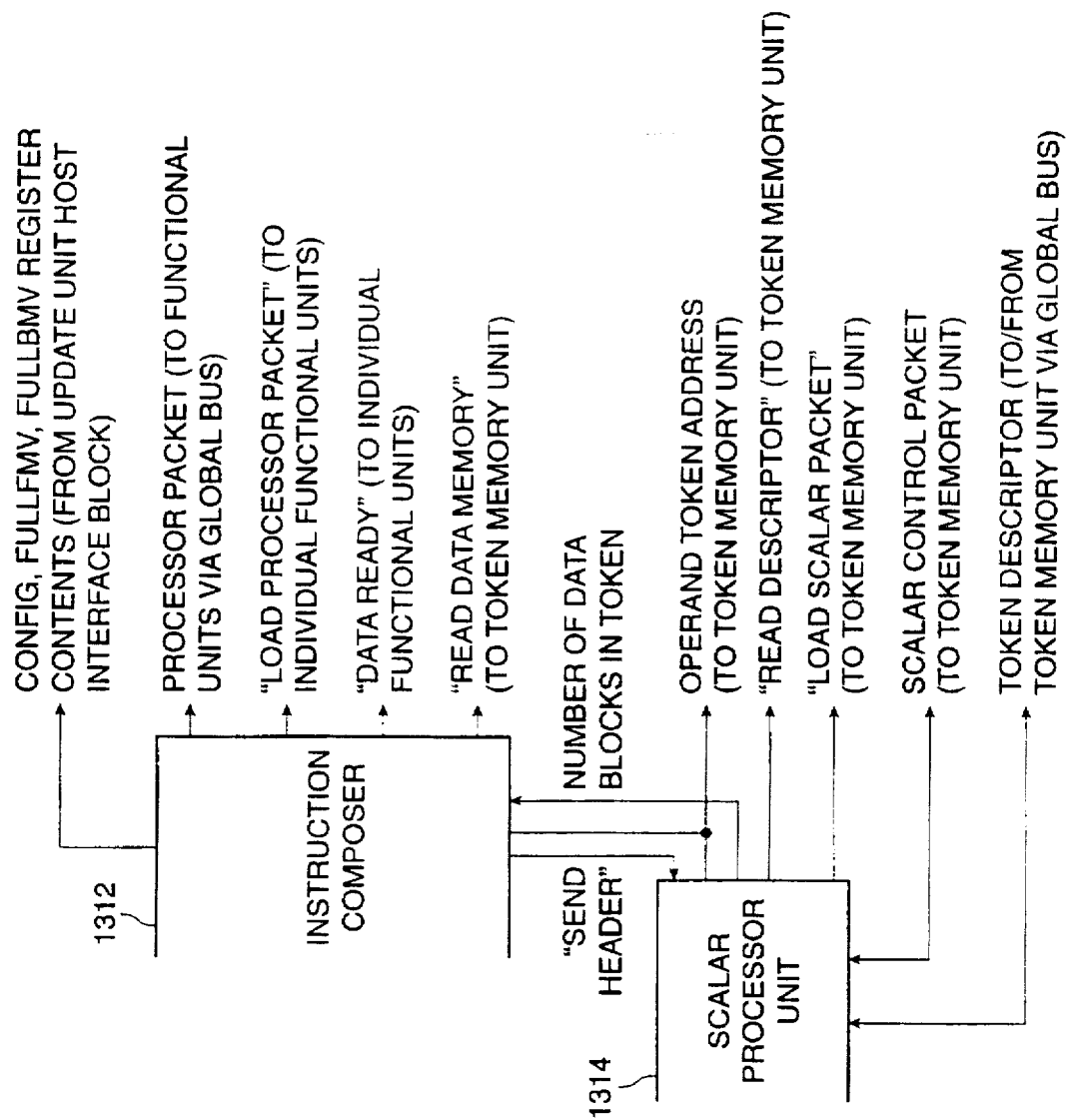

THE ENABLED INSTRUCTION QUEUE (FIG. 12):

Enabled Instruction Queue 814 (the "Queue"), shown in more detail in FIG. 12, serves as a memory buffer between Update Unit 812 and Global Bus Interface Unit 816. It is needed because several instructions can be enabled by Update Unit 812 in the time it typically takes for Global Bus Interface Unit 816 to dispatch instructions and operand tokens to functional units. Update Unit 812 strictly writes to the Queue, and Global Bus Interface Unit 816 strictly reads from it. The Queue consists of three primary blocks: FIFO Memory 1210, FIFO Control 1212, and Queue Status Block 1216.

FIFO Memory 1210 consists of four 72 bit registers. Each register can hold one enabled instruction packet, and one register may be read and another written at the same time. FIFO Control 1212 contains the necessary logic and registers to control access to FIFO Memory 1210 in a "first in—first out" fashion; this includes a two bit write pointer called "ld_ptr", a two bit read pointer called "rd_ptr", and a state machine which keeps track of whether FIFO Memory 1210 if empty, full, or partially full. Both ld_ptr and rd_ptr increment in wrap-around fashion (i. e., "3" is followed by "0") and are set to zero when the ICC is reset. The state machine asserts the "enabled instruction queue full" (en_inst_full) signal to Update Unit 812 when FIFO Memory 1210 is full, and asserts the "load next instruction" (ld_next_inst) signal to Global Bus Interface Unit 816 when this unit requests an enabled instruction packet and FIFO Memory 1210 is not empty.

Before requesting a write, Update Unit 812 checks the en_inst_full signal; if it is not asserted, Update Unit 812 then asserts the "load enabled instruction packet" (ld_en_inst_pac) signal to the Queue. The Queue responds by loading the enabled instruction packet from Update Unit 812 into the register of FIFO Memory 1210 selected by ld_ptr, and ld_ptr is then incremented by "1". FIFO Control 1210 then asserts en_inst_full if FIFO Memory 1210 is now full.

Global Bus Interface Unit 816 requests an enabled instruction packet from the Queue by asserting the "read next instruction" (rd_next_inst) signal. When FIFO Memory 1210 is not empty, the Queue then responds by asserting the ld_next_inst signal and outputting the register in FIFO Memory 1210 selected by rd_ptr onto Global Bus 416; rd_ptr is then incremented, and the state machine inside FIFO Control 1212 checks to see if FIFO Memory 1210 is now empty.

Queue Status Block 1216 continually monitors which functional units have instructions in the Queue, and reports this information to Update Unit 812 via the 11 bit "queue status" (unit_q_stat) output signal. A bit is set to "1" in unit_q_stat whenever the Queue contains an instruction to be executed by the functional unit corresponding to that bit position. The correspondence between bit positions and functional units is the same as that for Instruction Decode ROM 1111 within Update Unit 812.

THE GLOBAL BUS INTERFACE UNIT (FIG. 13):

The Global Bus Interface Unit 816 is built around four major blocks. These are the Bus Arbiter 1310, the Instruction Composer 1312, the Scalar Processor Unit (SPU) 1314, and the Main Controller 1322. The first two of these blocks are responsible for receiving and transmitting tokens, respectively, between the DCU and other functional units. The third block is capable of executing all instructions that manipulate the token descriptor. The fourth block interfaces to the Enabled Instruction Queue 814 and determines which of the other three blocks should be active. Of the first three blocks, only one can be active at a time. Preference is given to the Instruction Composer 1312 and Scalar Processor Unit 1314 since these blocks tend to empty token memory. If either of these blocks is not functioning and there is a request for Global Bus arbitration, the Bus Arbiter 1310 will function.

Figure 3F:
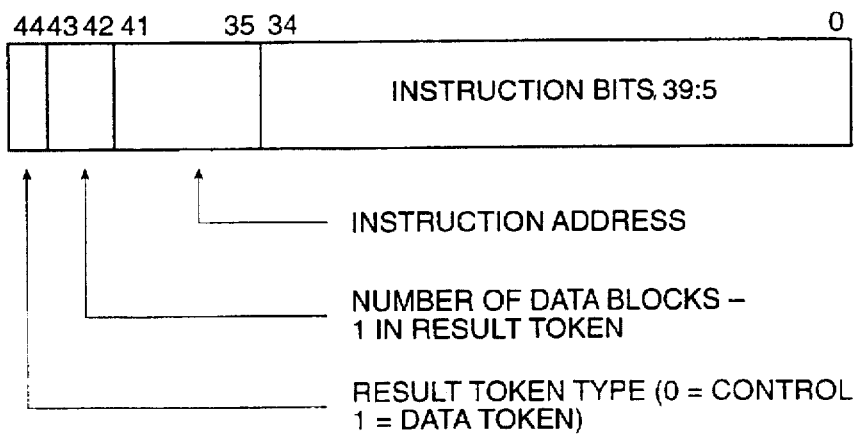
Figure 3G:
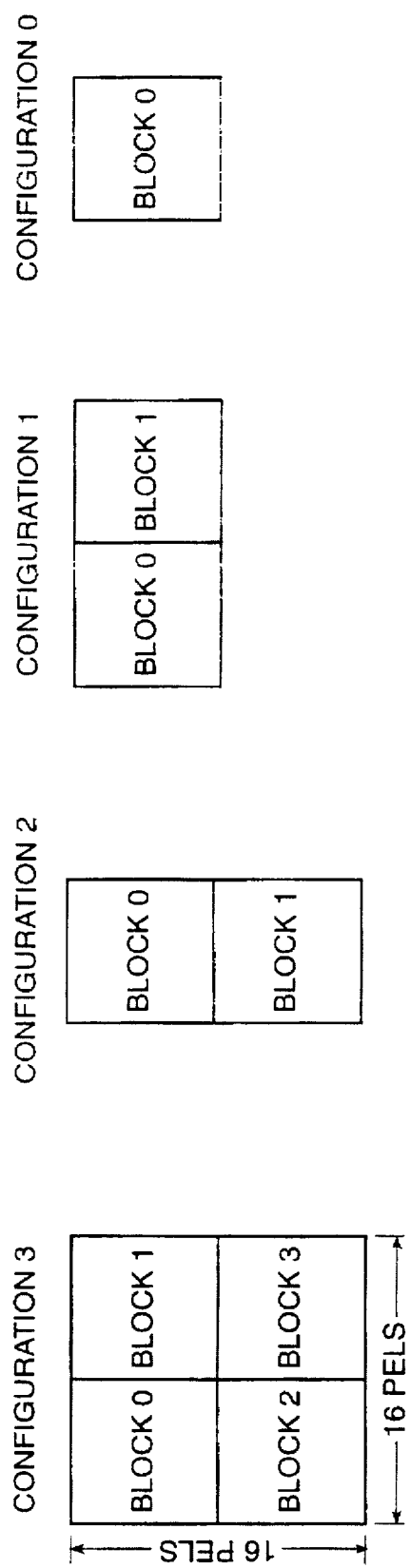
FIG. 3G is a diagram of different data block configurations.

The process of a non-SPU instruction completing execution and sending its result token (if any) back to DCU 418 begins with the functional unit of each such instruction asserting its "arbiter request" signal (arb_request) to Main Controller 1322. Main Controller 1322 subsequently signals Bus Arbiter 1310 which starts incrementing its arbiter grant counter (arb_grant_count). Each state of this counter corresponds to a functional unit. When this counter's state matches a functional unit requesting service, the counter stops and remains at that state until the next time Main Controller 1322 signals Bus Arbiter 1310 to respond to another functional unit. This mechanism ensures that each functional unit has equal access to Global Bus 416. Bus Arbiter 1310 then requests the matching functional unit to send a processor packet by asserting the unit's "send processor packet" signal (proc_pac_ld_out) and then waiting for the unit to respond by asserting both the "processor packet ready" signal (proc_packet_ready) and the processor packet itself on Global Bus 416. The processor packet is formatted as shown in FIG. 3F.

Bus Arbiter 1310 reads the processor packet and determines the number of words of token data the functional unit wishes to send. If the unit has a result token, Bus Arbiter 1310 then directs Token Memory Unit 810 to allocate memory space for the token and asserts the "arbiter grant" signal (arb_grant) to the selected unit. Bus Arbiter 1310 then waits for the unit to assert the "data ready" signal (data_ready) and send token data across Global Bus 416. All words transferred over Global Bus 416 are sent to Token Memory Unit 810 for storage. The end of the transfer is signalled by the functional unit deasserting data_ready, and Bus Arbiter 1310 subsequently deasserts arb_grant.

Bus Arbiter 1310 also forms a "result packet" from the processor packet sent by the functional unit and sends it to Update Unit 812. The result packet is formatted as shown in FIG. 3B and consists of the address of the instruction finishing execution, the storage address of the token in Token Memory Unit 810, and bits 3:0 of the cntrl field and bit 1 of the nblocks field from the result token's token descriptor; the five latter bits are used by Update Unit 812 in executing TSTSEM and TSTDEC semaphore instructions.

The transfer of tokens out of the controller is accomplished by the Instruction Composer 1312. The Main Controller begins by asserting the "read next instruction" signal (rd_next_inst) to enable Instruction Queue 814.

When Enabled Instruction Queue 814 is ready to output a new instruction, it asserts the "load next instruction" signal (ld_next_inst) to Main Controller 1322, and the instruction's enabled instruction packet is loaded into Instruction Packet Register 1320. Main Controller 1322 then asserts "compose" to Instruction Composer 1312 and SPU 1314, and these units examine the "instruction decode ROM" field of Instruction Packet Register 1320 to determine which functional unit is required to execute the instruction.

If the instruction is not to be executed by Scalar Processor Unit 1314, Instruction Composer 1312 is activated. The operational state of instruction Composer 1312 is given by the contents of a 4 bit counter called read_cnt. The read_cnt counter is zero whenever Instruction Composer 1312 is idle; whenever read_cnt is not zero, Instruction Composer 1312 asserts the "composer busy" (composer_busy) signal to Main Controller 1322. Another counter called send_cnt is used by Instruction Composer 1312 to count the words it passes to a functional unit over Global Bus 416. Both read_cnt and send_cnt are set to zero when Instruction Composer 1312 is activated. The counter send_cnt is compared with the contents of another register called num_blocks to determine when global bus transfers are finished.

After being activated, Instruction Composer 1312 determines the number of token operands required by the instruction by examining the "number of operands" (NO) field in Instruction Packet Register 1320. If no operands are required, Instruction Composer 1312 simply creates a processor packet in the format shown in FIG. 3E from the contents of Instruction Packet Register 1320 and asserts it onto Global Bus 416 along with the "data ready" (data_ready) and "load processor packet" (proc_pac_ld) signals. At the same time, both read_cnt and send_cnt increment to the value "1". On the next clock edge, both of the latter counters are set to zero, and Instruction Composer 1312 signals Main Controller 1322 that it is finished by deasserting composer_busy.

If one or two token operands are required, Instruction Composer 1312 asserts the "read data memory" (read_dmem) signal to Token Memory Unit 810, extracts the address for the first operand from Instruction Packet Register 1320, and sends it to Token Memory Unit 810 via bus dmem_addr; read_cnt also increments to the value "1" on the next rising clock edge. Token Memory Unit 810 then takes the next two clock periods to read the token header at the specified address, and read_cnt increments on each rising clock edge. When read_cnt is "3" the token header is present in a register, and Instruction Composer 1312 uses it to determine whether the token is a data token, and if it is, the number of data blocks the token has stored in Token Memory Unit 810. The number of blocks is stored in the num_blocks register. The read_cnt counter then increments to the value "4" and send_cnt increments to the value "1". While read_cnt is "4" and send_cnt is "1", Instruction Composer 1312 creates a processor packet from the contents of Instruction Packet Register 1320 and asserts it onto Global Bus 416 along with the "data ready" (data_ready) and "load processor packet" (proc_pac_ld) signals to the appropriate functional unit. On the rising edge of the next clock cycle, read_cnt increments to "5", send_cnt increments to "2", and during that cycle, proc_pac_ld is deasserted and Instruction Composer 1312 directs Token Memory Unit 810 to send the token's token descriptor to the appropriate functional unit over Global Bus 416. If the token is a control token, transfers for the first token operand are finished at this point; otherwise, Token Memory Unit 810 reads the token's data blocks from the token's Block Allocation Units and sends them to the functional unit over Global Bus 416. The send_cnt counter increments with each word transferred.

If the instruction only requires one operand token, the read_cnt counter remains at the value "5" until send_cnt equals (num_blocks×8)+2. During this clock cycle, the last word is being transferred and read_cnt is set to zero; during the next clock cycle, data_ready is deasserted, and instruction Composer 1312 goes idle.

Otherwise, if the instruction requires a second operand as well, read_cnt increments to the value "6" during the clock cycle in which send_cnt equals (num_blocks×8)−1. During the next clock cycle, while read_cnt is "6", Instruction Composer 1312 requests Token Memory Unit 810 to start reading the second operand token, beginning with its header. This request is made two clock cycles before the last word of the first operand is output by Token Memory Unit 810 to compensate for memory pipeline delays and to ensure that the last data word of the first operand is immediately followed by the token descriptor of the second operand on Global Bus 416. The read_cnt counter has the values "7" and "8", respectively, during the transfers of the last two words of the first operand. During the clock cycle in which read_cnt is "9", Token Memory 810 outputs the token descriptor of the second operand on Global Bus 416. If the second operand is a control token, read_cnt is set to zero during the latter clock cycle, and during the next cycle, data_ready is deasserted and Instruction Composer 1312 goes idle. Otherwise, read_cnt increments to "10" and remains in this state until Token memory 810 finishes transferring the rest of the second operand across Global Bus 416. During the last transfer, read_cnt is set to zero, and Instruction Composer 1312 is idle beginning with the following clock cycle.

Scalar Processor Unit

Scalar Processor Unit 1314 (the "SPU") is activated by receiving the "compose" signal from Main Controller 1322 and decoding a scalar or semaphore instruction. When this occurs, the SPU responds to Main Controller 1322 with the "scalar busy" (scalar_busy) signal.

The SPU executes the instruction in three phases. In the first phase, the instruction is decoded and any required token operands are read from Token Memory unit 810 (the "TMU"). Only token descriptors are actually read and operated upon by the SPU, since the SPU is incapable of modifying the contents of BAUs within operand tokens. If the instruction has one or two operand tokens, the SPU requests each of them in turn from the TMU by putting the token's address onto the 7 bit dmem_addr bus and asserting the "read descriptor" (read_descr) signal.

In the second phase, the instruction is executed, the result token (if any) is sent to the TMU, and a result packet is sent to Update Unit 812. If the SPU needs to operate on the contents of the token descriptors, it extracts the descriptor fields required by the instruction being executed, and sends both them and a function code to a 25 bit wide ALU. The ALU then performs the function (addition, subtraction, Boolean, or comparison), and uses the output to form the result token's token descriptor, if one is required. In some cases, (e.g., the DGATE1 instruction), the SPU uses the output from the ALU to decide whether or not to create a result token. The SPU then signals the TMU by asserting the "load scalar packet" signal (ld_aux_pac) and sends it the result token's token descriptor (if any), the terminating instruction's address and "number of destinations" field, and the 3 bit scalar control packet (aux_control).

The three bits in the scalar control packet are called "write_descr", "copy_operand", and "discard_operand", and only one of them is set to "1". The write_descr bit is set if the SPU wishes the TMU to create a result token using the SPU's result token descriptor; the BAUs of any operand tokens are not associated with the result token. The copy_operand bit is set if the SPU wishes the TMU create a result data token by copying the BAU address fields associated with the SPU's first (or only) operand token to the same fields associated with the result token. In this way, the SPU "copies" the BAUs of an operand data token without actually reading them, thereby decreasing the loading on Global Bus 416. Finally, the discard_operand bit is set if the SPU does not wish the TMU to create any result token.

In the third and final phase, the SPU sends a result packet to Update Unit 812 and also asserts the no_update signal if no result token was generated. The scalar_busy signal is also deasserted to Main Controller 1322.

THE DATA TOKEN MEMORY UNIT (FIG. 14)

Figure 14:
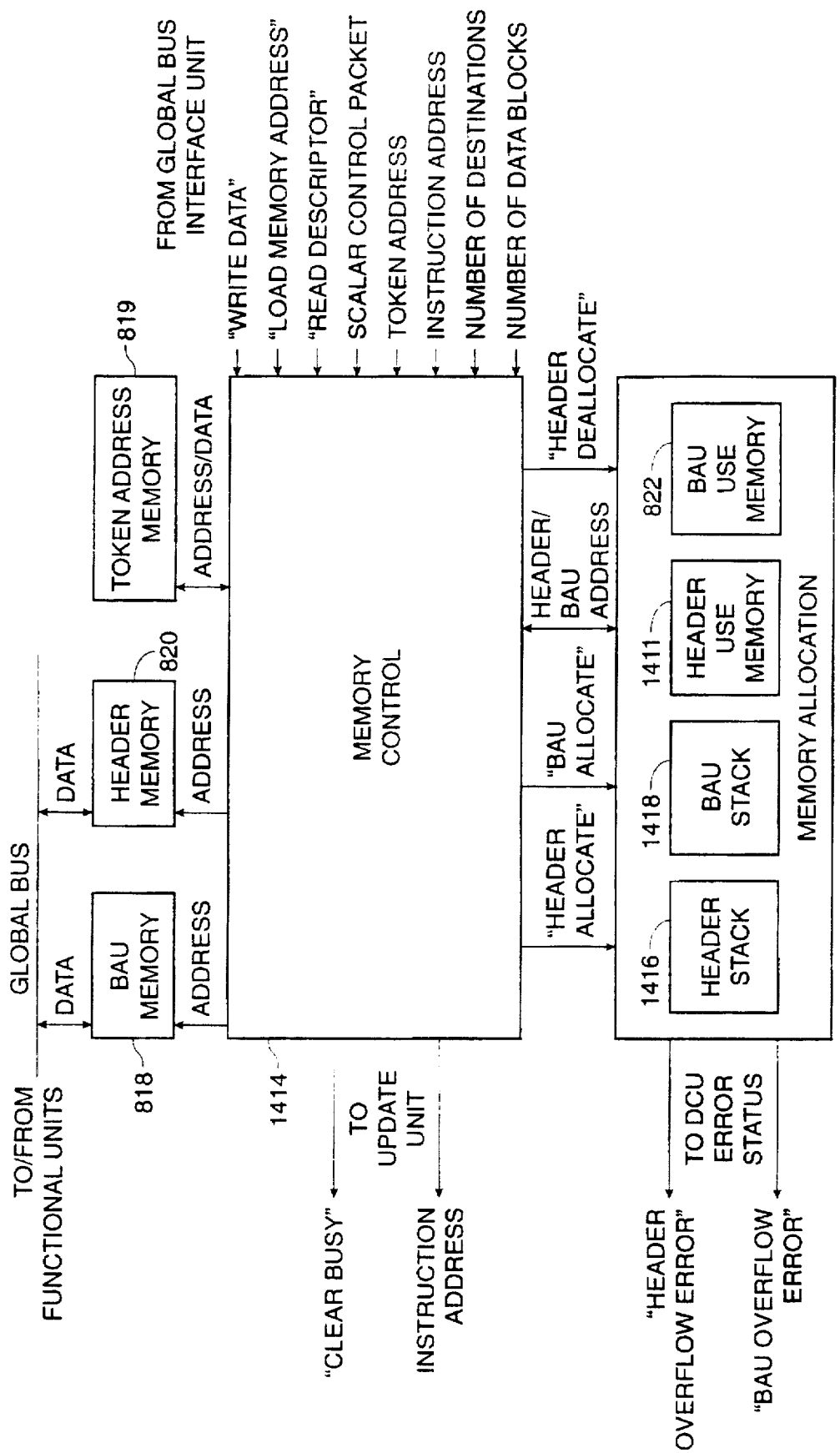
FIG. 14 is a block diagram of the token memory unit of FIG. 8.
Figure 15:
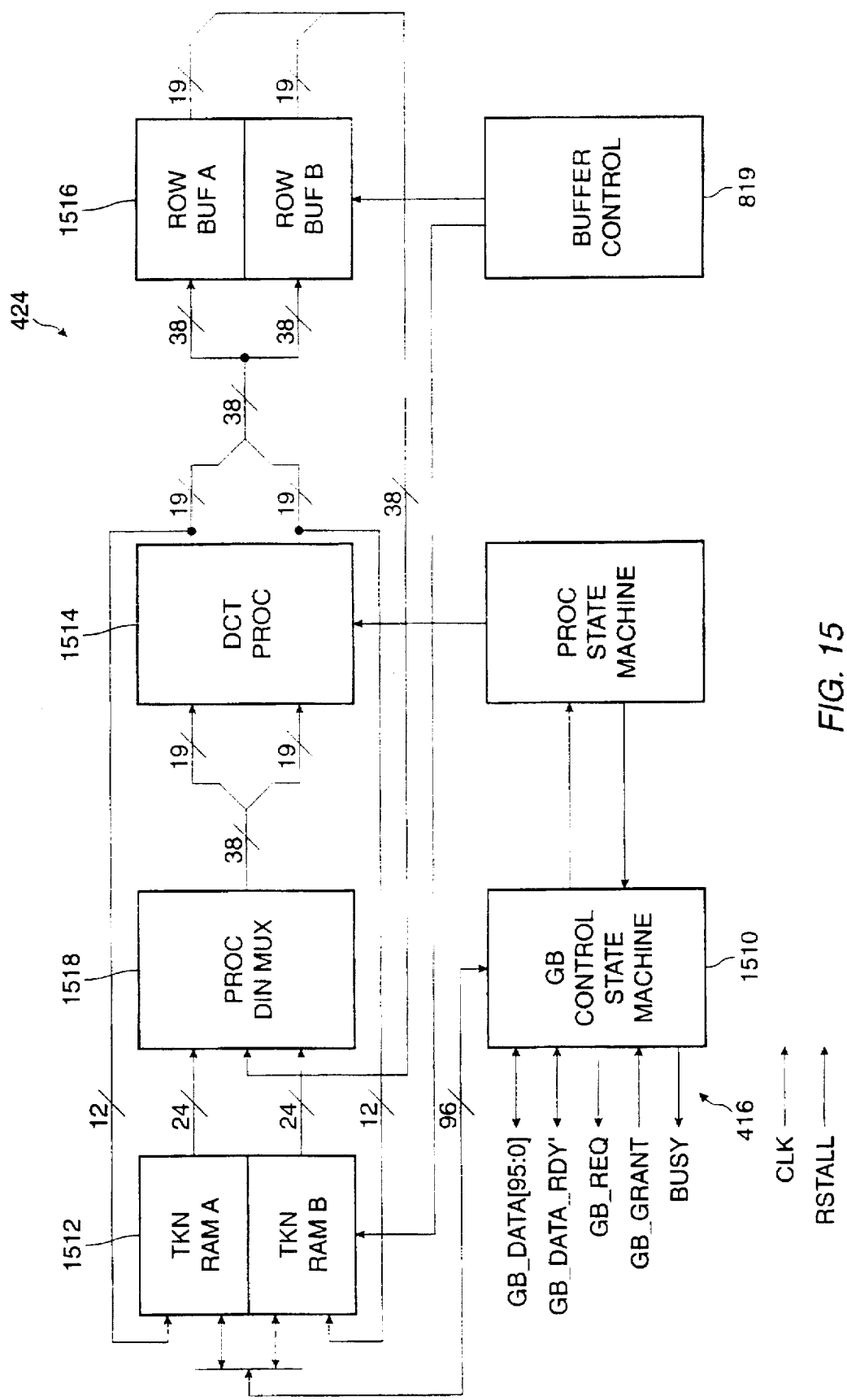
FIG. 15 is a functional block diagram of the DCT processor unit of FIG. 4.

Token Memory Unit 810 (the "TMU") allocates, deallocates, reads and writes memory space for tokens resulting from instruction executions. The principal blocks of this unit pictured in FIG. 14 are: Memory Control 1414, Header Memory 820, BAU Memory 818, Token Address Memory 819, Header Stack 1416, BAU Stack 1418, Header Use Memory 1411, and BAU Use Memory 822.

Token Memory Unit 810 can accommodate a total of 128 control or data tokens. Header Memory 820 is 96 bits wide by 128 words long, and each word may store the 96 bit token descriptor for exactly one token. The data block portions of data tokens are stored in Block Allocation Units (BAUs)

within BAU Memory 818. Each BAU can store up to two 8 word by 96 bit data blocks, and BAU Memory 818 can store up to 64 BAUs. When BAUs are allocated for a data token, each token is allocated one or two entire BAUs, depending on the number of data blocks it requires. Unused portions of a given BAU are not assigned to any other token.

Token Address Memory 819 is 23 bits wide by 128 words long. Each word is formatted as shown in FIG. 3D and corresponds to one control or data token. For a given token, its corresponding word in Token Address Memory 819 stores the address of the instruction which created the token, the number of BAUs which store the token's data blocks (0 if the token is a control token, 1 or 2 if it is a data token) and additionally if the token is a data token, the addresses of its BAUs in BAU Memory 818. Each of the two BAU address fields in FIG. 3D is 7 bits long to accommodate up to 128 BAUs, even though the current implementation of BAU Memory 818 stores only 64 BAUs.

Header Stack 1416 is a 7 bits wide by 128 words long last in—first out (LIFO) memory which stores the addresses of token descriptors in Header Memory 820 currently available for assignment to new tokens. The address of the word currently at the "top" of the LIFO memory is given by the contents of a 7 bit header stack pointer register (header__stack__ptr), and the contents of the word pointed at by header__stack__ptr is also stored in the header allocation address register (header__alloc__addr). When ICC 410 is initially reset, each of the 128 words in Header Stack 1416 is written with a value corresponding to its address; e.g., the word at address 67 is written with the value "67". The header__stack__ptr and header__alloc__addr registers are also both initialized to zero.

BAU Stack 1418 is another 7 bits wide by 128 words long last in—first out (LIFO) memory which stores the addresses of BAUs in BAU Memory 818 currently available for assignment to new tokens. Like the BAU address fields in Token Address Memory 819, BAU Stack 1418 is sized to accommodate up to 128 BAUs. The address of the word currently at the "top" of the LIFO memory is given by the contents of a 7 bit BAU stack pointer register (BAU__stack__ptr), and the contents of the word pointed at by BAU__stack__ptr is also stored in the BAU allocation address register (BAU__alloc__addr). When ICC 410 is initially reset, each of the 128 words in BAU Stack 1418 is written with a value corresponding to its address. The BAU__stack__ptr and BAU__alloc__addr registers are also both initialized to zero.

Header Use Memory 1411 is 2 bits wide by 128 words long and has one location per control or data token. It is used by Token Memory Unit 810 to determine when a token has been "consumed" by each of its destination instructions in an ICC program. Each location counts the number of destinations in an ICC program which still needs to use the token and is initialized with a copy of the "number of destinations" (ND) field from the token's creating instruction. Each time the Token Memory Unit 810 sends a token to either instruction Composer 1312 or Scalar Processor Unit 1314 for use as an instruction operand, it decrements the token's "usage count" in Header Use Memory 1411. When this count is zero, the token is no longer needed by any instructions, and it is deallocated from Header Memory 820.

BAU Use Memory 822 is 4 bits wide by 128 words long and has one location per BAU. Like BAU Stack 1418, it is sized to accommodate up to 128 BAUs, even though the current implementation of BAU Memory 818 only contains 64 BAUs. This memory exists because it is possible for more than one token to be associated with the same BAU, and each location in the memory counts the number of tokens which still reference the corresponding BAU. The situation of multiple tokens referencing the same BAU arises when ICC instructions which are processed by Scalar Processor Unit 1314 (the "SPU") within Global Bus Interface Unit 816. Each SPU instruction always either discards the data blocks associated with data token operands or copies them to its result token. However, data block copying is not done by physically moving data, but rather by setting the result token's BAU address fields in Token Address Memory 819 to be the same as the BAU address fields of the appropriate operand token. Each time a scalar instruction creates a result token which references one or two BAUs, the corresponding "usage counts" in BAU Use Memory 822 are incremented. Likewise, whenever a token is deallocated, its corresponding BAU usage counts are decremented. When a BAU's usage count is decremented to zero, the BAU is no longer needed by any tokens, and it is deallocated from BAU Memory 818.

When Global Bus Interface Unit 816 has a result token from an instruction execution, it asserts the "write data" (wr__data) signal to Token Memory Unit 810. However, prior to sending the token, it directs Token Memory Unit 810 to allocate space for it. The token allocation process begins with Memory Control 1414 loading the current contents of header__alloc__addr into the 7 bit wide memory address register (dmem__addr__reg) and asserting the "header allocate" signal to Header Stack 1416. In response, Header Stack 1416 "pops" a word from its LIFO memory by incrementing header__stack__ptr, reading the contents of the LIFO memory at that address, and writing the contents into header__alloc__addr. If header__stack__ptr ever overflows (i.e., it "rolls over" from "127" to "0"), Header Stack 1416 is full and an error signal is generated to another portion of DCU 418.

Next, a copy of the "number of destinations" (ND) field of the instruction creating the result token is written to Header Use Memory 1411 at the location pointed to by dmem__addr__reg, and the instruction's address is written to a holding register. If the result token is a control token, the holding register address is written to the "instruction address" field and zero is written to the "number of BAUs" field in Token Address Memory 819 at the located pointed to by dmem__addr__reg.

If the result token is a data token, Memory Control 1414 allocates BAUs for the token by loading the current contents of BAU__alloc__addr into the 7 bit wide BAU address register (BAU__addr__reg) and asserts the "BAU allocate" signal to BAU Stack 1418. In response, BAU Stack 1418 "pops" a word from its LIFO memory by incrementing BAU__stack__ptr, reading the contents of the LIFO memory at that address, and writing the contents into BAU__alloc__addr. The value "1" is written to BAU Use Memory 822 at the located pointed at by BAU__addr__reg. If another BAU is required as indicated by the "number of blocks" (nblock) signal from Bus Arbiter 1310 in Global Bus Interface Unit 816, the contents of BAU__addr__reg is saved in another register, and the address of the second BAU is read from BAU Stack 1418 in a similar fashion. BAU Use Memory 822 is also updated. If BAU__stack__ptr ever overflows (i.e., it reaches the value "64"), BAU Stack 1418 is full and an error signal is generated to another portion of DCU 418.

The final step in the allocation of a data token is to write the instruction address stored in the holding register, together with the addresses of the newly allocated BAUs and the number of BAUs, to Token Address Memory 819 at the location pointed to by dmem__addr__reg.

Also, for both control and data tokens, the contents of dmem_addr_reg is returned to Bus Arbiter 1310 so that it can be included in the result packet Bus Arbiter 1310 sends to Update Unit 812.

Once a control or data token is allocated, Global Bus Interface Unit 816 writes to it via Global Bus 416. The token's token descriptor is written into Header Memory 820, and the token's data blocks (if any) are written into BAU Memory 818 at the allocated addresses.

Global Bus Interface Unit 816 also reads tokens from Token Memory Unit 810 for use during instruction executions. For non-SPU instructions, Instruction Composer 1312 within Global Bus Interface Unit 816 requests a token from Token Memory Unit 810 by asserting the "load memory address" (ld_dmem_addr) signal to Memory Control 1414, and loading the address of the token to be read into the TMU's memory address register (dmem_addr_reg) via the 7 bit "memory address bus" (dmem_addr). Memory Control 1414 then reads the addressed token descriptor from Header Memory 820, the token usage count from Header Use Memory 1411, and the number of BAUs, BAU addresses, and address of the instruction which created the token from Token Address Memory 819. All of the latter data are stored in registers. The register storing the token usage count is then decremented by one and the result written back to Header Use Memory 1411. If the decremented usage count is zero, Memory Control 1414 deallocates the token by asserting the "deallocate header" signal (header_de_alloc) to Header Stack 1416 and sending it the token's address. Header Stack 1416 then "pushes" the address onto its LIFO memory. At the same time, Memory Control 1414 asserts the "deallocate" signal (de_alloc_out) to Update Unit 812 and also sends it the address of the instruction which created the deallocated token. The latter address is used by Update Unit 812 to mark the corresponding instruction as "not busy". If the token being read is a data token, Memory Control 1414 also sends the number of data blocks in the token and the address of the first BAU to BAU Memory 818.

The token descriptor is then driven onto Global Bus 416. If the token is a control token, no additional transfers take place on Global Bus 416 for the current token. Otherwise, the required number of 96 bit words is read from BAU Memory 818 starting at the address of the first BAU, and each word is driven onto Global Bus 416. If the number of data blocks in the token is two or more, all 16 words of the BAU are read; otherwise, only 8 words are read. While the BAU is being read, its usage count in BAU Use Memory 822 is decremented by one. If the decremented usage count is zero, Memory Control 1414 deallocates the BAU by sending its address to BAU Stack 1418 which subsequently pushes it onto its LIFO memory.

If the number of data blocks in the token is three or four, the BAU at the token's second BAU address is read, and each word is driven onto Global Bus 416. If the number of data blocks in the token is four, all 16 words of the BAU are read; otherwise, only 8 words are read. As with the first BAU, the usage count of the second BAU is decremented by one while the second BAU is being read. If the decremented usage count is zero, Memory Control 1414 deallocates the BAU by sending its address to BAU Stack 1418 which subsequently pushes it onto its LIFO memory.

Scalar Processor Unit 1314 requires special interaction with the TMU when executing a scalar or semaphore instruction. The SPU is incapable of modifying the contents of operand BAUs, and either copies them to a result token or discards them. Initially, if the instruction has one or two operand tokens, the SPU requests each of them in turn from the TMU by putting the token's address onto the 7 bit dmem_addr bus and asserting the "read descriptor" (read_descr) signal. The TMU reads each token's token descriptor from Header Memory 820 and sends it to the SPU via Global Bus 415; each token's BAUs, if any, are not read. The appropriate token usage counts in Header Use Memory 1411 are decremented, and the descriptors are deallocated if necessary using the previously described method. In addition, the BAU usage counts of any BAUs associated with a second operand token are decremented, and the BAUs deallocated if necessary. However, the TMU reads the first operand token's BAU addresses and number from the Token Address Memory 819 and saves them in the "BAU address register" for use when the SPU instruction finishes execution.

When the SPU instruction finishes, the SPU notifies the TMU by asserting the "load scalar packet" signal (ld_aux_pac) and sending it the result token's token descriptor (if any), the terminating instruction's address and "number of destinations" field, and the 3 bit scalar control packet (aux_control). The three bits in the packet are called "write_descr", "copy_operand", and "discard_operand", and only one of them is set to "1".

The TMU responds to write_descr being set to "1" by allocating storage for the new token descriptor, storing the descriptor appropriately, and returning its address to the SPU. In addition, if the SPU instruction had a data token operand, the TMU decrements the BAU usage counts of the BAUs whose addresses are stored in the BAU address register, and deallocates the BAUs if necessary.

Like write_descr, the copy_operand bit causes the TMU to allocate storage for the new token descriptor, store the descriptor in Header Memory 820, and return its address to the SPU. However, copy_operand then causes the TMU to copy the contents of the BAU address register into the "number of BAUs" and BAU address fields of the new token's location in Token Address Memory 819. If the SPU instruction's operand token was not previously deallocated, the BAU usage counts at these BAU addresses are also incremented by one.

Finally, in the case where discard_operand is set to "1", the TMU does not allocate space for a new token descriptor (since none is required), and the BAU usage counts at the addresses from the BAU address register are decremented by one. The corresponding BAUs are then deallocated if necessary.

DCT PROCESSOR UNIT (FIG. 15)

The DCT unit 424 performs the forward and the inverse Discrete Cosine Transform on a data token consisting of several 8×8 data blocks. The two-dimensional DCT of an 8×8 data block is computed by transforming the rows and subsequently transforming the columns of the resulting data block.

The incoming data token and the instruction to be processed are received from DCU 418 via the global bus state machine 1510. The data token is saved in the token buffer 1512. Processing is started by passing the data token through the DCT processor 1514. The results of first stage processing (row transform) are saved in the intermediate row buffer 1516. Processing is completed by passing the contents of the row buffer through the processor again using multiplexer 1518. The results are stored back in the token buffer for transmittal to DCU 418.

Global Bus Control State Machine

Figure 16:
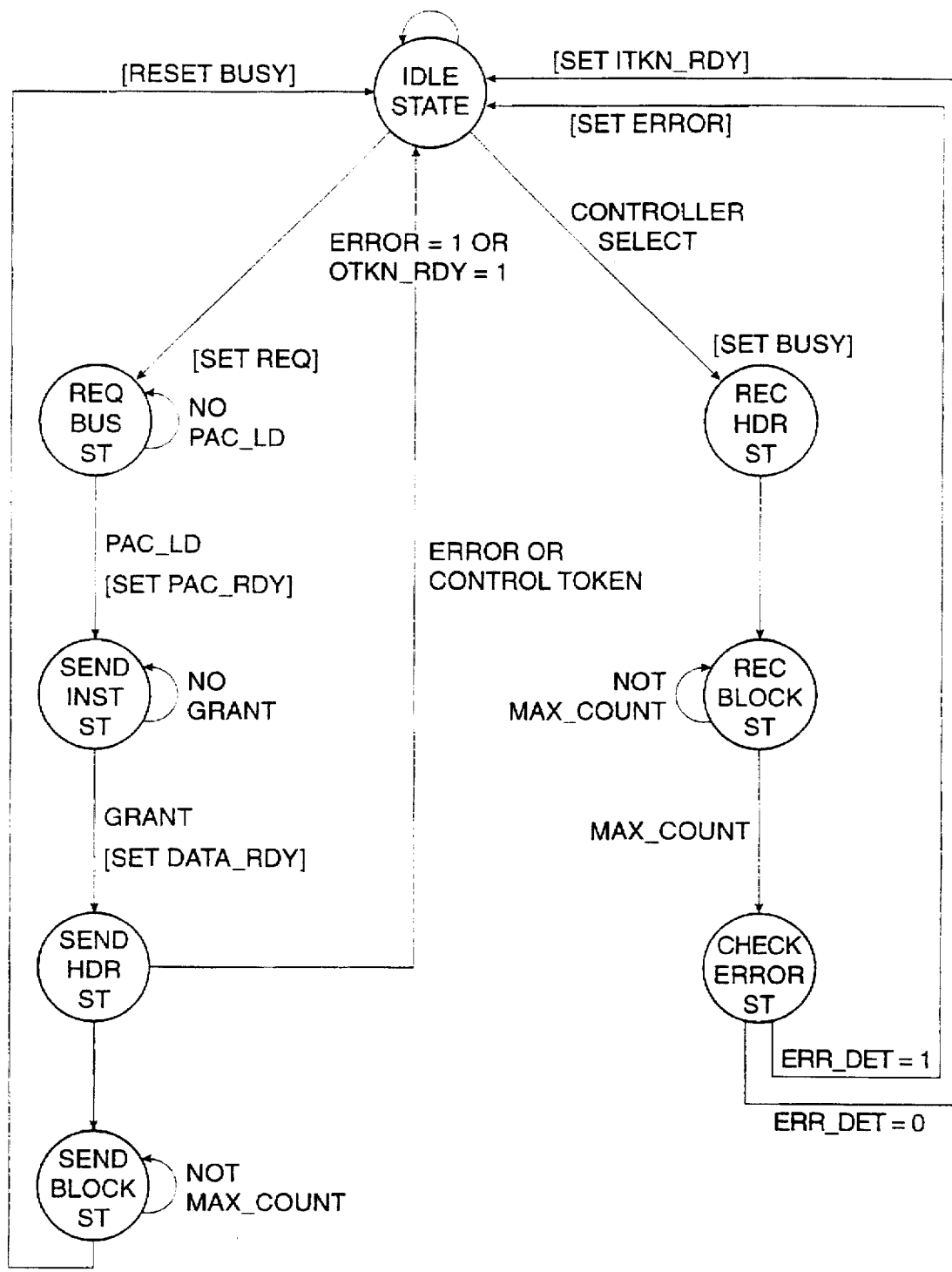
FIG. 16 is a state machine transition diagram for the global bus state machine of the DCT processor unit of FIG. 15.
Figure 17:
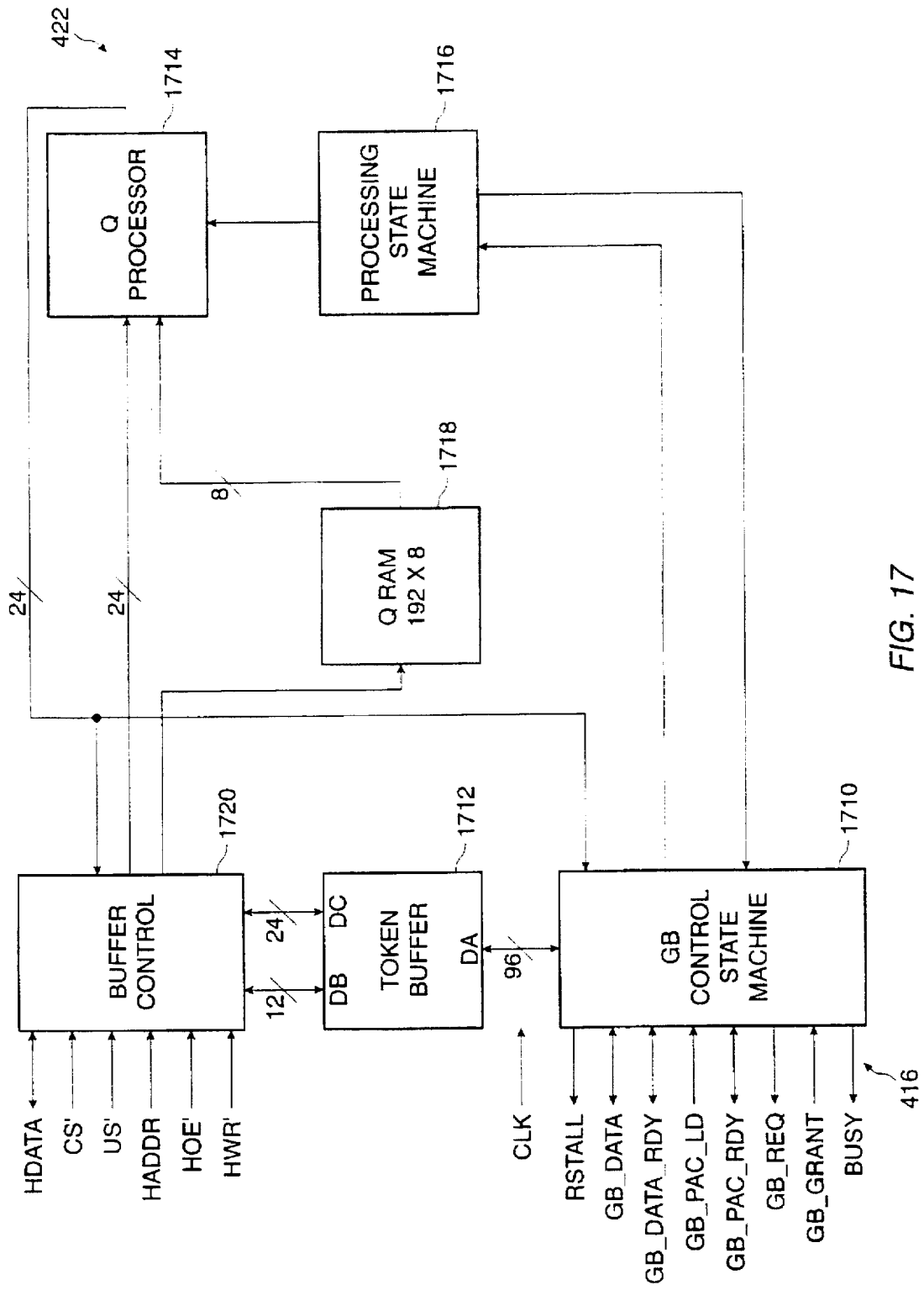
FIG. 17 is a block diagram of the quantization processor unit of FIG. 4.

The global bus control state machine acts as the main sequencer in the DCT unit. FIG. 16 shows the state transition diagram of the global bus control state machine. Eight states are needed to support the interface protocol. The state machine also integrates register storage for the instruction and the token header (i.e., token descriptor). Similar state machines are used in the other processing units on the global bus 416.

The 96-bit, bi-directional global data bus contains eight 12-bit data values. For the forward DCT function, each 12-bit data contains a properly sign-extended 9-bit image pel.

The global bus control state machine starts at the idle-state after reset. In this state, it monitors the global bus for an input sequence from DCU 418 and the internal status flags OTKN_RDY and ERROR for an output sequence. When an input sequence is initiated by DCU 418 as indicated by GB_DATA-RDY_ going active, the instruction word is saved in the INST register before the state machine transitions to the receive-header-state. The global data bus is loaded into the INST register. The receive-header-state causes the HDR register to be loaded with the data contained in the global data bus. The number of data blocks minus one contained in the data token is extracted from the header information and is referred to as MAX_BLKCNT. In the receive-header-state, the 6-bit global bus transfer cycle counter (GB_CYC_CNT) is enabled to count from 0 to account for the pipeline in the token RAM address path. It counts up to [8*(MAX_BLKCNT+1)−1]. On the next clock cycle, the state machine transitions to the receive-block-state. With each clock, the global data bus is loaded into the global data bus pipeline register R_GB_DATA. A pipelined version of the GB_CYC_CNT (P1_GB CYC_CNT) is also provided to the buffer control block for use in generating the TKN_RAM address. The value in $R_{13}GB\_DATA$ is transferred to the token buffer on the next clock cycle. A delayed global bus write transfer-in-progress signal (P1_ GB_WXFR_IP) is also produced to go with P1_GB_ CYC_CNT.

When the counter GB CYC CNT reaches the maximum count, the state machine transitions to the check-error-state, where the token type bit contained in the header is checked. An error is detected if a control token is received instead of a data token. In such a case, the ERROR status flag is set and the state machine returns to the idle-state where the ERROR status causes the state machine to return the unprocessed data token to DCU 418. The "errflag" (bit 88) of the header (token descriptor) is set when returned to DCU 418. The error condition is reported in the form of a control token.

If no error is detected while in the check-error-state, the status flag ITKN_RDY is pulsed high for one cycle to indicate that an input data token has been received and is ready for processing. The state machine returns to the idle-state on the next clock cycle.

In the idle-state, the state machine also monitors the OTKN_RDY and the ERROR flags. The CTKN_RDY, which is activated for 1 clock cycle by the processing state machine, indicates a processed data token has been written back to the token buffer, while the ERROR flag indicates an unprocessed, erroneous data token is to be returned to DCU 418. When either OTKN_RDY or ERROR is detected, the state machine transitions to the request-bus-state. At the same time, it activates the GB_REQ line to DCU 418 to request a global bus access. It remains in this state until DCU 418 activates GB_PAC-LD. The DCT unit responds by transitioning to the send-instruction-state and places the instruction on the global data bus and activates GB PACRDY. The state machine remains at the send_ instruction-state until DCU 418 grants the unit's request by activating the GB_GRANT line. The state machine then transitions to the send-header-state. GB_CYC_CNT counter is started to pre-fetch data from the token buffer. GB_DATA_RDY line is activated by the state machine and the content of the HEADER register is routed to the global bus 416. Data fetched from the token buffer is loaded into R_GB_DATA pipeline register. On the following clock, the state machine transitions to the send-block-state. GB_CYC_CNT counts up to the maximum count contained in the header. $R_{13}GB\_DATA$ is placed on the global data bus. When the maximum count is reached, the state machine transitions back to the idle-state and the bus request is inactivated one clock cycle later.

The state machine also generates a BUSY signal for DCU 418. It becomes set when a DCU-initiated sequence is started and is reset only after a processed data token is returned to DCU 418.

QUANTIZATION PROCESSING UNIT (QPU) (FIG. 17)

The Quantization Processing Unit 422 computes the forward and the inverse quantization of a data token consisting of several data blocks. In addition to quantization, this unit also computes mean-square values and variances and can modify quantizer values based on a measure of relative image activity.

The instruction and token to be processed by this unit are received from the DCU 418 via the global bus 416 to the global bus interface 1710. The token is saved in token buffer 1712. The instruction is executed by passing the token through the quantization processor block 1714. Due to the in-place nature of the instruction processing, processing results from the quantization processor may be stored back to the token buffer 1712. At the completion of the instruction execution, the token is sent back to the DCU.

This unit can support forward and inverse quantization for the following compression algorithms: video-rate JPEG on full CCIR-601 images (encode or decode), video-rate Px64 on CIF images (both encode and decode), MPEG (encode and/or decode).

The quantization processor is the resource that computes forward or inverse quantization, mean square, variance, and quantizer modifications. The processing state machine 1716 serves as the sequencer for the instruction execution in the QPU. It operates with the global bus control state machine to process an input token.

The Q_RAM 1718 contains storage for up to 192 8-bit quantization values. This RAM is initialized by the external host processor before processing by the ICC is started. The storage space in the RAM is logically sectioned into three 64-byte tables. For JPEG quantization, the RAM typically contains the quantization matrices for the luminance and the 2 chrominance components of YUV imagery. For MPEG quantization, only the first 2 tables are used. Table 0 is initialized with the quantization matrix for intra coding. Table 1 is initialized with the quantization matrix for non-intra coding. For Px64, this RAM is not used and therefore, does not need to be initialized. The contents of the Q_RAM are also readable by a host processor via the host interface.

A buffer control block 1720 provides the addresses and control signals to the token buffer and the quantization matrix RAM (Q_RAM$_S$). The RAM addresses are formed mainly from the counter values such as PHASE_CNT, PRE2_PEL_CNT and its pipelines from the processing state machine. The buffer control block also contains a 32×16 Zigzag ROM. The ROM is used for zigzag scanning the input data block and the quantization table.

ARITHMETIC PROCESSOR UNIT (APU) (FIG. 18)

Figure 18:
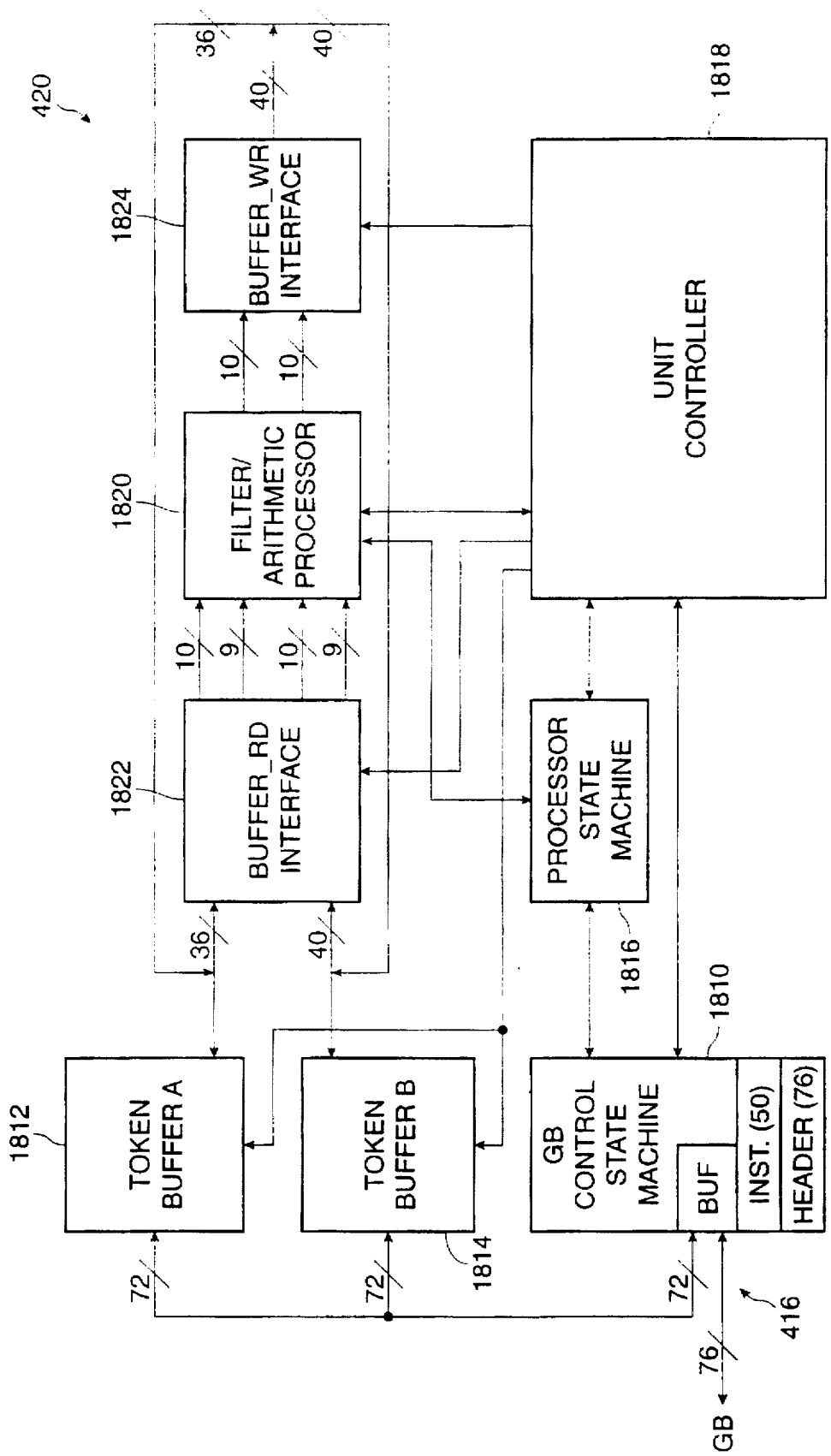
FIG. 18 is a block diagram of the arithmetic processor unit of FIG. 4.

FIG. 18 is a block diagram of arithmetic processor unit 420 of FIG. 4. A global bus state machine 1810 communicates with the internal global bus 416. A pair of token buffers 1812 and 1814 store the tokens for processing. A processor state machine 1816 manages the processing of an input token. A unit controller 1818 generates the control signals needed for the arithmetic unit. A filter arithmetic processor block 1820 implements the transfer function of a 3-tap loop filter as well as addition, subtraction, averaging, and clipping operations. A pair of buffers 1822 and 1824 are provided to buffer the data into and out of the arithmetic processor unit 1820.

RUN LENGTH PROCESSOR UNIT (RPU) (FIG. 19)

Figure 19:
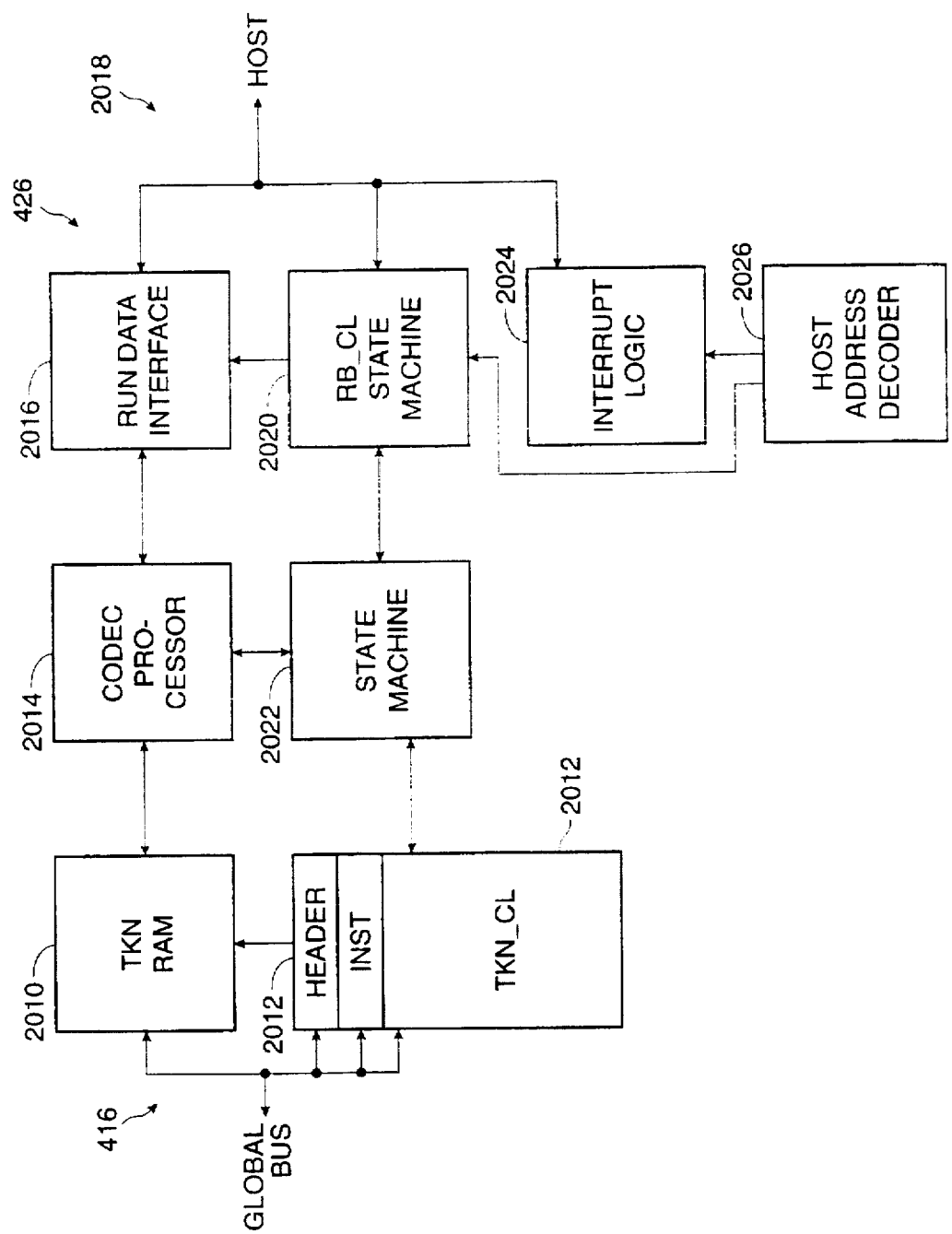
FIG. 19 is a block diagram of the run length processor unit of FIG. 4.

FIG. 19 is a functional block diagram of the RPU 426 of FIG. 4. The RPU includes a token RAM 2010 which is controlled by a token RAM control logic 2012. These connect to the global bus 416. A codec processor 2014 serves as a data format changer between the internal data token format and the external run length format for host communication. It encodes the quantized transform coefficients into a series of run-level and decodes a series of run-level pairs to form the quantized transform coefficients. It also makes header words from token descriptors during encoding and extracts header words from an encoded data sequence during decoding. It is connected between the token RAM and the run data interface 2016 connected to the host 2018. Interface 2016 is controlled by a block 2020 and the run length codec is controlled by state machine 2022. The RPU also includes interrupt logic 2024 and host address decoder block 2026.

TOKEN INTERFACE UNIT (TIU) (FIG. 20)

Figure 20:
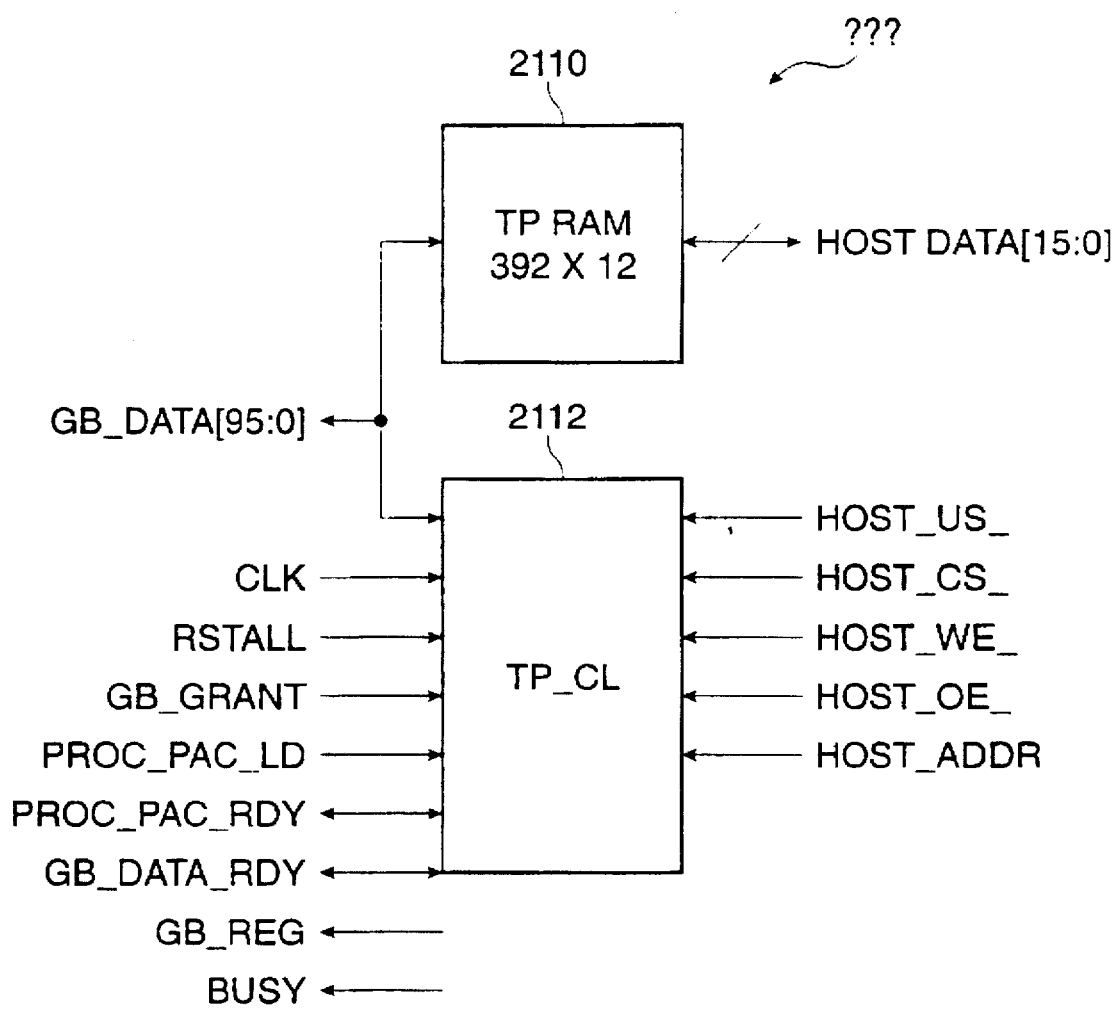
FIG. 20 is a functional block diagram of the token interface unit of FIG. 4.

FIG. 20 is a block diagram of the token interface unit 428 of FIG. 4. The token interface has a RAM memory 2110 that is shared between the ICC and the host processor. A control logic block 2112 controls the buffer and the two access modes, the global bus access mode and the host access mode.

HOST INTERFACE UNIT (HIU) (FIG. 21)

Figure 21:
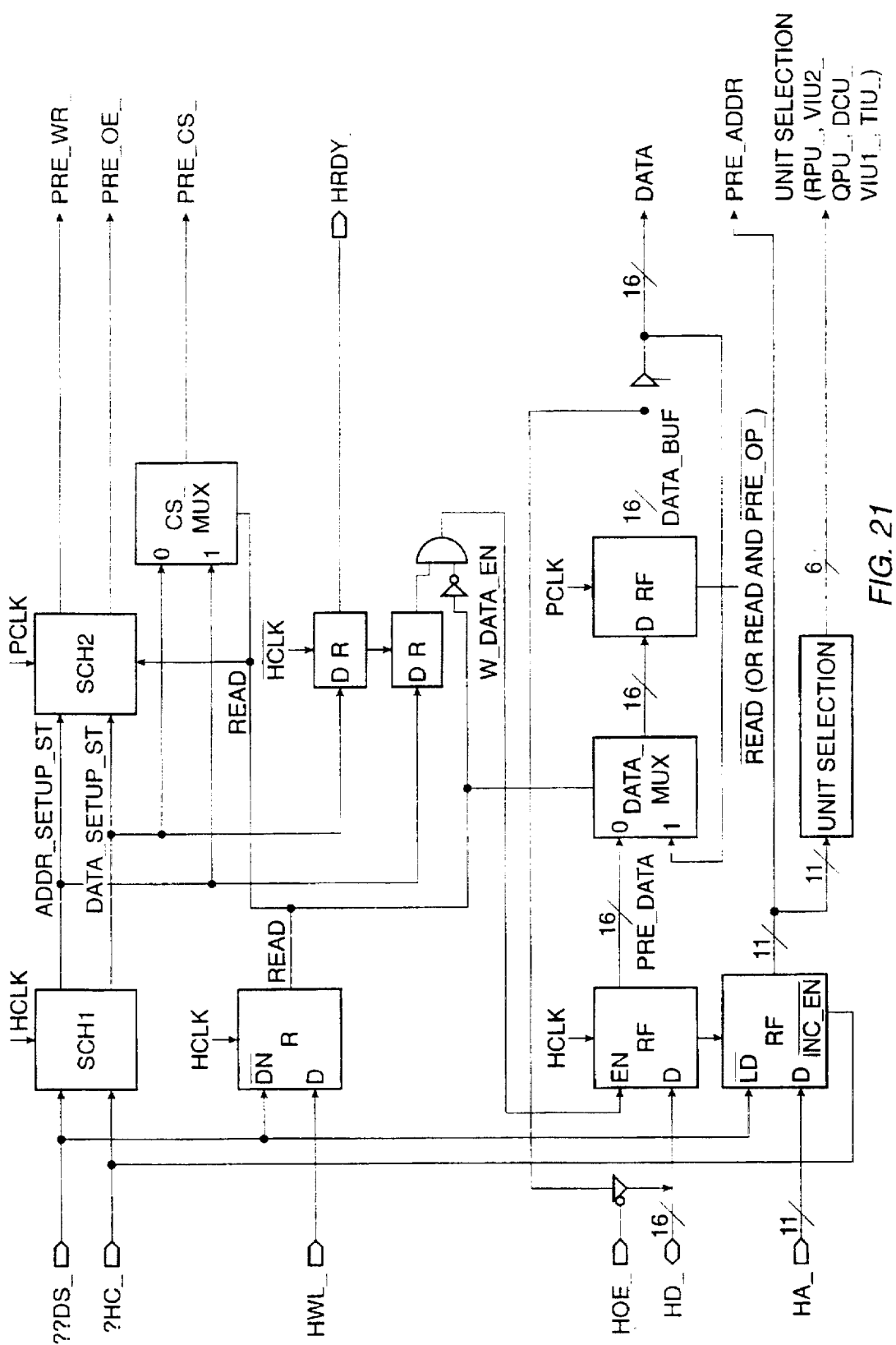
FIG. 21 is a block diagram of the host interface unit of FIG. 4.

FIG. 21 is a block diagram of the host interface unit 412 of FIG. 4. The HIU plays an interface role between the host bus and ICC memory-mapped registers in the different functional units.

VIDEO INTERFACE UNIT (VIU) (FIG. 22)

Figure 22:
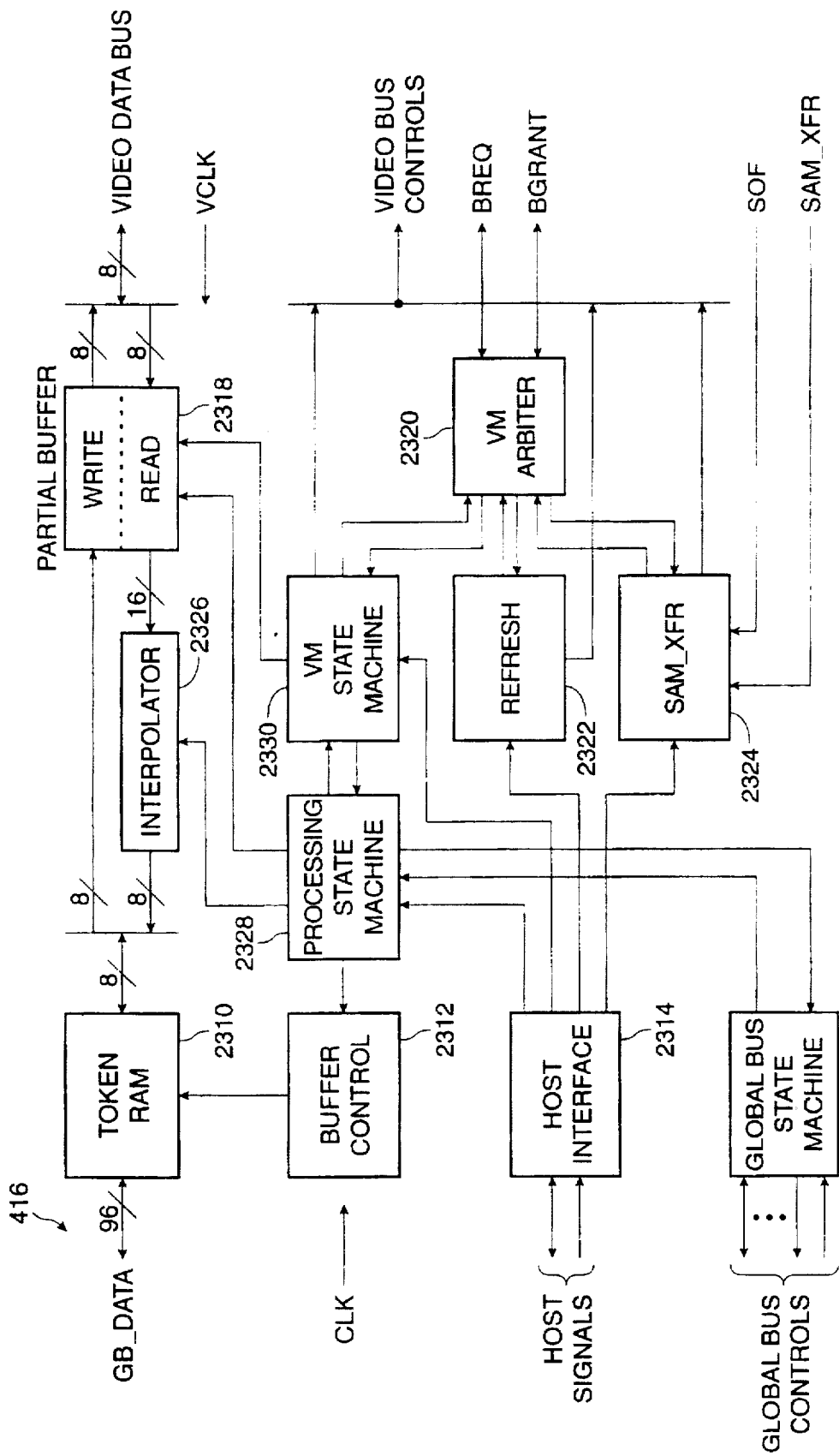
FIG. 22 is a block diagram of the video interface units of FIG. 4.

FIG. 22 is a block diagram of the VIU interface. The VIU connects to the internal global bus 416 with a token RAM 2310 under the control of buffer control logic 2312. A host interface logic block 2314 allows control directly through host interface 412 of FIG. 4.

Global bus state machine 2316 controls the access to global bus 416. A buffer 2318 connects to the external video memory data bus. A video memory arbitration unit 2320 arbitrates video bus requests from refresh logic 2322, SAM-DRAM transfer block 2324, page mode image fetch block, and an external bus request. An interpolator 2326 operates under the control of a state machine 2328. Finally, a state machine 2330 controls the video memory bus access.

AUXILIARY INTERFACE UNIT (AIU) (FIG. 23)

Figure 23:
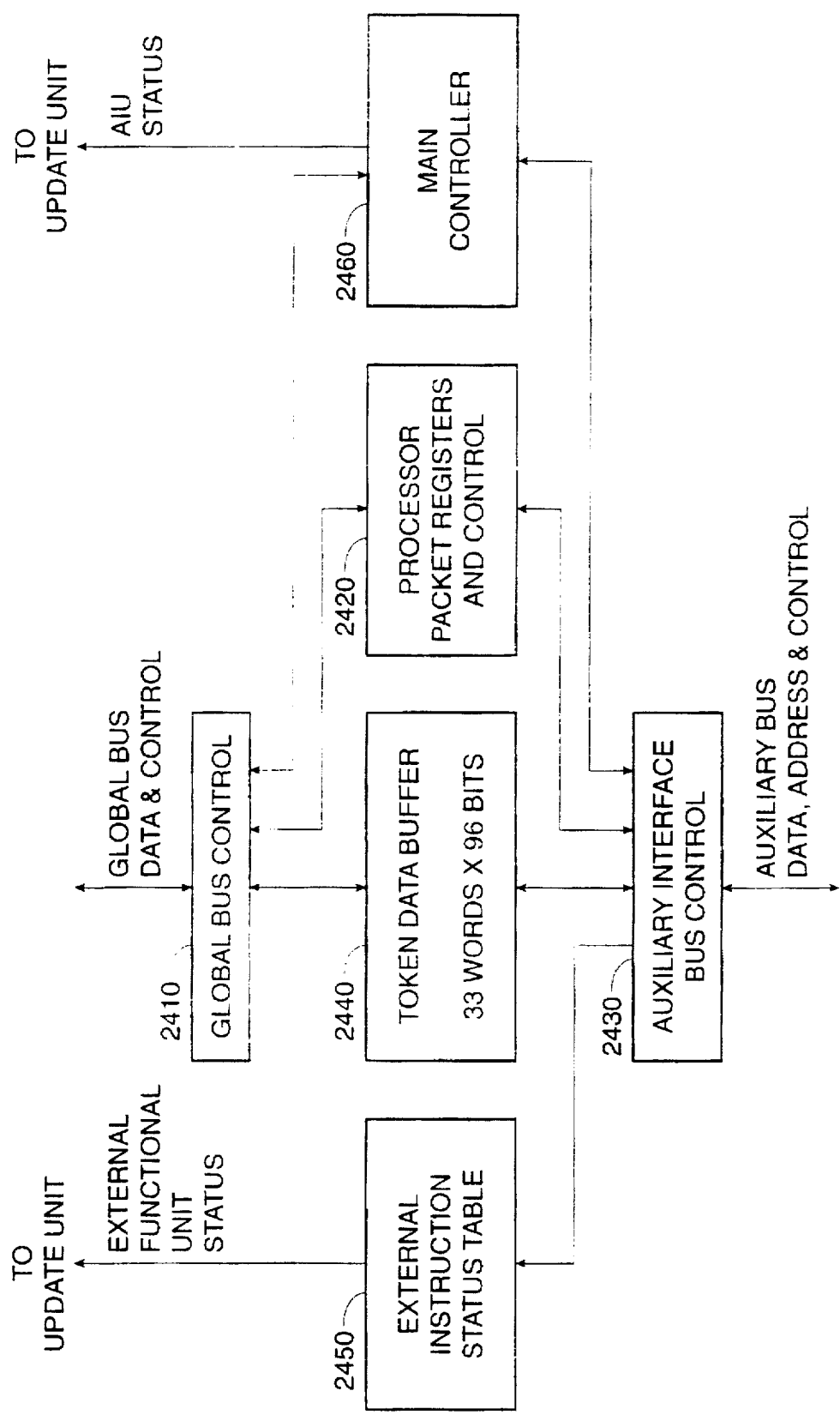
FIG. 23 is a block diagram of the auxiliary interface unit of FIG. 4.

The Auxiliary Interface Unit (AIU) 430 serves as an interface between the ICC and up to four external processors which are physically not part of the ICC. Each external processor, in turn, can contain up to four functional units which may operate concurrently. The AIU functions in a manner similar to other functional units internal to the ICC; i.e. it receives processor packets and operand tokens from DCU 418 and returns processor packets and result tokens to DCU 418, all over Global Bus 416. An instruction is sent to the AIU by DCU 418 for execution only if its X bit is set to "1". However, instead of executing such an instruction, the AIU sends it off-chip to the appropriate external processor. A block diagram of AIU 430 appears in FIG. 23.

The AIU contains a 16 word by 1 bit memory called the "External Instruction Status Table" (EIST) 2450. The EIST has a single word for every external functional unit. An external functional unit's entry in the EIST is set to "1" if this unit is currently busy executing an instruction; the entry is "0" if the unit is idle. All entries in the EIST are set to "0" whenever the ICC is reset. The EIST is read by Update Unit 812 within DCU 418 and written by the AIU and may be written and read independently.

An external instruction (i.e. one whose X bit is "1") is mapped onto an external functional unit using the least significant four bits of its OPCODE field; the least significant two bits select the external processor, and the next two bits above those select the functional unit within the external processor. These four bits are also used by both the DCU and AIU to address the EIST.

Global Bus Control 2410 is responsible for sending and receiving processor packets and tokens to and from DCU 418. It reads processor packets from and writes them to Processor Packet Registers and Control Block 2420. It also reads result tokens from and writes operand tokens to Token Data Buffer 2440.

Token Data Buffer 2440 contains a 33 word by 96 bit memory and can store either a single control token or a single four block data token; i.e. external instructions may have at most a single operand token. The token in the memory can be either an operand token waiting to be sent to an external functional unit or a result token which has been returned by one of these units.

Auxiliary Interface Bus Control 2430 is responsible for sending and receiving processor packets and tokens to and from external functional units. The protocol used for these transfers is described in the MEC Application. These transfers are synchronous to the auxiliary interface bus clock, XCLK. XCLK is asynchronous to the internal processor clock, PCLK, which is used transferring data over Global Bus 416. Like Global Bus Control 2410, Auxiliary Interface Bus Control 2430 reads processor packets from and writes them to Processor Packet Registers and Control Block 2420. It also reads operand tokens from and writes result tokens to Token Data Buffer 2440 and is responsible for setting and clearing bits in EIST 2450.

Main Controller 2460 is responsible for coordinating the activities of Global Bus Control 2410 and Auxiliary Interface Bus Control 2430 since both access the same resources within the AIU. Main Controller 2460 also determines the "idle" status of the AIU and sends it as a signal to Update Unit 412. AIU 430 is idle if both Global Bus Control 2410 and Auxiliary Interface Bus Control 2430 are not busy.

Before DCU 418 sends a processor packet and operand token (if any) to AIU 430, it checks to be sure that both the AIU and the external functional unit destined to receive the latter data are idle. It then sends the data to Global Bus Control 2410. After the processor packet and operand token (if any) are stored in Processor Packet Registers and Control Block 2420 and Token Data Buffer 2440, respectively, Main Controller activates Auxiliary Interface Bus Control 2430 to send the data to the appropriate external functional unit. Auxiliary Interface Bus Control 2430 also sets the bit in EIST 2450 corresponding to this functional unit to "1".

Each external processor unit having a functional unit wishing to send a result back to AIU 430 asserts an XRQST-input pin on the ICC. Auxiliary Interface Bus Control 2430 arbitrates between such requests which occur simultaneously. If the AIU is not busy as determined by Main Controller 2460, Auxiliary Interface Bus Control 2430 signals the selected processor over the auxiliary interface bus using the protocol described in the MEC Application. This processor then selects from among the possibly multiple functional units within itself requesting service and responds to AIU 430 with the selected unit's processor packet and result token (if any). The latter data are transferred over the auxiliary bus using a protocol like that described in the MEC Application. Auxiliary Interface Bus Control 2430 receives the data, stores it in Processor Packet Registers and Control Block 2440 and Token Data Buffer 2440 as required, and sets the bit in IST 2450 corresponding to the responding functional unit to "0". Main Controller 2460 then signals Global Bus Control 2410 to send the processor packet and any result token back to DCU 418.

ICC SEMAPHORES

The present invention provides a unique use of semaphores. Historically, semaphores have been used to implement signalling mechanisms to permit the sharing of critical hardware and software computer resources among multiple software processes. Such resources are declared "critical" in that each may be accessed by only one process at a time. Semaphores themselves are critical variables which software processes typically "test and set" before entering the critical software regions which actually manipulate the shared resources. The "test and set" operation "tests" the value of a semaphore to see if it has the proper value to allow access to its associated critical region and then "sets" the semaphore to this value as part of the same indivisible operation.

For example, suppose the binary semaphore P must have the value "1" before a process may enter the critical region guarded by the semaphore. A process wishing to enter that region then "tests and sets" P to "1"; i.e., P is tested for having the value "1" and then set to "1" regardless of the result of the test. If the test result is positive, the process does not enter the region; if the result is negative, the process enters the region, and the "set" portion of the indivisible "test and set" operation prevents any other process from entering the region. In the latter case, the successful process sets P back to "0" via a special operation as it exits the critical region, thereby giving other processes a chance to enter it.

Operations on semaphores must be supported by special instructions at the hardware level which guarantee mutual exclusivity when semaphores are being accessed. For example, if the "test and set" operation described above is performed as separate "test" and "set" operations, one process may test a semaphore and conclude it can enter the associated critical region, followed by another process which tests the same semaphore and reaches the same conclusion prior to the first process setting the semaphore to prevent further entries.

The ICC improves on the state of the art of dataflow computers by implementing a semaphore signalling mechanism specifically for use within a programmable, parallel dataflow environment. ICC semaphores are mainly used for the following purposes:

1. Limiting the number of data tokens in existence at any point in time.
2. Minimizing the size of dataflow programs.
3. Synchronizing program dataflow with external events.

The need for item 1 stems from the limited memory the ICC has on-chip for storing data tokens. Recall that the ICC can simultaneously store up to 128 tokens of all types (i.e., one per instruction) but only has room for 64 block allocation units (BAUs) which determines the maximum number of data tokens which can be stored. A data token requires either one or two BAUs, and an upper bound on the number of data tokens which can simultaneously exist in a flowgraph is one for each data token-producing instruction; i.e., one token may exist on every instruction output arc. Therefore, it is possible to create ICC programs which can theoretically require more BAUs than are available on-chip. A similar situation also exists for dataflow architectures other than the ICC, since all architectures eventually become memory-limited.

The ICC allows a programmer to limit data token memory usage by providing semaphore instructions which can be used to temporarily stop the flow of new data tokens into a flowgraph when the flowgraph is on the verge of potentially using too many BAUs. The ICC instructions supporting this are called TSTDEC (for "test and decrement semaphore") and INCSEM (for "increment semaphore").

FIG. 24 shows an example of how TSTDEC and INCSEM might be used. The principle behind the example is that each time a token is admitted into the flowgraph between the TSTDEC and INCSEM instructions, it "spawns" the creation of a bounded number of new tokens within the flowgraph. For example, each new two BAU data token entering the flowgraph through the TSTDEC instruction in FIG. 24 results in the generation of a maximum of two tokens for a net increase of four BAUs. Therefore, after N tokens have entered the flowgraph, a maximum of 2N new tokens or 4N BAUs will be created within the flowgraph. Of course, the net number of new tokens created does not continue to increase in an unbounded fashion since all tokens are consumed by the time they exit the flowgraph through the INCSEM instruction.

The example in FIG. 24 uses Semaphore Register 0 (SEEG0) to track the maximum number of BAUs in use by the flowgraph between the TSTDEC and INCSEM instructions. The INITSEM instruction initializes the semaphore to "8" which is two less than the maximum number of BAUs which will be allowed to exist in the flowgraph (why it is two less will be explained later). When a token is at the input to the TSTDEC instruction, the instruction "guards" entry into the flowgraph by comparing the value "4" (i.e., the maximum number of BAUs the input token will spawn) against the current value of the semaphore. If "4" is less than or equal to the semaphore's value (i.e., there is "room" in the flowgraph for the new token), TSTDEC decreases the semaphore by "4" and passes the token into the flowgraph; otherwise, TSTDEC does not pass the token and holds it at its input until the latter test condition is satisfied. Correspondingly at the bottom of the flowgraph, the INCSEM instruction increases the semaphore by "4" to account for all the incremental BAUs having been used up.

Note that the INCSEM instruction decreases the semaphore's value before consuming its input token. Therefore, to account for this token, the semaphore is initially set to two less than the maximum number of BAUs. Also note that the TSTDEC and INCSEM instructions are executed by the same hardware within the ICC which forces them to operate on the semaphore in a mutually exclusive fashion.

Figure 25:
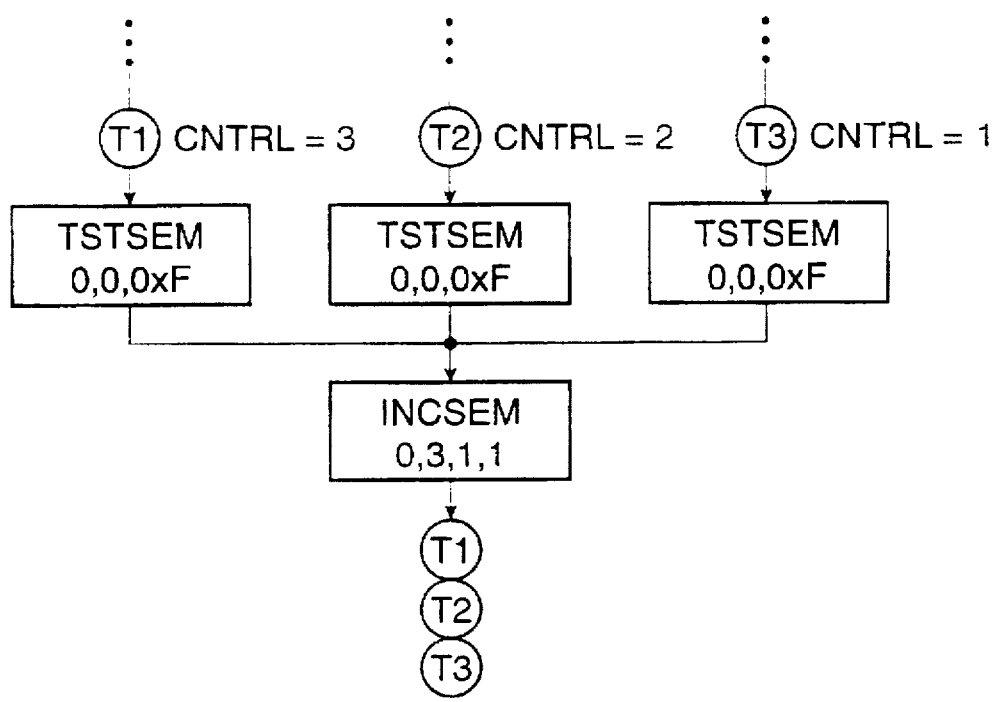

A second use for semaphores is to limit the size of ICC programs, since the ICC's program memory is only 128 words long. This is accomplished by using the TSTSEM and INCSEM semaphore instructions to time-multiplex tokens from multiple sources into the same flowgraph fragment, thereby avoiding the need to duplicate instructions. An example is shown in FIG. 25. A time-division multiplexer is formed by the three TSTSEM instructions whose outputs are connected to the input of the INCSEM instruction. Each TSTSEM instruction compares SEEG0 with the value of the cntrl field in the token descriptor of its input token. The input tokens are shown as T1, T2, and T3 in FIG. 25 and may show up at the inputs of their respective TSTSEM instructions in any order. If a cntrl field matches SEEG0, the TSTSEM instruction copies the input token to its output; otherwise, the TSTSEM instruction holds the token at its input until a match is achieved. The idea behind this is to sequentially number tokens using their cnrl fields so that only one TSTSEM instruction will pass its input at any point in time. The INCSEM instruction then copies the token from the active TSTSEM instruction to its own output and increments the semaphore so as to enable the multiplexer to pass the next token. As shown in FIG. 25, the INCSEM instruction outputs tokens in the order T3, T2, and T1 as determined by the values of their cntrl fields.

Figure 26:
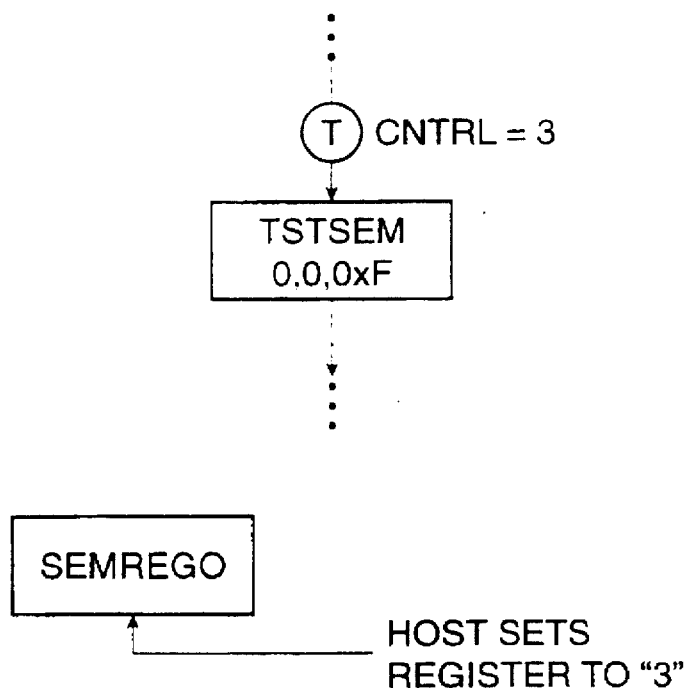

A third use for semaphores to allow an ICC dataflow program to be synchronized with events external to the ICC. This is accomplished by using the TSTSEM instruction to temporarily halt dataflow until an external host processor sets a semaphore to a predetermined value. For example, the TSTSEM instruction shown in FIG. 26 does not pass the input token "T" until the value "3" in its cmtrX field matches the value of SEMREG0. The host processor, in turn, eventually loads a "3" into SEMREG0 via the ICC host interface bus.

As it will be understood by those familiar with the art, the present invention may be embodied in other specific forms without departing from the spirit or essential characteristics thereof. Accordingly, the disclosure of the preferred embodiment of the invention is intended to be illustrative, but not limiting, of the scope of the invention which is set forth in the following claims. Some alternative embodiments are set forth below.

Each of the special purpose processing units could instead be a general purpose processing unit. Alternatively, the general purpose processing units could be programmed to become special purpose units depending upon the program, such that they will accept only certain instructions. In another embodiment, instead of each instruction being specified for a certain, specially configured processing unit, multiple processing units could be configured to handle a certain instruction, such that instructions would have a choice of multiple units to execute them, thus improving the pipeline operation.

In the described embodiment, each of the processing units is single-buffered, such that new tokens must wait until the unit is finished processing the previous token. Alternately, a double-buffering system could be used such that new instructions, data and tokens could be received while the processing unit is currently executing on previous data and instructions.

With respect to the token memory unit of FIG. 14, in one alternate embodiment the hardware can be set up to have a designated token address for each instruction; such that, for instance, instruction 1 will always correspond to token address 1, and instruction 2 to token address 2, etc. This would allow the elimination of the header stack memory which dynamically assigns token addresses to different instructions. Such a static designation will also allow the elimination of the operand RAM fields in the operand RAM format of FIG. 3A. Instead, these fields could be statically established upon initialization of the system. This would eliminate the need for the update unit to write into the operand fields, although the semaphore field and the operand present bit would still have to be written to by the update unit. In addition, the result packet format shown in FIG. 3B could eliminate the result token address, since this would simply correspond to the instruction address already present in the packet.

Other variations of the preferred embodiments of the present invention will be apparent to those of skill in the art, and accordingly the scope of the invention is as set forth in the following claims.

APPENDIX 1

4. Instruction Set Description

This section describes each ICC instruction in detail. Instructions are grouped into six functional classes: Arithmetic; Logical; Descriptor Modification; Dataflow Control; Video Memory; and Host Interface. Each instruction description begins with the instruction's opcode mnemonic (in bold caps) and list of applicable parameters (in italics); each parameter is prefixed in parentheses by the range of bit positions it occupies in the instruction word. The instruction's numeric opcode is shown in hex.

The following abbreviations are used to indicate the ICC functional unit assigned to execute each instruction: APU (Arithmetic Processor Unit); DPU (DCT Processor Unit); QPU (Quantization Processor Unit); DCU (Dataflow Control Unit); VIU (Video Interface Unit); RPU (Run Length Processor Unit); and TIU (Token Interface Unit).

4.1 Arithmetic Operations

ADD    (0)clip

"Add Tokens and Optionally Clip"

| | |
|---|---|
| Operation code: | 02 |
| Processor: | APU |
| Max. destinations: | 3 |
| Data operands: | OP1 - data token |
| | OP2 - data token |
| Parameters: | clip - 1 bit boolean constant |
| Result type: | data token |
| Function: | The least significant 9 bits of each data work in OP1 are added as a 2's complement number to the corresponding bits in OP2; the most significant 3 bits of each data work in OP1 and OP2 are discarded. If clip = 1, each sum |

|   |   |
|---|---|
|   | is interpreted as a 10 bit 2's complement value and clipped to the range [0,255]; if clip = 0, only the least significant 9 bits of each sum are retained and no clipping is performed. In either case, the final result is sign-extended (from bit 8) to a 12 bit, 2's complement number. The descriptor of the result token is copied from OP1. |
| Error conditions: | If either OP1 or OP2 is not a data token or the nblocks fields in their descriptors do not match, the result is a control token copied from OP1 but having its errflag bit set. errflag is also set if clip = 0 and an overflow occurred during an addition (i.e. one of the sums could not be represented as a 9 bit 2's complement number). |
| ADDCON | (9)clip, (8:0)const |
| "Add Constant to Token and Optionally Clip" | |
| Operation code: | 05 |
| Processor: | APU |
| Max. destinations: | 2 |
| Data operands: | OP1 - data token |
| Parameters: | clip - 1 bit boolean constant<br>const - 9 bit 2's complement constant |
| Result type: | data token |
| Function: | const is added to the least significant 9 bits of each data word in OP1; the most significant 3 bits of each data word in OP1 are discarded. If clip = 1, each |

|                    | sum is interpreted as a 10 bit 2's complement value and clipped to the range [0,255]; if clip = 0, only the least significant 9 bits of each sum are retained and no clipping is performed. In either case, the final result is sign-extended (from bit 8) to a 12 bit, 2's complement number. The descriptor of the result token is copied from OP1. |
|--------------------|---|
| Error conditions:  | If OP1 is not a data token, the result is a control token copied from OP1 but having its errflag bit set. errflag is also set if clip = 0 and an overflow occurred during an addition (i.e. one of the sums could not be represented as a 9 bit 2's complement number). |

| CLIP               | (15:8)minval, (7:0)maxval |
|--------------------|---|
| "Clip Token"       | |
| Operation code:    | 06 |
| Processor:         | APU |
| Max. destinations: | 1 |
| Data operands:     | OP1 - data token |
| Parameters:        | minval - 8 bit unsigned constant |
|                    | maxval - 8 bit unsigned constant |
| Result type:       | data token |
| Function:          | The least significant 9 bits of each data word in OP1 are treated as a 2's complement value and clipped as follows: if the value is less than minval, it is replaced by minval in the result token; if the value is greater than maxval, it is replaced by |

|  | maxval; otherwise, the value is left unchanged. The most significant 3 bits of each data work in OP1 are ignored and discarded. The descriptor of the result token is copied from OP1. |
| --- | --- |
| Error conditions: | If OP1 is not a data token, the result is a control token copied from OP1 but having its errflag bit set. |

AVERAGE
"Average Tokens"

|  |  |
| --- | --- |
| Operation code: | 03 |
| Processor: | APU |
| Max. destinations: | 3 |
| Data operands: | OP1 - data token |
|  | OP2 - data token |
| Parameters: | none |
| Result type: | data token |
| Function: | The least significant 9 bits of each data word in OP1 are added as a 2's complement number to the corresponding bits in OP2; the most significant 3 bits of each data word in OP1 and OP2 are discarded. Only the least significant 9 bits of the result are retained. The 10 bit sum is interpreted as a 2's complement value and divided by two; the result is rounded to the nearest integer, with half integers rounding away from zero (e.g. 1.5 rounds to 2.0, -1.5 rounds to -2.0), and sign-extended to a 12 bit, 2's complement number. Bits 95 through 22 of the result |

|  | descriptor are copied from bits 95 through 22 of OP1's descriptor, while bits 21 through 0 of the result descriptor are copied from bits 21 through 0 of OP2's descriptor (note: bit 95 is the most significant bit). |
|---|---|
| Error conditions: | If either OP1 or OP2 is not a data token or the nblocks fields in their descriptors do not match, the result is a control token copied from OP1 but having its errflag bit set. |

SUBTRACT
"Subtract Tokens"

| Operation code: | 04 |
|---|---|
| Processor: | APU |
| Max. destinations: | 3 |
| Parameters: | none |
| Result type: | data token |
| Function: | The least significant 9 bits of each data word in OP1 are subtracted as a 2's complement number from the corresponding bits in OP2; the most significant 3 bits of each data word in OP1 and OP2 are discarded. Only the least significant 9 bits of the difference are retained, and the final result is sign-extended (from bit 8) to a 12 bit, 2's complement number. The descriptor of the result token is copied from OP1. |
| Error conditions: | If either OP1 or OP2 is not a data token or the nblocks fields in their descriptors do not | match, the result is a control token copied from OP1 but having its errflag bit set. errflag is also set if an overflow occurred during a subtraction (i.e. one of the differences could not be represented as a 9 bit 2's complement number).

FILTER
"Loop-Filter Token"

| | |
|---|---|
| Operation code: | 01 |
| Processor: | APU |
| Max. destinations: | 3 |
| Data operands: | OP1 - data token |
| Parameters: | none |
| Result type: | data token |
| Function: | If bit 44 (i.e. usrbits(0)) of OP1's descriptor is set to "1", the least significant 8 bits of each data word in OP1 are loop-filtered as defined in the Px64 standard; the most significant 4 bits of OP1 are discarded. The final result is sign-extended (with zeros) to a 12 bit, 2's complement number. If bit 44 is "0", no loop filtering is performed, and the least significant 9 bits of each data word in OP1 is sign-extended by 3 bits to form a 12 bit, 2's complement number which is copied to the result token; the most significant 3 bits of each data word in OP1 are discarded. In any case, the descriptor of the result is copied from OP1. |

Error conditions: If OP1 is not a data token, the
result is a control token copied
from OP1 but having its errflag
bit set.

FDCT
"Forward DCT"
Operation code: 07
Processor: DPU
Max. destinations: 3
Data operands: OP1 - data token
Parameters: none
Result type: data token
Function: An 8 by 8 forward DCT is
performed on each data block in
the input token. Only the least
significant 9 bits of each word
in each data block are input to
the DCT; the 9 bits are
interpreted as a 2's complement
integer. The DCT produces 8 by 8
data blocks containing 12 bit 2's
complement integers which are
placed in the result token. The
descriptor of the result token is
copied from OP1.
Error conditions: If OP1 is not a data token, the
result is a control token copied
from OP1 but having its errflag
bit set.

IDCT
"Inverse DCT"
Operation code: 08
Processor: DPU
Max. destinations: 3
Data operands: OP1 - data token
Parameters: none

| | |
|---|---|
| Result type: | data token |
| Function: | An 8 by 8 inverse DCT is performed on the 12 bit 2's complement integers in each data block in the input token. The inverse DCT produces 8 by 8 data blocks containing 9 bit 2's complement integers which are then sign-extended to 12 bits and placed in the result token. The descriptor of the result token is copied from OP1. |
| Error conditions: | If OP1 is not a data token, the result is a control token copied from OP1 but having its errflag bit set. |
| | |
| FQUANT "Forward Quantize" | (4:2)clipsel, (1:0)algsel |
| Operation code: | 09 |
| Processor: | QPU |
| Max. destinations: | 3 |
| Data operands: | OP1 - data token |
| Parameters: | algsel - quantization algorithm select:<br>0 = Px64, 1 = MPEG, 2 = JPEG, 3 = illegal clipsel - clip range select:<br>000 = [-127, 127], 001 = [-255, 255], 010 = [-511, 511], 011 = [-1023, 1023], 1XX = [-2047, 2047] |
| Result type: | data token |
| Function: | Forward quantization is performed on the input token using the algorithm specified by algsel and described in Section 5. All non-(intra DC) quantization results |

|  | are clipped to the range specified by clipsel and sign-extended to 12 bits 2's complement; intra DC quantization results are not clipped but are also sign-extended to 12 bits 2's complement. The descriptor of the result token is copied from OP1. |
|---|---|
| Error conditions: | If OP1 is not a data token or algsel = 3, the result is a control token copied from OP1 but having its errflag bit set. |

| TFQUANT | (4:2)clipsel, (0)algsel |
|---|---|
| "Threshold and Forward Quantize" | |
| Operation code: | 0A |
| Processor: | QPU |
| Max. destinations: | 3 |
| Data operands: | OP1 - data token |
| Parameters: | algsel - quantization algorithm select: 0 = Px64, 1 = MPEG clipsel - clip range select: 000 = [-127, 127], 001 = [-255, 255], 010 = [-511, 511], 011 = [-1023, 1023], 1XX = [-2047, 2047] |
| Result type: | data token |
| Function: | The DCT coefficients in the input token are adaptively thresholded (if applicable) and forward quantized using the algorithms specified by algsel and described in Section 5. Note that only non-intra blocks (as identified by the mbtype field in the token descriptor) will be thresholded. All non-(intra DC) quantization |

|                  |                                                    |
|------------------|----------------------------------------------------|
|                  | results are clipped to the range specified by clipsel and sign-extended to 12 bits 2's complement; intra DC quantization results are not clipped but are also sign-extended to 12 bits 2's complement. The descriptor of the result token is copied from OP1. |
| Error conditions: | If OP1 is not a data token, the result is a control token copied from OP1 but having its errflag bit set. |

| | |
|---|---|
| CFQUANT | (4:2)clipsel, (0)algsel |
| "Forward Quantize with Clipping Control" | |
| Operation code: | 39 |
| Functional unit: | QPU |
| Max. destinations: | 3 |
| Data operands: | OP1 - data token |
| Result type: | data token |
| Parameters: | algsel - quantization algorithm select: 0 = Px64, 1 = MPEG clipsel - clip range select: 000 = [-127, 127], 001 = [-255, 255], 010 = [-511, 511], 011 = [-1023, 1023], 1XX = [-2047, 2047] |
| Function: | Forward quantization is performed on the input token using the algorithm specified by algsel and described in Section 5. the quantizer parameter used is nominally supplied by the quant field of OP1's token descriptor but is increased if necessary to prevent excessive quantization | clipping (as specified by clipsel) on zig-zagged coefficients 0 through LASTCLIP in each of OP1's data blocks, where LASTCLIP is the value stored in the LASTCLIP(5:0) register; coefficients above LASTCLIP are clipped as needed. Note that if mbtype = 0 (intra-mode) in OP1's token descriptor, the DC coefficient (i.e. coefficient 0) in OP1 is not subjected to either clipping or clipping control, regardless of the value of LASTCLIP. All final quantization results are sign-extended to 12 bits 2's complement. The descriptor of the result token is copied from OP1 with the exception that the quant field in the result descriptor is updated to reflect any changes required to prevent clipping.

Error conditions: If OP1 is not a data token, the result is a control token copied from OP1 but having its errflag bit set.

CTFQUANT (4:2)clipsel, (0)algsel
"Threshold and Forward Quantize with Clipping Control"
Operation code: 38
Functional unit: QPU
Max. destinations: 3
Data operands: OP1 - data token
Result type: data token

| | |
|---|---|
| Parameters: | algsel - quantization algorithm select: 0 = Px64, 1 = MPEG<br>clipsel - clip range select:<br>000 = [-127, 127], 001 = [-255, 255],<br>010 = [-511, 511], 011 = [-1023, 1023],<br>1XX = [-2047, 2047] |
| Function: | Adaptive thresholding and forward quantization are performed on the input token using the algorithms specified by algsel and described in Section 5. Adaptive thresholding is only performed if mbtype ≠ 0 (inter-mode) in OP1's token descriptor. The quantizer parameter used is nominally supplied by the quant field on OP1's token descriptor but is increased if necessary to prevent excessive quantization clipping (as specified by clipsel) on zig-zagged coefficients 0 through LASTCLIP in each of OP1's data blocks, where LASTCLIP is the value stored in the LASTCLIP(5:0) register; coefficients above LASTCLIP are clipped as needed. Note that if mbtype = 0 (intra-mode) in OP1's token descriptor, the DC coefficient (i.e. coefficient 0) in OP1 is not subjected to either clipping or clipping control, regardless of the value of LASTCLIP. All final quantization results are sign-extended to 12 bits 2's complement. The descriptor of |

|  |  |
|---|---|
|  | the result token is copied from OP1 with the exception that the quant field in the result descriptor is updated to reflect any changes required to prevent clipping. |
| Error conditions: | If OP1 is not a data token, the result is a control token copied from OP1 but having its errflag bit set. |
| IQUANT | (1:0)algsel |
| "Inverse Quantize" |  |
| Operation code: | 0B |
| Processor: | QPU |
| Max. destinations: | 3 |
| Data operands: | OP1 - data token |
| Parameters: | algsel - quantization algorithm select:<br>0 = Px64, 1 = MPEG, 2 = JPEG, 3 = illegal |
| Result type: | data token |
| Function: | Inverse quantization is performed on the input token using the algorithm specified by algsel and described in Section 5. The result is sign-extended to 12 bits 2's complement. The descriptor of the result token is copied from OP1. |
| Error conditions: | If OP1 is not a data token or algsel = 3, the result is a control token copied from OP1 but having its errflag bit set. |
| MEANSQ | (1:0)compsel |
| "Mean Square Value of Component 0" |  |
| Operation code: | 0C |

| | |
|---|---|
| Processor: | QPU |
| Max. destinations: | 3 |
| Data operands: | OP1 - data token |
| Parameters: | none |
| Result type: | control token |
| Function: | The mean square value of Component 0 in OP1 is computed and stored in sfield(23:0) of the result descriptor; the rest of the descriptor is copied from OP1. The mean square value meansq is computed as:<br>meansq = $[\Sigma(pel_i {}^* pel_i)]/n$<br>where:<br>n is 64, 128, or 256 depending on whether Component 0 contains one, two or four 8 by 8 data blocks, respectively;<br>$pel_i$ is one of n two's complement data words from Component 0 of OP1 and must be in the range [-256,255];<br>$\Sigma(\cdot)$ denotes a summation over all n pels in Component 0 of OP1; and "$(\cdot)/(\cdot)$" denotes integer division of two operands with rounding towards negative infinity; e.g. (-1)/2 = (-1) and 1/2 = 0.<br>Note that this instruction assumes that every data word in Component 0 of OP1 is in the range [-256, 255]; i.e. only the least significant 9 bits of each 12 bit data word in Component 0 are accessed. Note that no error is flagged if bits 11 through 9 of any data word in |

Component 0 do not match bit 8
                        from the same data word.
                        Therefore, meansq is always an
                        unsigned 16 bit positive integer
                        which is copied into sfield(15:0)
                        of the result token;
                        sfield(23:16) is set to zero.
Error conditions:       If OP1 is not a data token or
                        does not contain Component 0, the
                        result is a control token copied
                        from OP1 but having its errflag
                        bit set.

VAR                     (0)varsel
"Variance of Component 0"
Operation code:         0D
Processor:              QPU
Max. destinations:      3
Data operands:          OP1 - data token
Parameters:             varsel - variance output select:
                        0 = return variance of entire
                        component
                        1 = return minimum block variance
Result type:            control token
Function:               If varsel = 0, the variance of
                        Component 0 in OP1 is computed
                        over all data words in the
                        component and stored in
                        sfield(23:0) of the result
                        descriptor; if varsel = 1, the
                        variance of each data block in
                        Component 0 is computed
                        separately, and the minimum of
                        these variances is stored in
                        sfield(23:0) of the result
                        descriptor. In either case, the
                        rest of the result descriptor is
                        copied from OP1.

For varsel = 0, the variance var is computed as:

var = $\text{clip}\{[\Sigma(\text{pel}_i{}^*\text{pel}_i)]/n - (([\Sigma(\text{pel}_i)]/(n/16))^{**}2/256\}$ where:

n is 64, 128, or 256 depending on whether Component 0 contains one, two, or four 8 by 8 data blocks, respectively;

$\text{pel}_i$ is one of n two's complement data words from Component 0 of OP1 and must be in the range [-256,255];

$\Sigma(\cdot)$ denotes a summation over all n pels in Component 0 of OP1;

"$(\cdot)/(\cdot)$" denotes integer division of two operands with rounding towards negative infinity; e.g. (-1)/2 = (-1) and 1/2 = 0;

"$(\cdot)^{**}2$" denotes squaring of an operand;

"clip($\cdot$)" denotes clipping of negative operands to zero.

For varsel = 1, var = $\min\{\text{clip}\{[\Sigma_j(\text{pel}_{ij}{}^*\text{pel}_{ij})]/64 - (([\Sigma(\text{pel}_{ij})]/4)^{**})/256\}\}$ where:

$\text{pel}_{ij}$ is the $i^{th}$ two's complement data words from data block j of Component 0 in OP1 and must be in the range [-256,255];

$\Sigma_j(\cdot)$ denotes a summation over all 64 pels in data block j of Component 0;

"$(\cdot)/(\cdot)$" denotes integer division of two operands with

|  |  |
|---|---|
|  | rounding towards negative infinity; e.g. (-1)/2 = (-1) and 1/2 = 0; "(·)**2" denotes squaring of an operand; "clip(·)" denotes clipping of negative operands to zero; and "min(·)" denotes the minimum of the computed block variances. Note that this instruciton asumes that every data word in Component 0 of OP1 is in the range [-256, 255]; i.e. only the least significant 9 bits of each 12 bit data word in Component 0 are accessed. Note that n o error is flagged if bits 11 through 9 of any data word in Component 0 do not match bit 8 from the same data word. If rounding effects cause a negative difference to be formed during the final substraction in the calculation of a variance, the difference is forced to be zero. Therefore, var is always an unsigned 16 bit positive integer which is copied into sfield(15:0) of the result token; sfield(23.16) is set to zero. |
| Error conditions: | If OP1 is not a data token or does not contain Component 0, the result is a control token copied from OP1 but having its errflag bit set. |

ADAPTQ
"Adapt Quantizer"

| | |
|---|---|
| Operation code: | 34 |
| Functional unit: | QPU |
| Max. destinations: | 3 |
| Data operands: | OP1 - any token type |
| Result type: | control token |
| Parameters: | none |
| Function: | This instruction implements the adaptive quantization algorithm. The quant and sfield(15:0) fields in OP1's token descriptor together with the contents of the QGAIN(11:0), AGAIN(11:0), AVGACT(15:0), MINQ(4:0), MAXQ(4:0), PREVQ(4:0), and QDELTA(4:0) registers are the inputs to the algorithm; any data blocks associated with OP1 are discarded. The algorithm computes a new quantizer value which is output via the descriptor quant field of the result control token; other bits of the output token descriptor are copied from the corresponding bits of OP1. The algorithm also updates the contents of the AVGACT(15:0) and PREVQ(4:0) registers. |
| Error conditions: | none. |

| | |
|---|---|
| SUBVAL | (0)scale |
| "Subtract Scalar Values" | |
| Operation code: | 0E |
| Processor: | DCU |
| Max. destinations: | 3 |
| Data operands: | OP1 - any token type |

|                    | OP2 - any token type |
|---|---|
| Parameters:        | scale - scaling flag |
| Result type:       | control token |
| Function:          | If scale = 1, sfield(23:1) of OP1's token descriptor is sign extended to a 24 bit vlaue and subtracted from sfield(23:0) of OP2's descriptor; otherwise, sfield(23:0) of OP1's token descriptor is substracted from sfield(23:0) of OP2's descriptor. In either case, the subtraction is performed using 24 bit two's complement arithmetic, and the least significant 24 bits of the difference is written to sfield(23:0) of the result descriptor. The rest of the result descriptor is copied from OP1. |
| Error conditions:  | errflag is set in the result descriptor if the difference overflows, i.e. the difference cannot be represented in 24 bits 2's complement; a control token is returned as the result. |

4.2 Logical and Data Copying Operations
CMPVAL
"Compare Scalar Values"

| Operation code:   | OF |
|---|---|
| Processor:        | DCU |
| Max. destinations: | 3 |
| Data operands:    | OP1 - any token type |
|                   | OP2 - any token type |
| Parameters:       | none |
| Result type:      | control token |

| | |
|---|---|
| Function: | sfield(23:0) of OP1's token descriptor is compared with sfield(23:0) of OP2's descriptor; the two 24 bit values are compared as 2's complement numbers. If OP2 is greater than or equal to OP1, lflag of the result descriptor is set to "1"; otherwise, lflag is set to "0". The rest of the result descriptor is copied from OP1. |
| Error conditions: | none |
| | |
| TSTVAL | (20:0)const |
| "Test Scalar Value" | |
| Operation code: | 10 |
| Processor: | DCU |
| Max. destinations: | 1 |
| Data operands: | OP1 - any token type |
| Parameters: | const - 21 bit 2's complement number |
| Result type: | control token |
| Function: | const is sign extended to a 24 bit 2's complement number and then compared with sfield(23:0) of OP1's descriptor; sfield(23:0) is also treated as a 2's complement number. If OP1 is greater than or equal const, lflag of the result descriptor is set to "1"; otherwise, lflag is set to "0". The rest of the result descriptor is copied from OP1. |
| Error conditions: | none |
| | |
| TSTDSCR | (19:16)bytesel, (15:8)mask, (7:0)bconst |

"Test Descriptor"
Operation code: 11
Processor: DCU
Max. destinations: 1
Data operands: OP1 - any token type
Parameters: bytesel - 4 bit constant in range [0:11]
mask - 8 bit boolean constant
bconst - 8 bit boolean constant
Result type: control token
Function: Byte bytesel of OP1's descriptor is bit-wise ANDed with mask and the result bit-wise compared with bconst; if equal, sfield(24) is set to "1" in the result descriptor, otherwise it is set to "0". Descriptor bytes are numbered from 0 t 11, with byte 0 being the most significant. The rest of the result descriptor is copied from OP1 with the exception that type is set to 0.
Error conditions: If bytesel is greater than 11, execution is immediately terminated and errflag is set in the result descriptor; a control token is returned as the result.

TSTCNTR (9:8)cntrsel, (7:0)const
"Test Counter and Gate Token"
Operation code: 35
Processor: DCU
Max. destinations: 2
Data operands: OP1 - any token type
Parameters: cntrsel - counter select:
0 = vpos, 1 = hpos, 2 = cntr1, 3 = cntr2
const - 8 bit unsigned constant

| | |
|---|---|
| Result type: | control token |
| Function: | If counter cntrsel is less than const, lflag is set to "0" in the result descriptor; otherwise, lflag is set to "1". The comparison between the selected counter and const is performed using unsigned arithmetic. The rest of the result descriptor is copied from OP1 with the exception that type is set to 0. |
| Error conditions: | none. |

| | |
|---|---|
| BOOL | (2)compl1, (1)compl2, (0)op |
| "Logically Operate on Boolean Values" | |
| Operation code: | 12 |
| Processor: | DCU |
| Max. destinations: | 3 |
| Data operands: | OP1 - any token type |
| | OP2 - any token type |
| Parameters: | compl1 - 1 bit constant |
| | compl2 - 1 bit constant |
| | op - 1 bit constant |
| Result type: | control token |
| Function: | lflag of OP1's token descriptor and lflag of OP2's token descriptor are operated on as boolean values, with the result placed in lflag of the result descriptor. Other bits in the result descriptor are copied from OP1. The logical operation to be performed is selected as shown in the following table (the "⁻" operator refers to 1's complementation): |

| compl1 | compl2 | op | operation |
|---|---|---|---|
| 0 | 0 | 0 | OP1 .or. OP2 |

|   |   |   |                   |
|---|---|---|-------------------|
| 0 | 0 | 1 | OP1 .and. OP2     |
| 0 | 1 | 0 | OP1 .or. (~OP2)   |
| 0 | 1 | 1 | OP1 .and.(~OP2)   |
| 1 | 0 | 0 | (~OP1) .or. OP2   |
| 1 | 0 | 1 | (~OP1) .and.OP2   |
| 1 | 1 | 0 | (~OP1).or.(~OP2)  |
| 1 | 1 | 1 | (~OP1).and.(~OP2) |

Error conditions:   none

COPY                (0)copysel
"Copy Token"
Operation code:     13
Processor:          DCU
Max. destinations:  3
Data operands:      OP1 - data or control token
Parameters:         copysel - copy select:
                    0 = copy all of token, 1 = copy descriptor only
Result type:        If copysel = 1, a control token is generated; otherwise, same as OP1
Function:           If copysel = 0, OP1 is completely and unconditionally copied to the result token. If copysel = 1, the descriptor of OP1 is copied to the output as a control token; i.e. type is set to "0" in the descriptor of the result token, and any data blocks associated with OP1 are ignored.
Error conditions:   none.

4.3 Token Descriptor Modification

CRTOKEN             (4:3)nblocks, (2:0)comps
"Create Control Token"
Operation code:     15
Processor:          DCU

| | |
|---|---|
| Max. destinations: | 3 |
| Data operands: | none |
| Parameters: | nblocks - (number of data blocks in token) - 1; 2 bit constant |
| | comps - components present in token; 3 bit boolean constant |
| Result type: | control token |
| Function: | Creates a control token whose nblocks and comps fields are initialized using the like-named parameters above; all other fields are set to zero. This instruction fires unconditionally and only once during the execution of a program and assumes that the value of nblocks is consistent with comps and the contents of the component configuration registers, CONFIG0, CONFIG1, and CONFIG2. NOTE; all CRTOKEN instructions in a program must appear in low instruction memory and precede any other instruction types; a maximum of three CRTOKEN instructions may exist in a program. |
| Error conditions: | none |

| | |
|---|---|
| INCCNTR | (9:8)cntrsel, (7:0)const |
| "Unconditionally Increment Counter" | |
| Operation code: | 16 |
| Processor: | DCU |
| Max. destinations: | 2 |
| Data operands: | OP1 - any token type |
| Parameters: | cntrsel - counter select: |
| | 0 = vpos, 1 = hpos, 2 = cntr1, 3 = cntr2 |

|                    | const - 8 bit 2's complement constant |
|---|---|
| Result type:       | same as OP1 |
| Function:          | The counter field selected by cntrsel from OP1's token descriptor is incremented by the value const and copied into the corresponding field of the result token. Any data associated with OP1 are also copied into the result token. |
| Error conditions:  | none |

| CINCCNTR | (10)lsense, (9:8)cntrsel, (7:0)const |
|---|---|

"Conditionally Increment Counter"

| Operation code:    | 17 |
|---|---|
| Processor:         | DCU |
| Max. destinations: | 2 |
| Data operands:     | OP1 - any token type |
|                    | OP2 - any token type |
| Parameters:        | cntrsel - counter select: |
|                    | 0 = vpos, 1 = hpos, 2 = cntr1, 3 = cntr2 |
|                    | const - 8 bit 2's complement constant |
|                    | lsense - 1 bit boolean constant |
| Result type:       | same as OP1 |
| Function:          | If lflag of OP2's token descriptor has the value lsense, the counter field selected by cntrsel from OP1's token descriptor is incremented by the value const and copied into the corresponding field of the result token. Any data associated with OP1 are also copied into the result token. If lflag of OP2's |

|                    | token descriptor does not have the value Isense, OP1 is copied unmodified to the result token. |
|---|---|
| Error conditions:  | none |

| ADDCNTR | (3:2)cntrsel1, (1:0)cntrsel2 |
|---|---|
| "Add Counters" | |
| Operation code: | 18 |
| Processor: | DCU |
| Max. destinations: | 3 |
| Data operands: | OP1 - any token type |
|  | OP2 - any token type |
| Parameters: | cntrsel1 - OP1 counter select: |
|  | 0 = vpos, 1 = hpos, 2 = cntr1, 3 = cntr2 |
|  | cntrsel2 - OP2 counter select: |
|  | 0 = vpos, 1 = hpos, 2 = cntr1, 3 = cntr2 |
| Result type: | same as OP1 |
| Function: | Counter field cntrsel1 from OP1's token descriptor is added to counter field cntrsel2 from OP2's token descriptor and the result copied into counter field cntrsel1 of the result token. Any data associated with OP1 are also copied into the result token. |
| Error conditions: | none |

| COPYFLD | (11:8)bytesel, (7:0)mask |
|---|---|
| "Copy Descriptor Field from Operand 2 into Operand 1" | |
| Operation code: | 37 |
| Processor: | DCU |
| Max. destinations: | 2 |
| Data operands: | OP1 - any token type |
|  | OP2 - any token type |
| Parameters: | copyall - 1 bit boolean constant |

|                   |                                                      |
|-------------------|------------------------------------------------------|
| Result type:      | bytesel - 4 bit constant in range [0:11]<br>mask - 8 bit boolean constant<br>same as OP1 |
| Function:         | If copyall = 0, byte bytesel of OP2's token descriptor is bit-wise ANDed with mask, byte bytesel of OP1's descriptor is bit-wise ANDed with the one's complement of mask, and these two intermediate results are bit-wise ORed to form byte bytesel of the result descriptor; the rest of the result descriptor bytes are copied from OP1. Descriptor bytes are numbered from 0 to 11, with byte 0 being the most significant. If copyall = 1, the result descriptor, with the exception of bit 7 of byte 0, is completely copied from OP2's descriptor. In any case, any data associated with OP1 are also copied to the result token.<br>NOTE: This instruction always copies bit 7 of byte 0 (i.e. the type field) from OP1's token descriptor into the corresponding bit of the result descriptor regardless of the values of copyall, bytesel, and mask. |
| Error conditions: | If copyall = 0 and bytesel is greater than 11, execution is immediately terminated and errflag is set in the result descriptor; a control token is returned as the result. |

| | |
|---|---|
| SETDSCR | (19:16)bytesel, (15:8)mask, (7:0)bconst |
| "Unconditionally Set Descriptor Bits" | |
| Operation code: | 1B |
| Processor: | DCU |
| Max. destinations: | 1 |
| Data operands: | OP1 - any token type |
| Parameters: | bytesel - 4 bit constant in range [0:11] |
| | mask - 8 bit boolean constant |
| | bconst - 8 bit boolean constant |
| Result type: | same as OP1 |
| Function: | Byte bytesel of OP1's descriptor is bit-wise ANDed with mask and the result bit-wise Ored with bconst. The final modified byte is written to result descriptor along with the other unmodified bytes of OP1. Descriptor bytes are numbered from 0 to 11, with byte 0 being the most significant. Any data associated with OP1 are also copied to the result token. NOTE: This instruction unconditionally copies bit 7 of byte 0 (i.e. the type field) from OP1's token descriptor into the corresponding bit of the result descriptor regardless of the fvlaues of bytesel, bconst, and mask. |
| Error conditions: | If bytesel is greater than 11, execution is immediately terminated and errflag is set in the result descriptor; a control token is returned as the result. |

| | |
|---|---|
| CSETDSCR | (20)Isense, (19:16)bytesel, (15:8)mask, (7:0)bconst |
| "Conditionally Set Descriptor Bits" | |
| Operation code: | 1C |
| Processor: | DCU |
| Max. destinations: | 1 |
| Data operands: | OP1 - any token type |
| | OP2 - any token type |
| Parameters: | Isense - 1 bit boolean constant |
| | bytesel - 4 bit constant in range [0:11] |
| | mask - 8 bit boolean constant |
| | bconst - 8 bit boolean constant |
| Result type: | same as OP1 |
| Function: | If lflag of OP2's descriptor equals Isense, then byte bytesel of OP1's descriptor is bit-wise ANDed with mask and the result bit-wise Ored with bconst. The final modified byte is written to the result descriptor along with the other unmodified bytes of OP1. Descriptor bytes are numbered from 0 to 11, with byte 0 being the most significant. Any data associated with OP1 is also copied to the result token. If lflag of OP2's descriptor does not equal Isense, then OP1's descriptor is not modified, and the result token is a copy of OP1. NOTE: This instruction unconditionally copies bit 7 of byte 0 (i.e. the type field) from OP1's token descriptor into the corresponding bit of the result descriptor regardless of the |

|  |  |
|---|---|
| | values of bytesel, bconst, lsense, and mask. |
| Error conditions: | If bytesel is greater than 11, execution is immediately terminated and errflag is set in the result descriptor; a control token is returned as the result. |

SETQUANT
"Unconditionally Set Descriptor Quantizer"

|  |  |
|---|---|
| Operation code: | 1D |
| Processor: | DCU |
| Max. destinations: | 3 |
| Data operands: | OP1 - any token type |
| Parameters: | none |
| Result type: | same as OP1 |
| Function: | The quant field of OP1's descriptor is unconditionally set to the contents of the quantizer register QUANTREG and copied, along with the other descriptor bits, to the result token. Any data associated with OP1 are also copied to the result. |
| Error conditions: | none |

4.4 Dataflow Control

DGATE1   (20)lsense, (19:16)bytesel, (15:8)mask, (7:0)bconst

"Test Descriptor and Gate Token"

|  |  |
|---|---|
| Operation code: | 14h:internal |
| Processor: | DCU |
| Max. destinations: | 1 |
| Data operands: | OP1 - any token type |
| Parameters: | lsense - 1 bit boolean constant |
| | bytesel - 4 bit constant in range [0:11] |
| | mask - 8 bit boolean constant |

| | |
|---|---|
| | bconst - 8 bit boolean constant |
| Result type: | same as OP1 |
| Function: | Byte bytesel of OP1's descriptor is bit-wise ANDed with mask and the result bit-wise compared with bconst. If equal and Isense = 1 or if not equal and Isense = 0, OP1 is copied to the result token; otherwise, no output token is produced. Descriptor bytes are numbered from 0 to 11, with byte 0 being the most significant. |
| Error conditions: | If bytesel is greater than 11, execution is immediately terminated and errflag is set in the result descriptor; a control token is returned as the result. |
| | |
| DGATE2 | (20)Isense, (19:16)bytesel, (15:8)mask, (7:0)bconst |
| "Test Descriptor of Second Operand and Gate First Operand" | |
| Operation code: | 2F |
| Processor: | DCU |
| Max. destinations: | 1 |
| Data operands: | OP1 - any token type |
| | OP2 - any token type |
| Parameters: | Isense - 1 bit boolean constant |
| | bytesel - 4 bit constant in range [0:11] |
| | mask - 8 bit boolean constant |
| | bconst - 8 bit boolean constant |
| Result type: | same as OP1 |
| Function: | Byte bytesel of OP2's descriptor is bit-wise ANDed with mask and the result bit-wise compared with bconst. If equal and Isense = 1 |

|  | or if not equal and Isense = 0, OP1 is copied to the result token; otherwise, no output token is produced. Descriptor bytes are numbered from 0 to 11, with byte 0 being the most significant. |
|---|---|
| Error conditions: | If bytesel is greater than 11, execution is immediately terminated and errflag is set in the result descriptor; a control token is returned as the result. |
| CGATE | (10Isense, (9:8)cntrsel, (7:0)const |

"Test Counter and Gate Token"

| Operation code: | 36 |
|---|---|
| Processor: | DCU |
| Max. destinations: | 2 |
| Data operands: | OP1 - any token type |
| Parameters: | Isense - 1 bit boolean constant cntrsel - counter select: 0 = vpos, 1 = hpos, 2 = cntr1, 3 = cntr2 const - 8 bit unsigned constant |
| Result type: | same as OP1 |
| Function: | OP1 is copied to the result token if counter cntrsel is less than const and Isense = 0 or if counter cntrsel is greater than or equal to const and Isense = 1; otherwise, no output token is produced. The comparison between the selected counter and const is performed using unsigned arithmetic |
| Error conditions: | none. |

```
MINIMAX                  (4)maxsel
"Select minimum or maximum scalar value"
Operation code:    31
Processor:         DCU
Max. destinations: 3
Data operands:     OP1 - control token
                   OP2 - control token
Parameters:        maxsel - 1 bit boolean constant
Result type:       control token
Function:          sfield(23:0) of OP1's token
                   descriptor is compared with
                   sfield(23:0) of OP2's descriptor;
                   the two 24 bit values are treated
                   as 2's complement numbers. If
                   maxsel = 1 and OP2 is greater
                   than or equal to OP1, lflag is
                   set to "1" in the result
                   descriptor and the rest of the
                   descriptor is copied from OP2; if
                   OP2 is less than OP1, lflag is
                   set to "0" while the rest of the
                   descriptor is copied from OP1.
                   If maxsel = 0 and OP2 is greater
                   than or equal to OP1, lflag is
                   set to "1" in the result and the
                   rest is copied from OP1; if OP2
                   is less than OP1, lflag is set to
                   "0" while the rest of the
                   descriptor is copied from OP2.
Error conditions:  If either OP1 or OP2 is not a
                   control token, execution is
                   immediately terminated and
                   errflag is set in the result
                   descriptor.

GATE               (4)Isense
"Gate or Token"
Operation code:    1E
```

```
Processor:          DCU
Max. destinations:  3
Data operands:      OP1 - any token type
                    OP2 - any token type
Parameters:         Isense - 1 bit boolean constant
Result type:        same as OP1 -or- no result
Function:           If lflag of OP2's token
                    descriptor has the value Isense,
                    OP1 is copied to the result
                    token; otherwise, OP1 is
                    "consumed" and no result token is
                    generated.
Error conditions:   none FGATE               (4)Isense, (3:0)flagsel
"Gate on Flag"
Operation code:     1F
Processor:          DCU
Max. destinations:  3
Data operands:      OP1 - any token type
Parameters:         Isense - 1 bit boolean constant
                    flagsel - 4 bit constant in range
                    [0:15]
Result type:        same as OP1 -or- no result
Function:           If global flag flagsel has the
                    value Isense, OP1 is copied to
                    the result token; otherwise, OP1
                    is "consumed" and no result is
                    generated.
Error conditions:   none INITSEM             (9:8)semsel, (7:0)const
"Initialize Semaphore"
Operation code:     22
Processor:          DCU
Max. destinations:  2
Data operands:      OP1 - any token type
```

|   |   |
|---|---|
| Parameters: | semreg - semaphore register select; 2 bit constant |
|  | semnib - semaphore nibble select; 00 = bits 3:0, 01 = bit 7:4, 1X = bits 7:0 |
|  | const - 8 bit constant |
| Result type: | same as OP1 |
| Function: | Initializes the 8 bit semaphore register semreg as follows: if sembit = 00, bits 3:0 of the selected semaphore are set to bits 3:0 of const; if semnib = 01, bits 7:4 of the selected semaphore are set to bits 3:0 of const; finally, if sembit = 10 or 11, the entire semaphore is set to const. OP1 is then copied to the result token. |
| Error conditions: | none |
|  |  |
| TSTSEM | (9:8)semsel, (7:0)mask |
| "Test Semaphore" |  |
| Operation code: | 20 |
| Processor: | DCU |
| Max. destinations: | 2 |
| Data operands: | OP1 - any token type |
| Parameters: | semreg - semaphore register select; 2 bit constant |
|  | semnib - semaphore nibble select: 0 = bits 3:0, 1 = bits 7:4 |
|  | mask - 8 bit constant |
| Result type: | same as OP1 |
| Function: | Waits until the bit-wise ANDing of mask with the least significant 4 bits of cntrl in OP1's descriptor matches the bit-wise ANDing of mask with nibble semnib of semaphore register |

|  |  |
|---|---|
|  | semsel; then copies OP1 to the result token. |
| Error conditions: | none |
| TSTDEC | (11:10)semreg, (9:8)semnib, (7:4)contst1, (3:0)const2 |
| "Test and Decrement Semaphore" | |
| Operation code: | 3A |
| Functional unit: | DCU |
| Max. destinations: | 2 |
| Data operands: | OP1 - any token type |
| Result type: | same as OP1 |
| Parameters: | semreg - semaphore register select; 2 bit constant
semnib - semaphore nibble select: 00 = bits 3:0, 01 = bits 7:4, 1X = bits 7:0
const1 - 4 bit unsigned positive integer
const2 - 4 bit unsigned positive integer |
| Function: | If bit 5 of byte 0 (i.e. nblocks(1)) of OP1's token descriptor is zero, sets K = const1; otherwise, set k = const2. Then performs the following: if semnib = 00, waits until k is less than or equal to bits 3:0 of semaphore register semreg, then subtracts k from bits 3:0 of semaphore register semreg, leaving bits 7:4 unchanged; if semnib = 01, waits until k is less than or equal to bits 7:4 of semaphore register semreg, then subtracts k from bits 7:4 of semaphore register semreg and stores the 4 bit | difference back into bits 7:4 of
semaphore register semreg,
leaving bits 3:0 unchanged;
finally, if semnib = 10 or 11,
creates an 8 bit constant whose
most significant nibble is zero
and whose least significant
nibble is k, waits until this
constant is less than or equal to
semaphore register semreg, then
subtracts it from semaphore
register semreg and stores the 8
bit difference back into
semaphore register semreg. OP1
is then copied to the result
token. The operands in all of
the latter comparison and
subtraction operations are
treated strictly as unsigned
positive numbers.

Error conditions: none

INCSEM           (9:8)semsel, (7:0)const
"Increment Semaphore"
Operation code:  21
Processor:       DCU
Max. destinations: 2
Data operands:   OP1 - any token type
Parameters:      semreg - semaphore register
                 select; 2 bit constant
                 semnib - semaphore nibble select:
                 00 = bits 3:0, 01 = bits 7:4, 1X
                 = bits 7:0
                 const1 - 4 bit unsigned positive
                 integer
                 const2 - 4 bit unsigned positive
                 integer
Result type:     same as OP1

Function: If bit 5 of byte 0 (i.e.
nblocks(1) of OP1's token
descriptor is zero, sets k =
const1; othersie, set k = const2.
Then performs the following: if
semnib = 00, adds k to bits 3:0
of semaphore register semreg,
truncates the sum to 4 bits, and
stores the result back into bits
3:0 of semaphore register semreg,
leaving bits 7:4 unchanged; if
semnib = 01, adds k to bits 7:4
of semaphore register semreg,
trancates the sum to 4 bits, and
stores the result back into bits
7:4 of semaphore regiseter
semreg, leaving bits 3:00
unchanged; finally, if semnib =
10 or 11, creates an 8 bit
constant whose most significant
nibble is zero and whose least
significant nibble is k, adds it
to semaphore register semreg,
truncates the sum to 8 bits, and
stores it back into semaphore
register semreg. OP1 is then
copied to the result token.
Error conditions: none 4.5 Video Memory Instructions
RDV16              (12:10)memsel, (9:8)corgsel,
                   (7:4)horgsel, (3:0)vorgsel
"Read from Video Bus In 16 Bit Mode"
Operation code:    23
Processor:         VIU
Max. destinations: 2
Data operands:     OP1 - control or data token

| | |
|---|---|
| Parameters: | memsel - memory select; 3 bit constant |
| | corgsel - component origin register select; 2 bit constant |
| | horgsel - horizontal origin select: horiz. origin = horgsel *128 |
| | vorgsel - vertical origin select: vert. origin = vorgsel *128 |
| Result type: | data token |
| Function: | Reads 8 bit unsigned image components specified in OP1's token descriptor using two 8 bit video data busses jointly selected by memsel(2) and the "line swap" register set corgsel and creates an output data token. The 8 bit data are sign-extended (with zeros) to form 12 bit, 2's complement numbers. The data are read relative to the horizontal and vertical origins computed from horgsel, vorgsel. and the horizontal and vertical offset register set selected by corgsel, memsel(1:0) is output on the VMSEL(1:0) pins. an VMSEL(2) is set "high". The output token's descriptor is the same as OP1's, except that type is forced to be "1". If OP1 is a data token, its data blocks are ignored. See Section 6 for a complete explanation of how this instruction executes. |
| Error conditions: | none |
| RDV16FMV | (12:10)memsel, (9:8)corgsel, (7:4)horgsel, (3:0)vorgsel |

"Read from Video Bus Using Forward Motion Vector In 16 Bit Mode"

| | |
|---|---|
| Operation code: | 24 |
| Processor: | VIU |
| Max. destinations: | 2 |
| Data operands: | OP1 - control or data token |
| Parameters: | memsel - memory select; 3 bit constant |
| | corgsel - component origin register select; 2 bit constant |
| | horgsel - horizontal origin select: horiz. origin = horgsel *128 |
| | vorgsel - vertical origin select: vert. origin = vorgsel *128 |
| Result type: | data token |
| Function: | Reads 8 bit unsigned image components specified in OP1's token descriptor using two 8 bit video data busses jointly selected by memsel(2) and the "line swap" register set corgsel and creates an output data token. The 8 bit data are sign-extended (with zeros) to form 12 bit, 2's complement numbers. The data are fetched relative to the forward motion vector extracted from sfield(43:22) in OP1's token descriptor and the horizontal and vertical origins computed from horgsel, vorgsel, and the horizontal and vertical offset register set selected by corgsel. memsel(1:0) is output on the VMSEL(1:0) pins, and VMSEL(2) is set "high". The output token's descriptor is the same as Op1's, | except that type is forced to be "1". If OP1 is a data toke, its data blocks are ignored. See Section 6 for a complete explanation of how this instruction executes.

Error conditions: none

RDV16BMV        (12:10)memsel, (9:8)corgsel,
                (7:4)horgsel, (3:0)vorgsel "Read from Video Bus Using Backward Motion Vector In 16 Bit Mode"

Operation code: 25
Processor: VIU
Max. destinations: 2
Data operands: OP1 - control or data token
Parameters: memsel - memory select; 3 bit constant
corgsel - component origin register select; 2 bit constant
horgsel - horizontal origin select: horiz. origin = horgsel *128
vorgsel - vertical origin select: vert. origin = vorgsel *128
Result type: data token
Function: Reads 8 bit unsigned image components specified in OP1's token descriptor using two 8 bit video data busses jointly selected by memsel(2) and the "line swap" register set corgsel and creates an output data token. The 8 bit data are sign-extended (with zeros) to form 12 bit, 2's complement numbers. The data are fetched relative to the backward motion vector extracted from

|  |  |
|---|---|
|  | sfield(21:0) in OP1's descriptor and the horizontal and vertical origins computed from horgsel, vorgsel, and the horizontal and vertical offset regiseter set selected by corgsel. memsel(1:0) is output on the V1MSEL(1:0) pins, and VMSEL(2) is set "high". The output token's descriptor is the same as OP1's, except that type is forced to be "1". If OP1 is a data toke, its data blocks are ignored. See Section 6 for a complete explanation of how this instruction executes. |
| Error conditions: | none |
|  |  |
| WRV16 | (12:10)memsel, (9:8)corgsel, (7:4)horgsel, (3:0)vorgsel |
| "Write to Video Bus In 16 Bit Mode" | |
| Operation code: | 26 |
| Processor: | VIU |
| Max. destinations: | 0 |
| Parameters: | memsel - memory select; 3 bit constant<br>corgsel - component origin register select; 2 bit constant<br>horgsel - horizontal origin select: horiz. origin = horgsel *128<br>vorgsel - vertical origin select: vert. origin = vorgsel *128 |
| Result type: | none |
| Function: | Writes the 8 LSBs from each of OP1's data words to the components specified in OP1's token descriptor using two 8 bit video data busses jointly |

|  |  |
|---|---|
|  | selected by memsel(2) and the "line swap" register set corgsel.. The data are written relative to the horizontal and vertical origins computed from horgsel, vorgsel, and the horizontal and vertical offset register set selected by corgsel. memsel(1:0) is output on the V1MSEL(1:0) pins, and VMSEL(2) is set "high". Unless an error is detected, no output token is created. See Section 6 for a complete explanation of how this instruction executes. |
| Error conditions: | An error is detected if OP1 is not a data token; in this case, no data are written to memory, and the VIU creates an output control token copied from OP1's descriptor but whose errflag is set to "1". |

| | |
|---|---|
| WRV16.S | (12:10)memsel, (9:8)corgsel, (7:4)horgsel, (3:0)vorgsel |
| "Write to Video Bus In 16 Bit Mode and Signal Completion" | |
| Operation code: | 32 |
| Processor: | VIU |
| Max. destinations: | 0 |
| Parameters: | memsel - memory select; 3 bit constant |
| | corgsel - component origin register select; 2 bit constant |
| | horgsel - horizontal origin select: horiz. origin = horgsel *128 |

|  |  |
|---|---|
|  | vorgsel - vertical origin select: vert. origin = vorgsel *128 |
| Result type: | control token |
| Function: | Writes the 8 LSBs from each of OP1's data words to the components specified in OP1's token descriptor using two 8 bit video data busses jointly selected by memsel(2) and the "line swap" register set corgsel. The data are written relative to the horizontal and vertical origins computed from horgsel, vorgsel, and the horizontal and vertical offset register set selected by corgsel. memsel(1:0) is output on the V1MSEL(1:0) pins, and VMSEL(2) is set "high". The instruction result is a control token whose descriptor is copied from OP1, except that lflag is forced to be "1". See Section 6 for a complete explanation of how this instruction executes. |
| Error conditions: | An error is detected if OP1 is not a data token; in this case, no data are written to memory, and the VIU creates an output control token copied from OP1's descriptor but whose errflag is set to "1". |
| RDV32 | (12:10)memsel, (9:8)corgsel, (7:4)horgsel, (3:0)vorgsel |

"Read from Video Bus In 32 Bit Mode"
Operation code:   27
Processor:   VIU

| | |
|---|---|
| Max. destinations: | 2 |
| Data operands: | OP1 - control or data token |
| Parameters: | memsel - memory select; 3 bit constant |
| | corgsel - component origin register select; 2 bit constant |
| | horgsel - horizontal origin select: horiz. origin = horgsel *128 |
| | vorgsel - vertical origin select: vert. origin = vorgsel *128 |
| Result type: | data token |
| Function: | Reads 8 bit unsigned image components from the video bus as specified in OP1's token descriptor using the 32 bit bus mode and creates an output data token. The 8 bit data are sign-extended (with zeros) to form 12 bit, 2's complement numbers. The data are read relative to the horizontal and vertical origins computed from horgsel, vorgsel. and the horizontal and vertical offset register set selected by corgsel. The memsel parameter is output on the VMSEL(2:0) pins. The output token's descriptor is the same as OP1's, except that type is forced to be "1". If OP1 is a data token, its data blocks are ignored. See Section 6 for a complete explanation of how this instruction executes. |
| Error conditions: | none |
| | |
| RDV32FMV | (12:10)memsel, (9:8)corgsel, (7:4)horgsel, (3:0)vorgsel |

"Read from Video Bus Using Forward Motion Vector In 32 Bit Mode"

| | |
|---|---|
| Operation code: | 28 |
| Processor: | VIU |
| Max. destinations: | 2 |
| Data operands: | OP1 - control or data token |
| Parameters: | memsel - memory select; 3 bit constant |
| | corgsel - component origin register select; 2 bit constant |
| | horgsel - horizontal origin select: horiz. origin = horgsel *128 |
| | vorgsel - vertical origin select: vert. origin = vorgsel *128 |
| Result type: | data token |
| Function: | Reads 8 bit unsigned image components from the video bus as specified in OP1's token descriptor using the 32 bit bus mode and creates an output data token. The 8 bit data are sign-extended (with zeros) to form 12 bit, 2's complement numbers. The data are fetched relative to the forward motion vector extracted from sfield(43:22) in OP1's token descriptor and the horizontal and vertical origins computed from horgsel, vorgsel. and the horizontal and vertical offset register set selected by corgsel. The memsel parameter is output on the VMSEL(2:0) pins. The output token's descriptor is the same as OP1's, except that type is forced to be "1". If OP1 is a data token, its data blocks are |

|  |  |
|---|---|
|  | ignored. See Section 6 for a complete explanation of how this instruction executes. |
| Error conditions: | none |
| RDV32BMV | (12:10)memsel, (9:8)corgsel, (7:4)horgsel, (3:0)vorgsel |
| "Read from Video Bus Using Backward Motion Vector In 32 Bit Mode" | |
| Operation code: | 29 |
| Processor: | VIU |
| Max. destinations: | 2 |
| Data operands: | OP1 - control or data token |
| Parameters: | memsel - memory select; 3 bit constant |
|  | corgsel - component origin register select: 2 bit constant |
|  | horgsel - horizontal origin select: horiz. origin = horgsel *128 |
|  | vorgsel - vertical origin select: vert. origin = vorgsel *128 |
| Result type: | data token |
| Function: | Reads 8 bit unsigned image components from the video bus as specified in OP1's token descriptor using the 32 bit bus mode and creates an output data token. The 8 bit data are sign-extended (with zeros) to form 12 bit, 2's complement numbers. The data are fetched relative to the backward motion vector extracted from sfield(21:0) in OP1's token descriptor and the horizontal and vertical origins computed from horgsel, vorgsel. and the horizontal and vertical offset | register set selected by corgsel. The memsel parameter is output on the VMSEL(2:0) pins. The output token's descriptor is the same as OP1's, except that type is forced to be "1". If OP1 is a data token, its data blocks are ignored. See Section 6 for a complete explanation of how this instruction executes.

Error conditions: none

WRV32      (12:10)memsel, (9:8)corgsel,
           (7:4)horgsel, (3:0)vorgsel
"Write to Video Bus In 32 Bit Mode"
Operation code:    2A
Processor:         VIU
Max. destinations: 0
Data operands:     OP1 - data token
Parameters:        memsel - memory select; 3 bit constant
                   corgsel - component origin register select; 2 bit constant
                   horgsel - horizontal origin select: horiz. origin = horgsel *128
                   vorgsel - vertical origin select: vert. origin = vorgsel *128
Result type:       none
Function:          Writes the 8 LSBs from each of OP1's data words to the appropriate components on the video bus as specified in OP1's token descriptor using the 32 bit bus mode. The data are written relative to the horizontal and vertical origins computed from horgsel, vorgsel, and the

|  |  |
|---|---|
|  | horizontal and vertical offset register set selected by corgsel. The memsel parameter is output on the V1MSEL(2:0) pins. Unless an error is detected, no output token is created. See Section 6 for a complete explanation of how this instruction executes. |
| Error conditions: | An error is detected if OP1 is not a data token; in this case, no data are written to memory, and the VIU creates an output control token copied from OP1's descriptor but whose errflag is set to "1". |
| WRV32.S | (12:10)memsel, (9:8)corgsel, (7:4)horgsel, (3:0)vorgsel |
| "Write to Video Bus In 32 Bit Mode and Signal Completion" | |
| Operation code: | 33 |
| Processor: | VIU |
| Max. destinations: | 2 |
| Data operands: | OP1 - data token |
| Parameters: | memsel - memory select; 3 bit constant |
|  | corgsel - component origin register select; 2 bit constant |
|  | horgsel - horizontal origin select: horiz. origin = horgsel *128 |
|  | vorgsel - vertical origin select: vert. origin = vorgsel *128 |
| Result type: | control token |
| Function: | Writes the 8 LSBs from each of OP1's data words to the appropriate components on the video bus as specified in OP1's |

|                   | token descriptor using the 32 bit bus mode. The data are written relative to the horizontal and vertical origins computed from horgsel, vorgsel, and the horizontal and vertical offset register set selected by corgsel. The memsel parameter is output on the V1MSEL(2:0) pins. The instruction result is a control token whose descriptor is copied from OP1, except that lflag is forced to be "1". See Section 6 for a complete explanation of how this instruction executes. |
| Error conditions: | An error is detected if OP1 is not a data token; in this case, no data are written to memory, and the VIU creates an output control token copied from OP1's descriptor but whose errflag is set to "1". |

4.6 Host Interface Instructions
   RUNENC
   "Run Encode"

| Operation code:    | 2B |
| Processor:         | RPU |
| Max. destinations: | 0 |
| Data operands:     | OP1 - data token |
| Parameters:        | none |
| Result type:       | none |
| Function:          | The data in OP1 are zig-zagged and run-coded and then prefixed with data from OP1's token descriptor; these data are then packed and written into OUTFIFO in the host interface unit as |

|   |   |
|---|---|
| | described in Section 7. Unless an error is detected, no result token is output. |
| Error conditions: | An error is detected if OP1 is not a data token; in this case, no data are run length encoded, and the RPU creates an output control token copied from OP1's descriptor but whose errflag bit is set to "1". |

RUNENC.S
"Run Encode and Signal Completion"

|   |   |
|---|---|
| Operation code: | 2C |
| Processor: | RPU |
| Max. destinations: | 3 |
| Data operands: | OP1 - data token |
| Parameters: | none |
| Result type: | control token |
| Function: | The data in OP1 are zig-zagged and run-coded and then prefixed with data from OP1's token descriptor; these data are then packed and written into OUTFIFO in the host interface unit as described in Section 7. The descriptor of the result token is copied from OP1, except that lflag is set to "1". |
| Error conditions: | If OP1 is not a data token, errflag is set to "1" in the output control token's descriptor, and no run length encoding is performed. |

RUNDEC
"Run Decode"

|   |   |
|---|---|
| Operation code: | 2D |

| | |
|---|---|
| Processor: | RPU |
| Max. destinations: | 3 |
| Data operands: | none |
| Parameters: | none |
| Result type: | data token |
| Function: | A run-coded, zig-zag ordered data stream from input rate buffer (INFIFO) is inverse zig-zagged and run-decoded to form a data token as described in Section 7. |
| Error conditions: | If a data block with more than 64 sero and non-zero values is detected during run length decoding, a control token having its errflag bit set to "1" is returned as the result; other bits in the token are undefined. |

SNOOP
"Snoop Token from Program Dataflow"

| | |
|---|---|
| Operation code: | 2E |
| Processor: | TIU |
| Max. destinations: | 0 |
| Parameters: | none |
| Result type: | none |
| Function: | OP1 is copied into the TIU's Token Passing Buffer for inspection by the host processor. This instruction fires only if TPBSEL = 3 and TPBFULL = 0. |
| Error conditions: | none |

SNEAK
"Sneak Token into Program Dataflow"

Operation code: 30
Processor: TIU
Max. destinations: 3
Data operands: none
Parameters: none
Result type: control or data token as determined by the contents of the Token Passing Buffer (TPB) in the TIU
Function: The contents of the TPB are copied into the program's dataflow as a control or data token as determined by the most significant bit of TPB(0). This instruction fires only if TPBSEL = 2, TPBFULL = 1, and TPBADR contains the address of the SNEAK instruction.
Error conditions: none

What is claimed is:

1. An image compression coprocessor integrated on a single semiconductor chip comprising:

control unit means for operating said coprocessor in accordance with a stored program;

an internal bus coupled to said control unit means; and a plurality of special purpose processing means, each coupled to said bus, for performing a subset of a group of steps in an image compression/decompression process;

wherein said control unit means contains an instruction memory for holding at least first and second programs loaded from an external host, and means for causing the execution of instructions from said first program prior to completion of said second program.

2. The image compression coprocessor of claim 1 wherein each of said special purpose processing means have different, special purpose hardware.

3. The image compression coprocessor of claim 1 wherein said stored program is a data flow program, and said control unit means transfers instructions and data tokens to said plurality of special purpose processing means over said bus;

wherein each of said data tokens includes from one to a plurality of blocks of data or data vectors;

wherein each of said data tokens further includes a token descriptor identifying said token as a data token and indicating the number of blocks of data attached.

4. The image compression coprocessor of claim 1 wherein said stored program is a data flow program, and said control unit means transfers instructions and data tokens to said plurality of special purpose processing means over said bus;

wherein said instructions are transferred to said plurality of processing means in packets separately from data or control signals for said processing means.

5. The image compression coprocessor of claim 1 wherein each of said special purpose processing means have different, special purpose hardware;

wherein said stored program is a data flow program, and said control unit means transfers instructions and data tokens to said plurality of special purpose processing means over said bus;

wherein a plurality of said processing means include:

instruction register means, coupled to said bus, for holding one of said instructions;

buffer means, coupled to said bus, for holding said at least one of said data tokens;

processing logic means, coupled to said buffer means and said instruction register means, for performing said subset of steps; and state machine means, coupled to said instruction register means and said buffer means, for controlling the interfacing of said instruction register and buffer with said bus.

6. An image compression coprocessor integrated on a single semiconductor chip comprising:

control unit means for operating said coprocessor in accordance with a stored program;

an internal bus coupled to said control unit means; and a plurality of special purpose processing means, each coupled to said bus, for performing a subset of a group of steps in an image compression/decompression process;

wherein each of said special purpose processing means have different, special purpose hardware;

wherein said stored program is a data flow program, and said control unit means transfers instructions and data tokens to said plurality of special purpose processing means over said bus;

a host interface port for coupling to a master host processor; and run length processor means, connected between said bus and said host interface port, for converting data between said token format and a run length format for communicating with said master host processor.

7. An image compression coprocessor integrated on a single semiconductor chip comprising:

control unit means for operating said coprocessor in accordance with a stored program;

an internal bus coupled to said control unit means; and a plurality of special purpose processing means, each coupled to said bus, for performing a subset of a group of steps in an image compression/decompression process;

wherein each of said special purpose processing means have different, special purpose hardware;

wherein said stored program is a data flow program, and said control unit means transfers instructions and data tokens to said plurality of special purpose processing means over said bus;

a host interface port for coupling to a master host processor; and token interface means, coupled between said bus and said host interface port, for allowing said host processor to insert tokens directly and to view tokens on said bus.

8. The image compression coprocessor of claim 1 further comprising:

a video interface for coupling said bus to external video memory; and a processor interface for coupling said bus to an external host processor.

9. The image compression coprocessor of claim 1 wherein said control unit means further comprises bus arbitration means, coupled to said bus, for arbitrating use of said bus between said control unit means and said plurality of processing means.

10. An image compression coprocessor integrated on a single semiconductor chip comprising:

control unit means for operating said coprocessor in accordance with a stored program;

an internal bus coupled to said control unit means; and a plurality of special purpose processing means, each coupled to said bus, for performing a subset of a group of steps in an image compression/decompression process;

wherein each of said special purpose processing means have different, special purpose hardware;

wherein said stored program is a data flow program, and said control unit means transfers instructions and data tokens to said plurality of special purpose processing means over said bus;

a semaphore register coupled to said control unit means;

a plurality of semaphore instructions in said data flow program for modifying a count in said semaphore register upon the accessing of a token, comparing a value in said semaphore register with a value in a token and preventing a new data token from being accessed if said semaphore value exceeds a maximum value, and modifying said count upon a data token leaving said control unit.

11. The image compression coprocessor of claim 10 wherein a first semaphore instruction tests and decrements said count before each instruction requiring a data token, and a second semaphore instruction increments said count after each data token leaves said control unit.

12. An image compression coprocessor integrated on a single semiconductor chip comprising:

control unit means for operating said coprocessor in accordance with a stored program;

an internal bus coupled to said control unit means; and a plurality of special purpose processing means, each coupled to said bus, for performing a subset of a group of steps in an image compression/decompression process;

wherein each of said special purpose processing means have different, special purpose hardware;

wherein said stored program is a data flow program, and said control unit means transfers instructions and data tokens to said plurality of special purpose processing means over said bus;

a semaphore register coupled to said control unit means;

a plurality of instructions in said data flow program having a control field with a number; and means for comparing said number in said control field in an instruction with a count in said semaphore register and passing said instruction through said control unit means for processing when said number matches said count.

13. The image compression coprocessor of claim 12 wherein said number in said control field is one number in a sequence, and further comprising means for modifying said count in said semaphore register such that only one instruction is allowed to pass at a time.

14. The coprocessor of claim 1 wherein said control unit comprises:

an internal bus interface coupled to said internal bus;

an enabled instruction queue means, coupled to said internal bus interface, for holding instructions to be transferred to said special purpose processing means;

a data token memory coupled to said internal bus interface; and update unit means, coupled to said enabled instruction queue means, for providing instructions to said enabled instruction queue means.

15. The coprocessor of claim 14 wherein said update unit means comprises:

first means for determining if an instruction is in said enabled instruction queue means;

second means for determining if data tokens associated with said instruction are in said data token memory;

third means for determining if a one of said special purpose processing means required by said instruction is busy;

means for providing said instruction to said enabled instruction queue means responsive to said first, second and third means for determining.

16. The coprocessor of claim 14 further comprising:

fourth means for determining if said enabled instruction queue means is full.

17. The coprocessor of claim 14 wherein said update unit means further comprises:

a semaphore register; and means, coupled to said semaphore register, for modifying a count in said semaphore register upon accessing a data token in said data token memory, testing a semaphore value in said semaphore register and preventing a new data token from being accessed if said semaphore value exceeds a maximum value, and modifying said count upon a data token leaving said control unit.

18. An image compression coprocessor integrated on a single semiconductor chip comprising:

control unit means for operating said coprocessor in accordance with a stored program;

an internal bus coupled to said control unit means; and a plurality of special purpose processing means, each coupled to said bus, for performing a subset of a group of steps in an image compression/decompression process;

wherein each of said special purpose processing means have different, special purpose hardware;

wherein said stored program is a data flow program, and said control unit means transfers instructions and data tokens to said plurality of special purpose processing means over said bus;

a first register, wherein said program includes a CRTOKEN instruction which can be executed only once in said program, said CRTOKEN instruction being allowed to execute only if said first register has a first value, said CRTOKEN instruction causing said first register to assume a value other than said first value after execution, said coprocessor including reset means for changing said first register to said first value.

19. The coprocessor of claim 1 further comprising:

wherein said stored program is a data flow program, and said control unit means transfers instructions and data tokens to said plurality of special purpose processing means over said bus;

a block allocation memory for storing blocks of data for said data tokens;

a token address memory for storing pointers to said blocks of memory, each of said pointers corresponding to a data token; and control means, coupled to said token address memory, for copying a block of data from one data token to another data token by modifying said pointers.

20. The coprocessor of claim 19 further comprising a header memory for storing descriptors for said data tokens, said token address memory storing pointers to both a descriptor in said header memory and a block of data in said block allocation memory for each data token.

21. The coprocessor of claim 15 further comprising fourth means for determining if a functional unit in an external processor is busy.

22. The coprocessor of claim 21 wherein one of said special purpose processing means is an auxiliary interface unit for interfacing with external processing units, and wherein said fourth means comprises a status table in said auxiliary interface unit.

23. The coprocessor of claim 22 wherein said status table is a status register having a location for each functional unit, and further comprising:

means for setting a first status bit in said status register upon the transmission of an instruction designating a first functional unit in said external processor; and means for clearing said first status bit upon the reception of a result packet from said first functional unit in said external processor.

24. The coprocessor of claim 17 wherein said internal bus interface includes a scalar processor unit means for copying an operand of a semaphore instruction to a result token after said modifying a count and testing a semaphore value in said update unit means.

25. The processor of claim 1 wherein a plurality of said processing means include:

an instruction register, coupled to said bus, for holding one of said instructions;

a buffer, coupled to said bus, for holding at least one of said data tokens;

processing logic, coupled to said buffer and said instruction register, for performing said subset of steps; and a state machine, coupled to said instruction register and said buffer, for controlling the interfacing of said instruction register and buffer with said bus.

26. A processor integrated on a single semiconductor chip comprising:

a control unit;

a memory, coupled to said control unit, having a stored program;

an internal bus coupled to said control unit; and a plurality of processing circuits, each coupled to said bus, for performing a subset of a group of steps in a process performed by said processor;

wherein said stored program is a data flow program, and said control unit transfers instructions and data tokens to said plurality of processing circuits over said bus;

wherein said data tokens are data vectors;

a host interface port for coupling to a master host processor;

run length processor means, connected between said bus and said host interface port, for converting data between said token format and a run length format for communicating with said master host processor.

27. A processor integrated on a single semiconductor chip comprising:

a control unit;

a memory, coupled to said control unit, having a stored program;

an internal bus coupled to said control unit; and a plurality of processing circuits, each coupled to said bus, for performing a subset of a group of steps in a process performed by said processor;

wherein said stored program is a data flow program, and said control unit transfers instructions and data tokens to said plurality of processing circuits over said bus;

wherein said data tokens are data vectors;

a host interface port for coupling to a master host processor; and token interface means, coupled between said bus and said host interface port, for allowing said host processor to insert tokens directly and to view tokens on said bus.

28. The processor of claim 1 further comprising an auxiliary unit, coupled between said global bus and an auxiliary interface, for coupling an external auxiliary processor to said global bus.

29. A processor integrated on a single semiconductor chip comprising:

a control unit;

a memory, coupled to said control unit, having a stored program;

an internal bus coupled to said control unit; and a plurality of processing circuits, each coupled to said bus, for performing a subset of a group of steps in a process performed by said processor;

wherein said stored program is a data flow program, and said control unit transfers instructions and data tokens to said plurality of processing circuits over said bus;

wherein said data tokens are data vectors;

a semaphore register coupled to said control unit;

a plurality of semaphore instructions in said data flow program for modifying a count in said semaphore register upon the accessing of a token, comparing a value in said semaphore register with a value in a token and preventing a new data token from being accessed if said semaphore value exceeds a maximum value, and modifying said count upon a data token leaving said control unit.

30. The processor of claim 29 wherein a first semaphore instruction tests and decrements said count before each instruction requiring a data token, and a second semaphore instruction increments said count after each data token leaves said control unit.

31. A processor integrated on a single semiconductor chip comprising:

a control unit;

a memory, coupled to said control unit, having a stored program;

an internal bus coupled to said control unit; and a plurality of processing circuits, each coupled to said bus, for performing a subset of a group of steps in a process performed by said processor;

wherein said stored program is a data flow program, and said control unit transfers instructions and data tokens to said plurality of processing circuits over said bus;

wherein said data tokens are data vectors;

a semaphore register coupled to said control unit means;

a plurality of instructions in said data flow program having a control field with a number; and means for comparing said number in said control field in an instruction with a count in said semaphore register and passing said instruction through said control unit means for processing when said number matches said count.

32. The processor of claim 31 wherein said number in said control field is one number in a sequence, and further comprising means for modifying said count in said semaphore register such that only one instruction is allowed to pass at a time.

33. A processor integrated on a single semiconductor chip comprising:

a control unit;

a memory coupled to said control unit, having a stored program;

an internal bus coupled to said control unit; and a plurality of processing circuits, each coupled to said bus, for performing a subset of a group of steps in a process performed by said processor;

wherein said stored program is a data flow program, and said control unit transfers instructions and data tokens to said plurality of processing circuits over said bus;

wherein said data tokens are data vectors;

an internal bus interface coupled to said internal bus;

an enabled instruction queue means, coupled to said internal bus interface, for holding instructions to be transferred to said processing circuits;

a data token memory coupled to said internal bus interface; and an update unit, coupled to said enabled instruction queue, for providing instructions to said enabled instruction queue;

a semaphore register; and means, coupled to said semaphore register, for modifying a count in said semaphore register upon accessing a data token in said data token memory, testing a semaphore value in said semaphore register and preventing a new data token from being accessed if said semaphore value exceeds a maximum value, and modifying said count upon a data token leaving said control unit.

34. A processor integrated on a single semiconductor chip comprising:

a control unit;

a memory, coupled to said control unit, having a stored program;

an internal bus coupled to said control unit; and a plurality of processing circuits, each coupled to said bus, for performing a subset of a group of steps an a process performed by said processor;

wherein said stored program is a data flow program, and said control unit transfers instructions and data tokens to said plurality of processing circuits over said bus;

wherein said data tokens are data vectors;

a first register, wherein said program includes a CRTOKEN instruction which can be executed only once in said program, said CRTOKEN instruction being allowed to execute only if said first register has a first value, said CRTOKEN instruction causing said first register to assume a value other than said first value after execution, said processor including reset means for changing said first register to said first value.

35. The processor of claim 33 wherein said internal bus interface includes a scalar processor unit for copying an operand of a semaphore instruction to a result token after said modifying a count and testing a semaphore value in said update unit.

36. The processor of claim 29 further comprising:

a data token memory coupled to said global bus and accessible by each of said processing circuits.

37. A processor integrated on a single semiconductor chip comprising:

a control unit;

a memory, coupled to said control unit, having a stored program;

an internal global bus coupled to said control unit;

a plurality of processing circuits, each coupled to said global bus, for performing a subset of a group of steps in a process performed by said processor; and a data token memory coupled to said global bus and accessible by each of said processing circuits;

wherein said stored program is a data flow program, and said control unit asynchronously transfers instructions and data tokens to said plurality of processing circuits over said global bus;

wherein said data tokens are data vectors.

* * * * *